(12) United States Patent
Rolston et al.

(10) Patent No.: US 12,634,008 B2
(45) Date of Patent: May 19, 2026

(54) COMMUNICATION METHODS, SYSTEMS AND DEVICES

(71) Applicant: AXONAL NETWORKS INC., Beaconsfield (CA)

(72) Inventors: David Rolston, Beaconsfield (CA); Khalid Ahmad, Durham, NC (US)

(73) Assignee: AXONAL NETWORKS INC., Beaconsfield (CA)

( * ) Notice: Subject to any disclaimer, the term of this patent is extended or adjusted under 35 U.S.C. 154(b) by 254 days.

(21) Appl. No.: 18/551,594

(22) PCT Filed: Mar. 22, 2022

(86) PCT No.: PCT/CA2022/050422
§ 371 (c)(1),
(2) Date: Sep. 20, 2023

(87) PCT Pub. No.: WO2022/198310
PCT Pub. Date: Sep. 29, 2022

(65) Prior Publication Data
US 2024/0097783 A1      Mar. 21, 2024

Related U.S. Application Data

(60) Provisional application No. 63/167,703, filed on Mar. 30, 2021, provisional application No. 63/163,945, (Continued)

(51) Int. Cl.
*H04B 10/079*        (2013.01)
*H04L 49/101*        (2022.01)
(Continued)

(52) U.S. Cl.
CPC ..... *H04B 10/07955* (2013.01); *H04L 49/101* (2013.01); *H04L 49/1507* (2013.01); *H04L 49/90* (2013.01)

(58) Field of Classification Search
CPC .... H04B 10/548; H04B 10/50; H04B 10/501; H04B 10/5561; H04B 10/5563;
(Continued)

(56) References Cited

U.S. PATENT DOCUMENTS

| | | | |
|---|---|---|---|
| 5,074,632 A | 12/1991 | Potter | |
| 7,760,094 B1 | 7/2010 | Kozischek et al. | |

(Continued)

FOREIGN PATENT DOCUMENTS

| | | |
|---|---|---|
| GB | 8917488 | 9/1989 |

*Primary Examiner* — Hibret A Woldekidan
(74) *Attorney, Agent, or Firm* — Rosenberg, Klein & Lee

(57) ABSTRACT

The ability to efficiently and reliably transmit, route and receive data across telecommunication networks is essential for existing and evolving applications where connectivity to these networks is a ubiquitous aspect of society today. However, limitations in existing telecommunication networks impact this through performance, cost, and speed. To address this the inventor has established improvements with respect to routing (switching), processing, and monitoring. For routing low latency switch architectures for improving packet-based data switching are described. For processing digital optical logic devices and digital optical processing structures for enhanced functionality and processing within optical telecommunication networks are described. For monitoring improved optical connectors which provide embedded monitoring and analytical functionality for improved management of optical telecommunication networks are described.

16 Claims, 46 Drawing Sheets

Related U.S. Application Data filed on Mar. 22, 2021, provisional application No. 63/163,943, filed on Mar. 22, 2021.

(51) Int. Cl.
*H04L 49/15* (2022.01)
*H04L 49/90* (2022.01)

(58) Field of Classification Search
CPC .... H04B 10/556; H04B 10/54; H04B 10/541; H04B 10/70; H04B 10/07955; H04B 10/07957; G02F 1/212; G02F 1/225
See application file for complete search history.

(56) References Cited

U.S. PATENT DOCUMENTS

| | | | |
|---|---|---|---|
| 7,877,026 B2 | 1/2011 | Rofougaran | |
| 8,582,931 B1 * | 11/2013 | Vawter | G02F 1/3133 |
| | | | 385/24 |
| 9,170,108 B1 * | 10/2015 | Qiu | H04B 10/50572 |
| 2015/0103336 A1 | 4/2015 | Rolston et al. | |
| 2020/0150511 A1 * | 5/2020 | Carolan | G02F 1/3551 |
| 2020/0408989 A1 * | 12/2020 | Kita | G02B 6/125 |

* cited by examiner

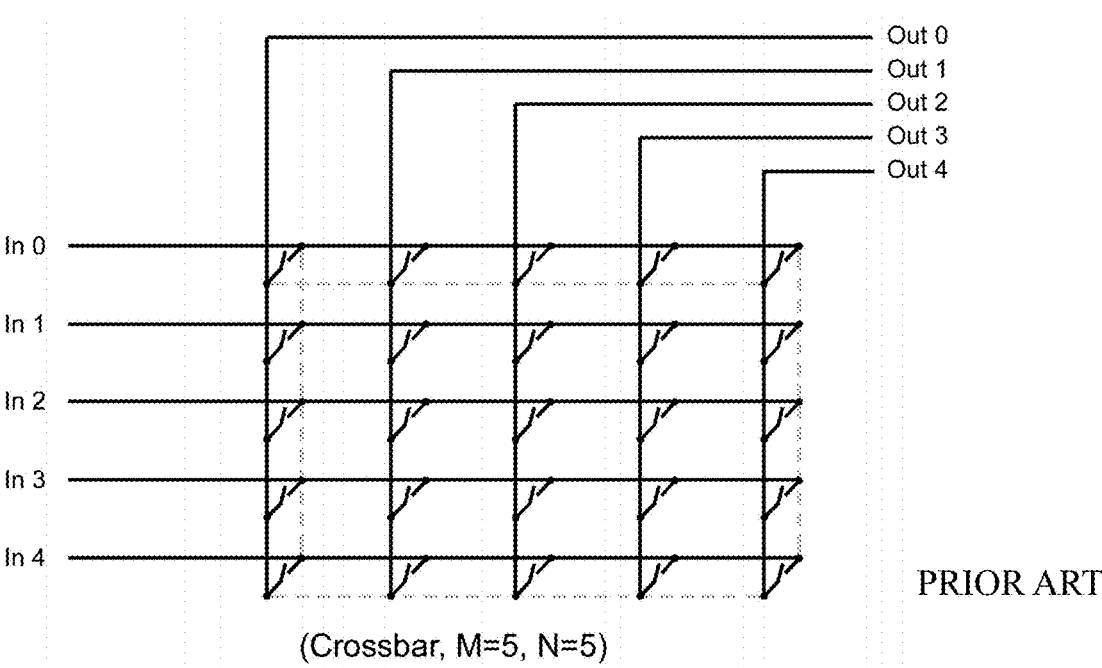
(Crossbar, M=5, N=5)
PRIOR ART
Figure 1
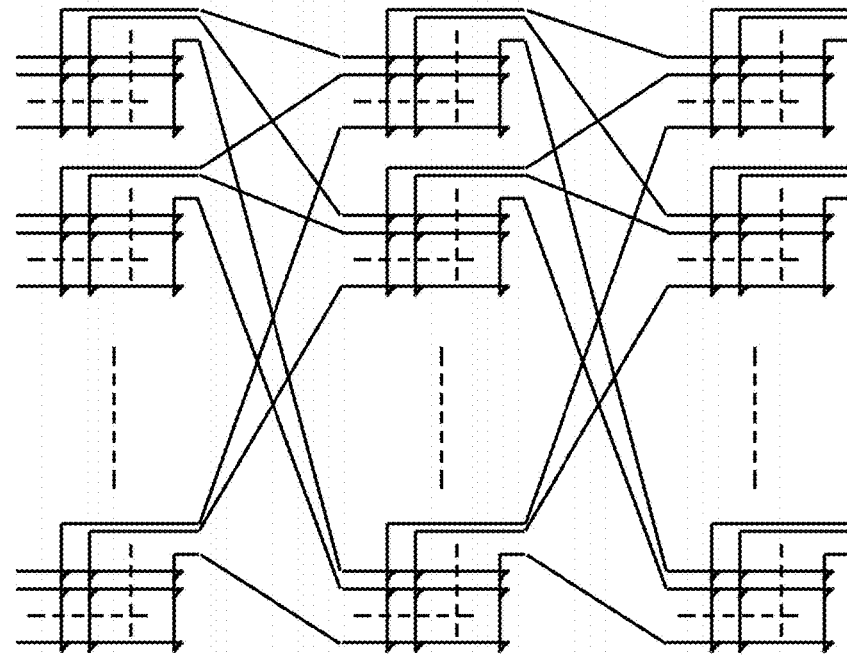
Figure 2                                    PRIOR ART

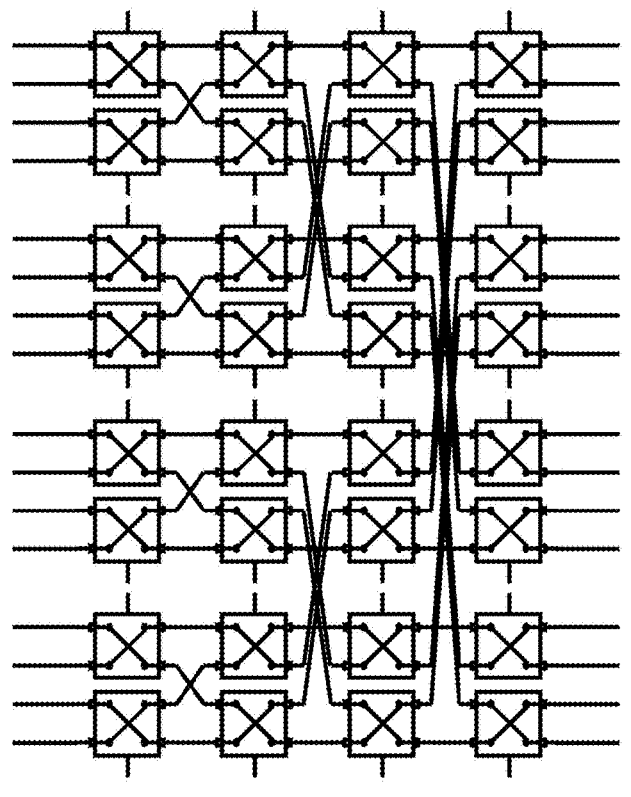
PRIOR ART
Figure 3     (Banyan, M=16, N=16)
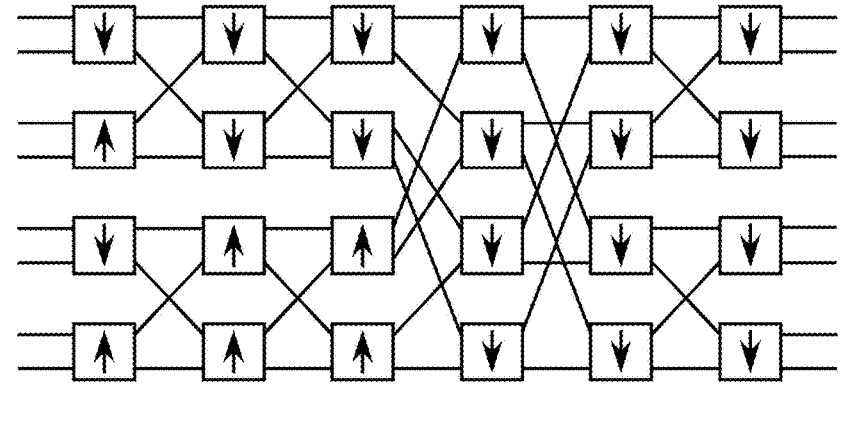
Figure 4
PRIOR ART

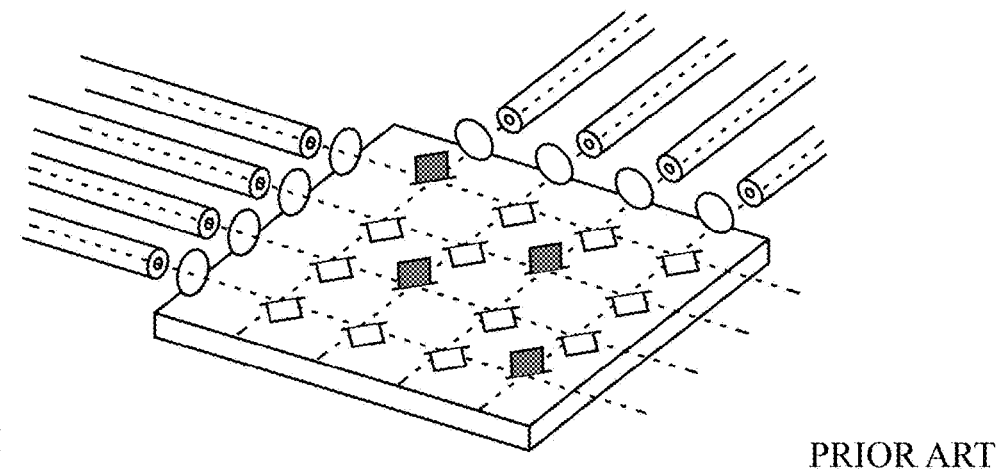
Figure 5                                                    PRIOR ART
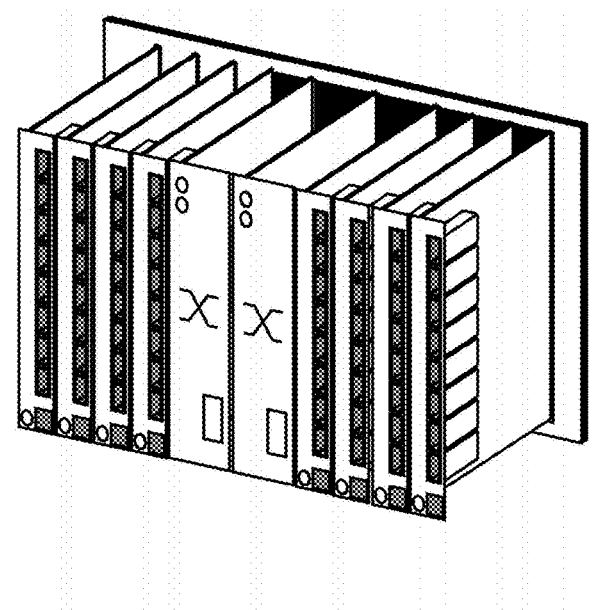
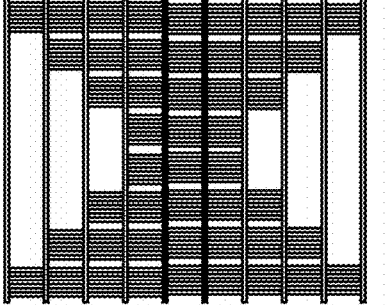
Figure 6
PRIOR ART 1100A
1100C 1100B
1100D Percentage of Successfully
Routed Packets Percentage of "Null Packets"

1210
1220
1230
1240

1300A
1300C 1300B
1300D

1510

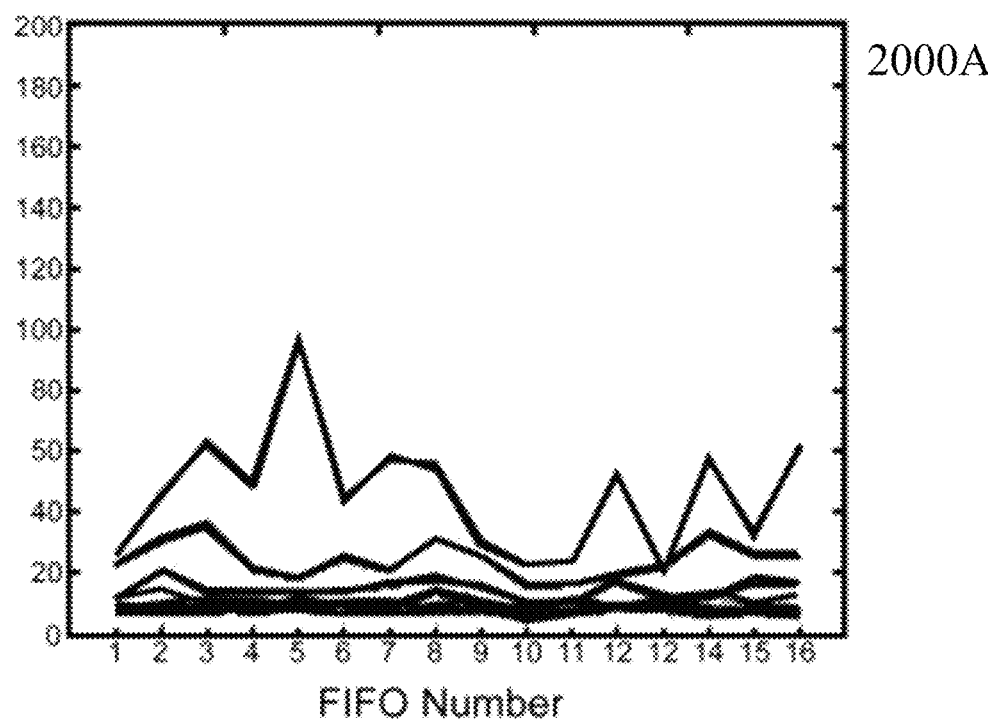
2000A
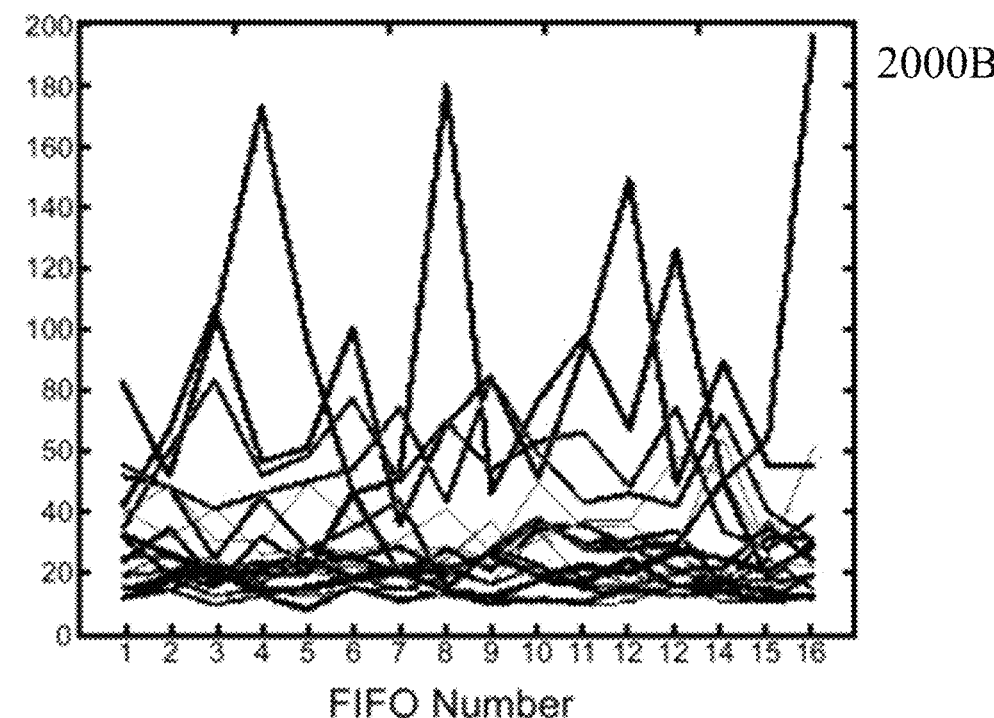
2000B
Figure 20

2110

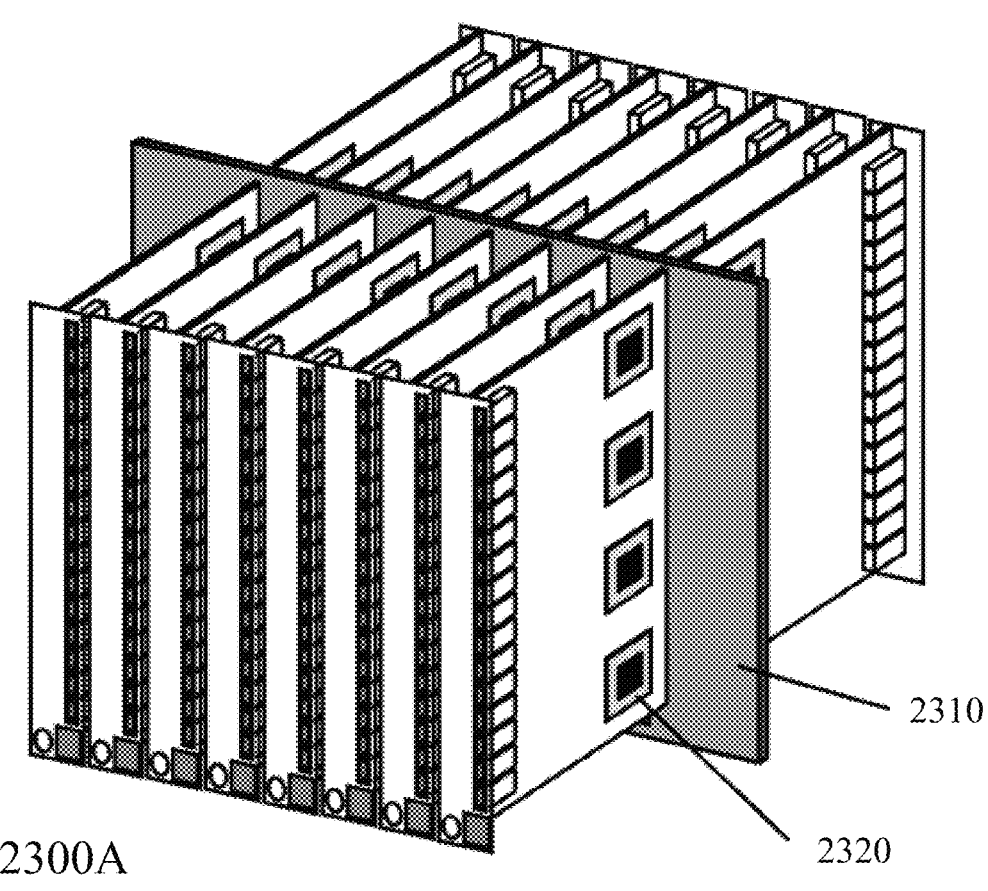
2310
2320
2300A
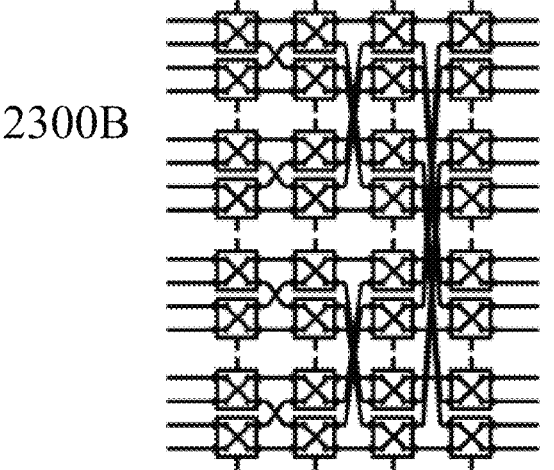
2300B
Figure 23

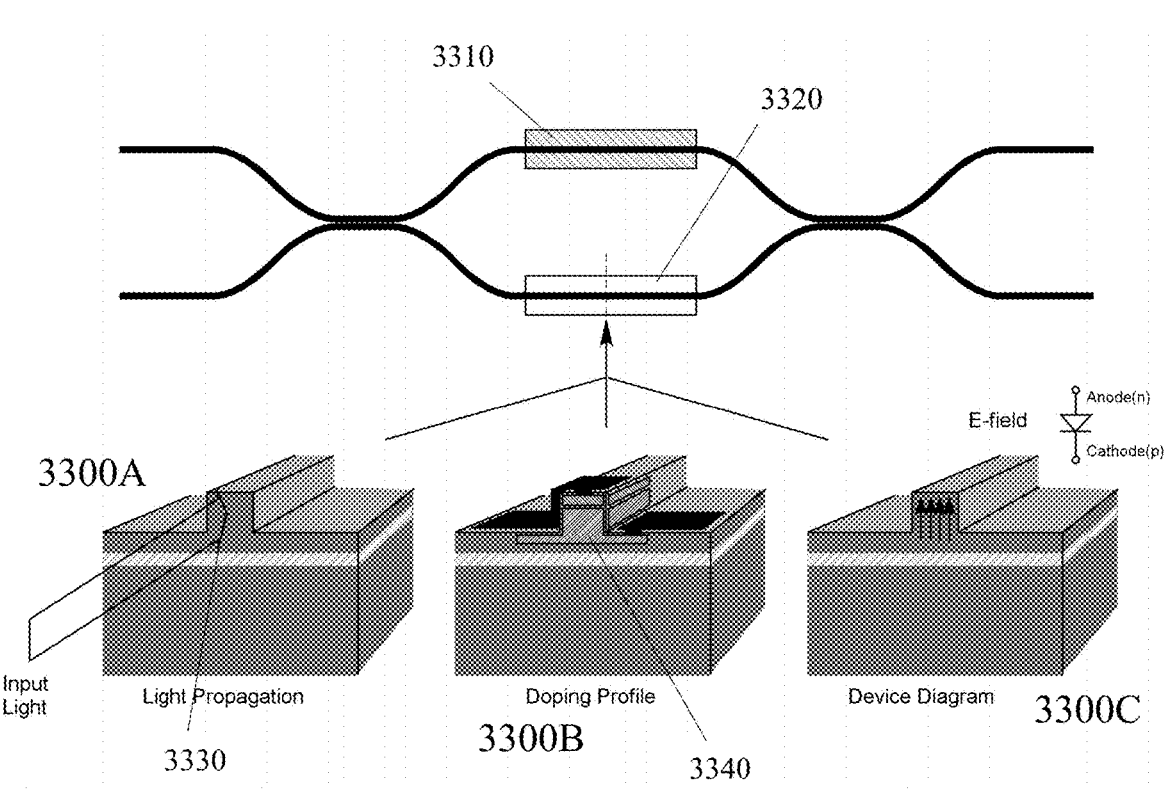
Figure 33
Figure 34
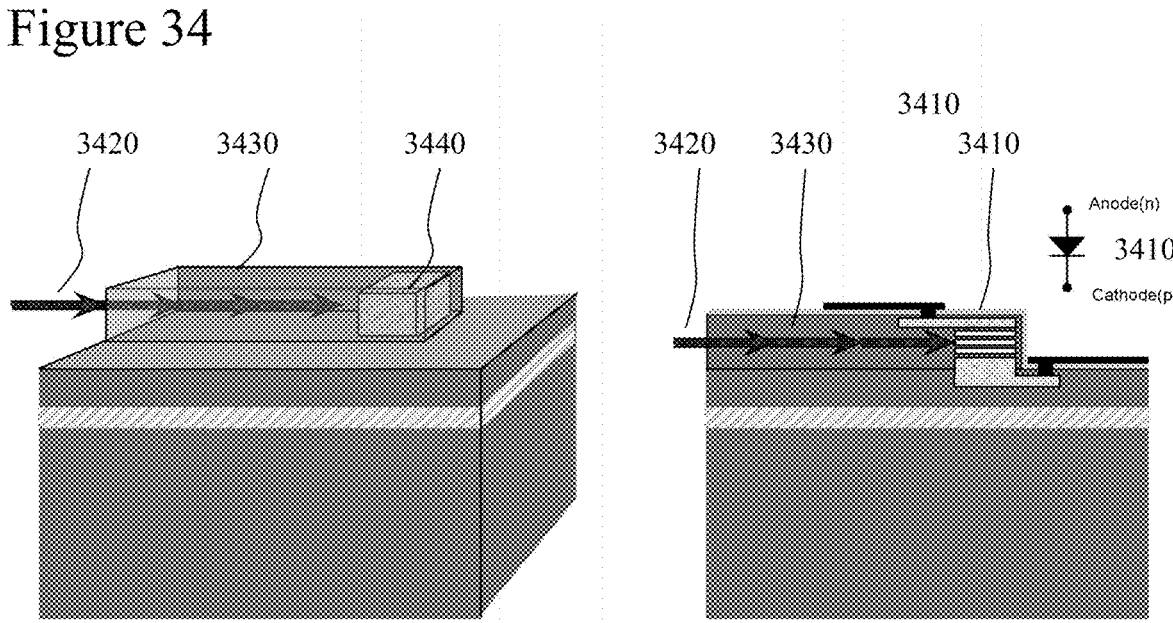

| P/$\overline{P}$ | A/$\overline{A}$ | F/$\overline{F}$ |
|---|---|---|
| 0/1 | 0/1 | 1/0 |
| 0/1 | 1/0 | 0/1 |
| 1/0 | 0/1 | 1/0 |
| 1/0 | 1/0 | 0/1 |

| P | A | F |
|---|---|---|
| 0 | 0 | 1 |
| 0 | 1 | 0 |
| 1 | 0 | 1 |
| 1 | 1 | 0 |

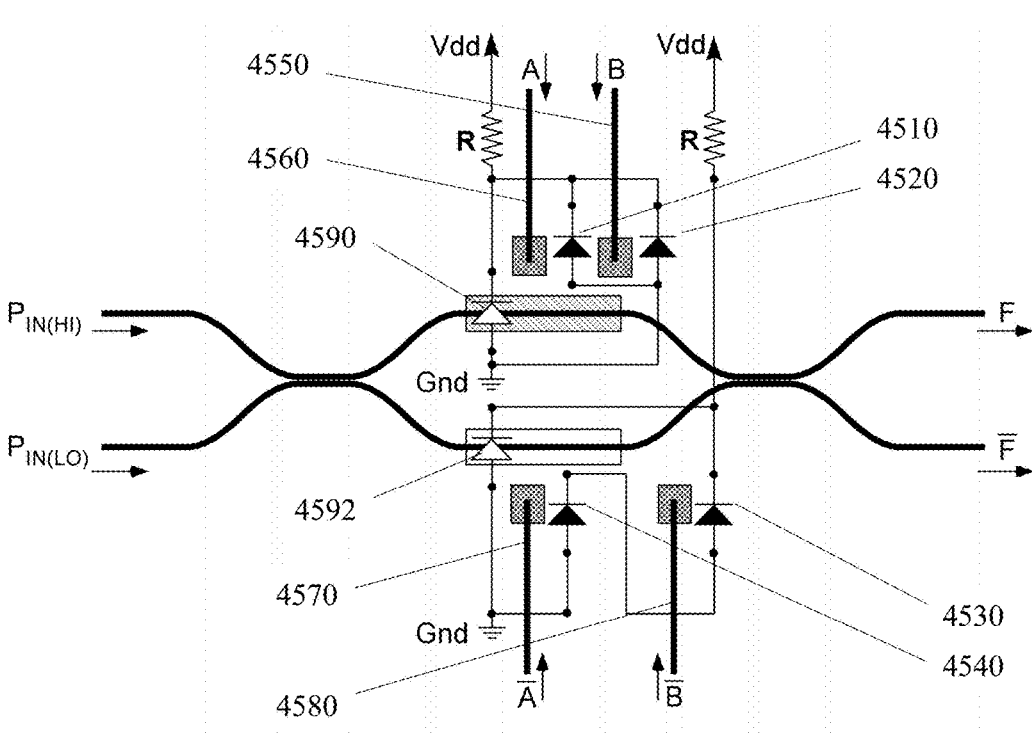
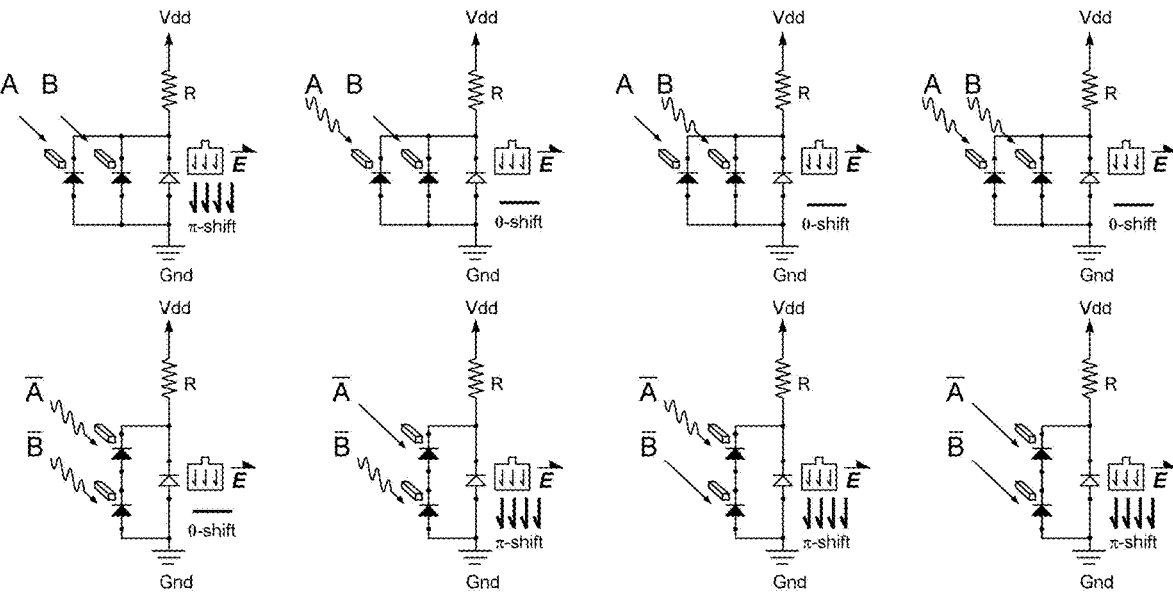
Figure 45
Figure 46

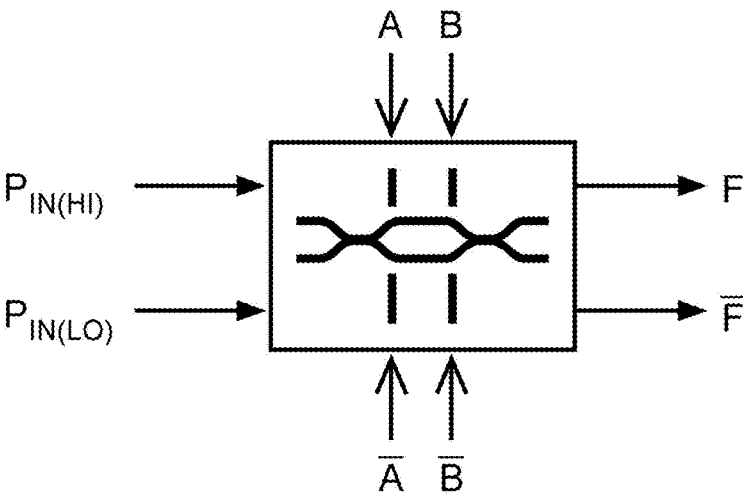
Figure 47
Figure 48
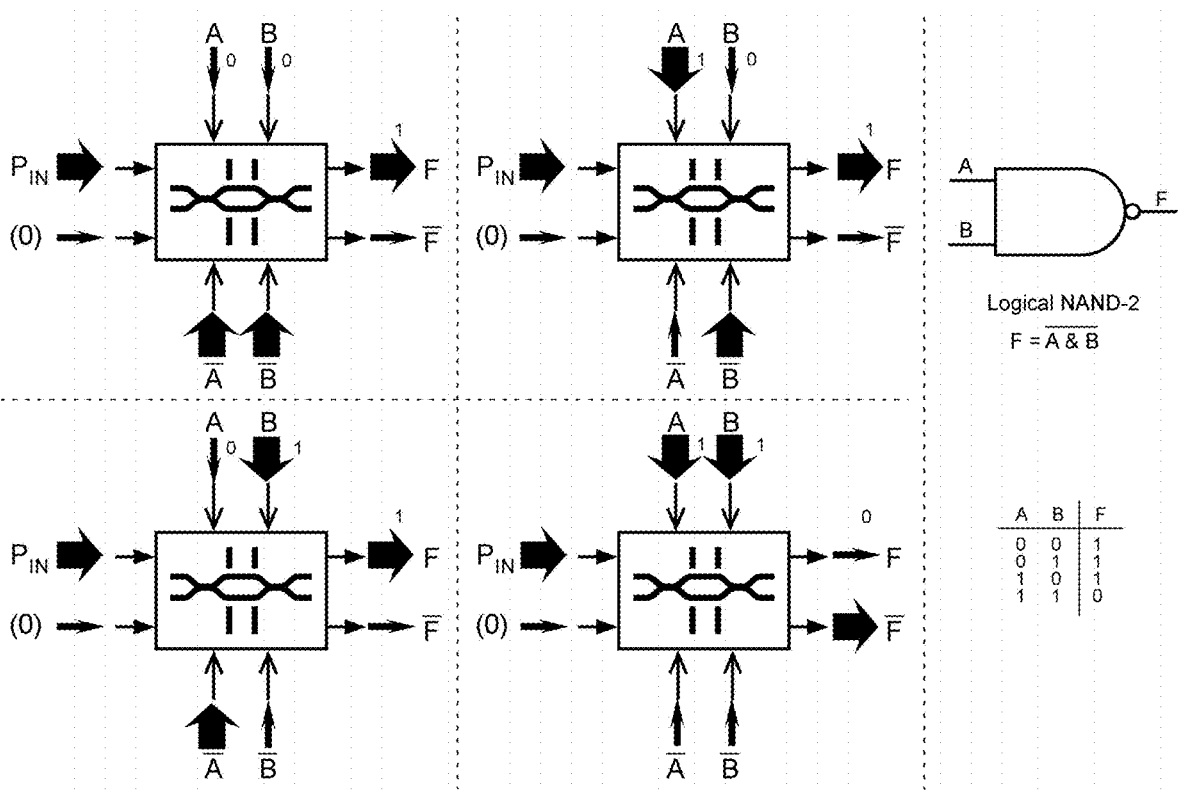

4910

$P_{IN(HI)}$ ⟶    ⟶ $P_{IN(OUT)}$

4930

4920

+ V -

Attenuation
$P_{IN(OUT)}$

V = 0

V = 10

WAVELENGTH

1550nm

Vdd

R

5010

$P_{IN(HI)}$ ⟶                                         F ⟶

A

B

5020

Gnd

5030

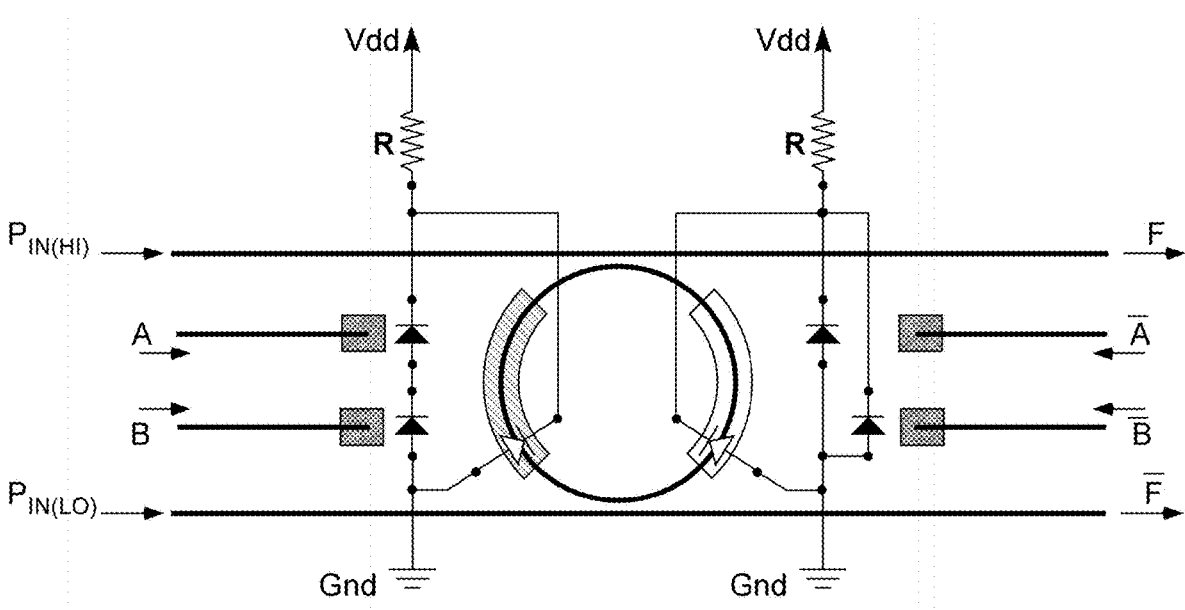
Figure 51
Figure 52
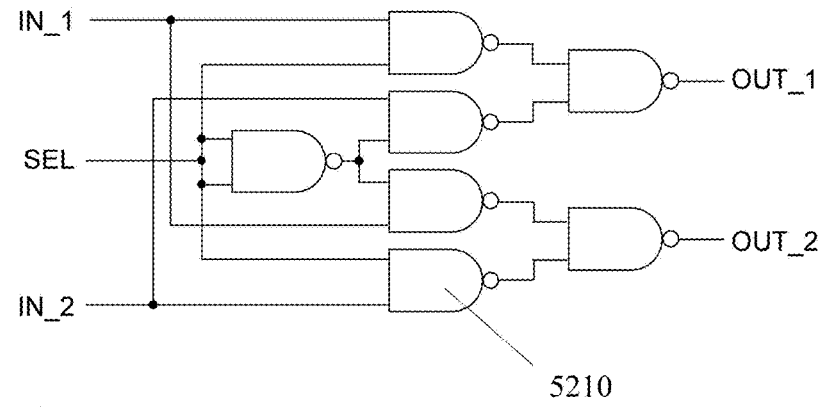
PRIOR ART
| IN_1 | IN_1 | SEL | OUT_1 | OUT_2 |
|------|------|-----|-------|-------|
| 0 | 0 | 0 | 0 | 0 |
| 0 | 1 | 0 | 0 | 1 |
| 1 | 0 | 0 | 1 | 0 |
| 1 | 1 | 0 | 1 | 1 |
| 0 | 0 | 1 | 0 | 0 |
| 0 | 1 | 1 | 1 | 0 |
| 1 | 0 | 1 | 0 | 1 |
| 1 | 1 | 1 | 1 | 1 |

PRIOR ART

Figure 56    5620    5610

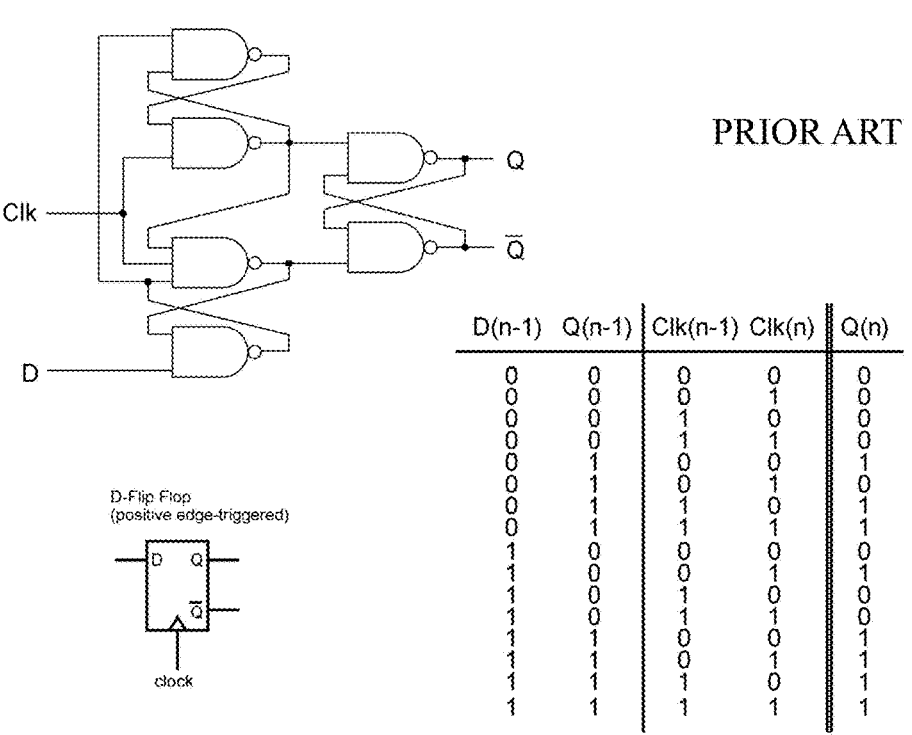
PRIOR ART
| D(n-1) | Q(n-1) | Clk(n-1) | Clk(n) | Q(n) |
|--------|--------|----------|--------|------|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |
Figure 57
Figure 58
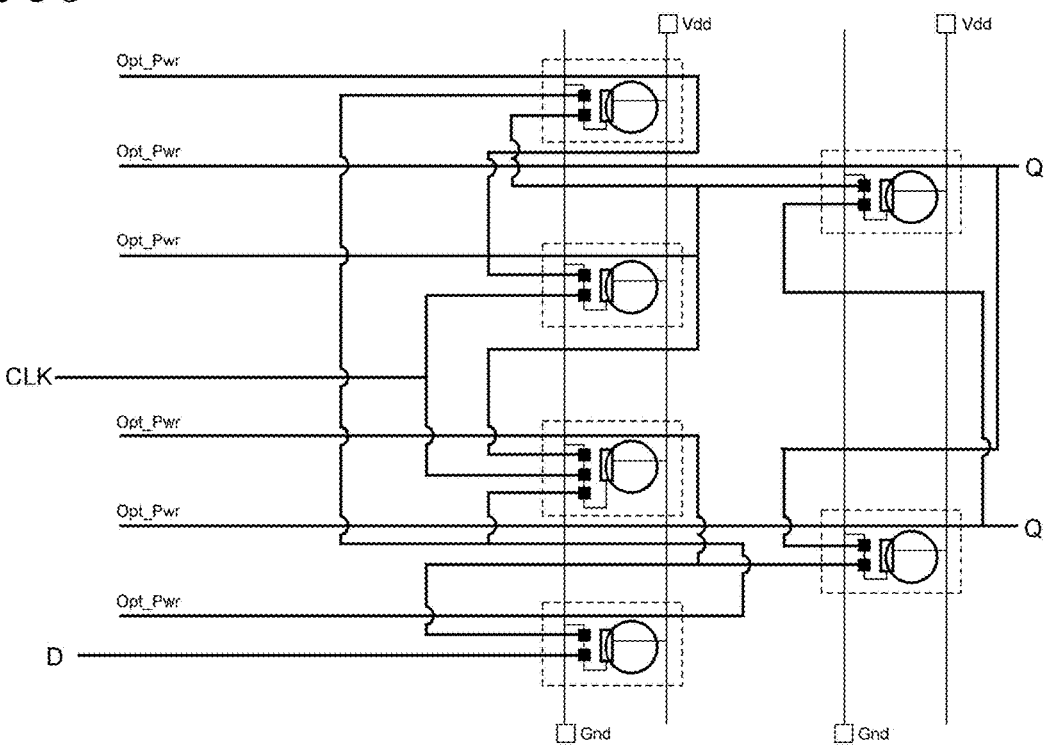

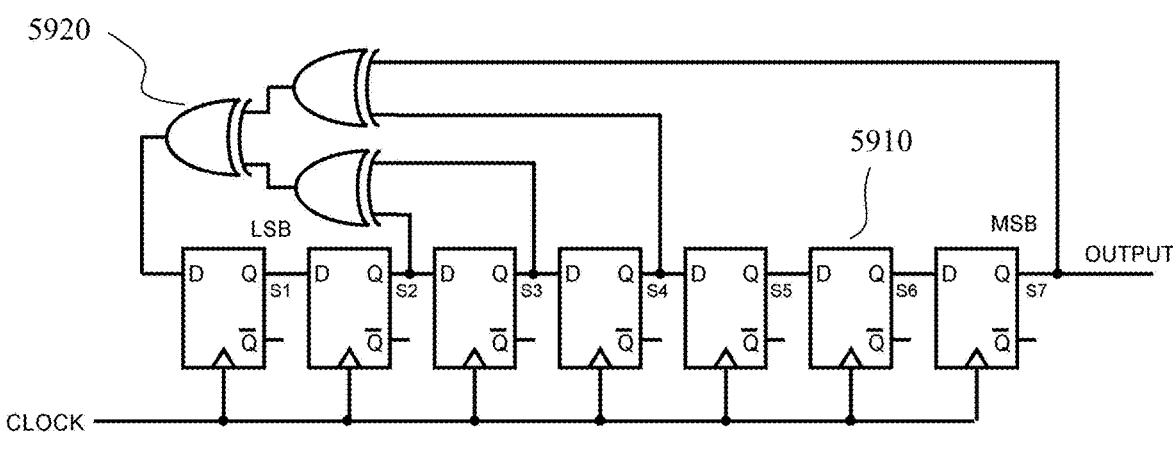
PRIOR ART
Figure 59
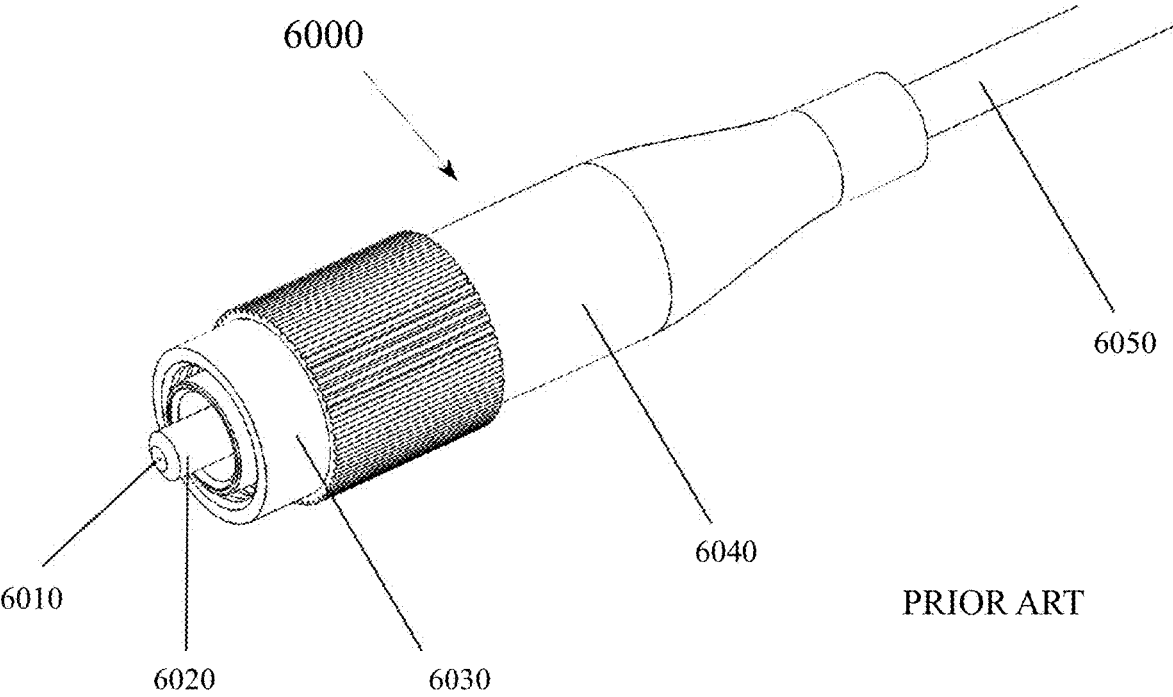
PRIOR ART
Figure 60

6100

6020

6020

6220

6210

6020

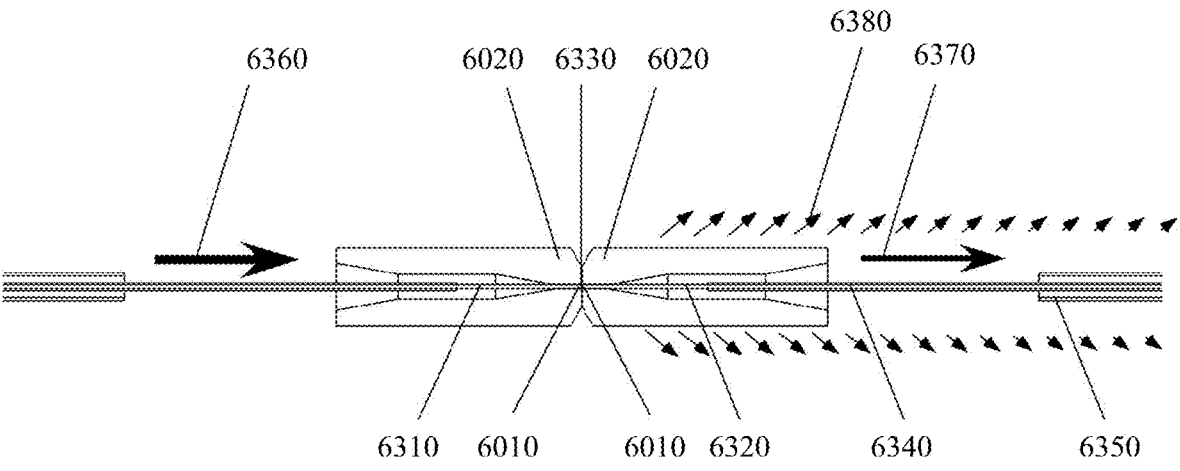
Figure 63                                                                    PRIOR ART
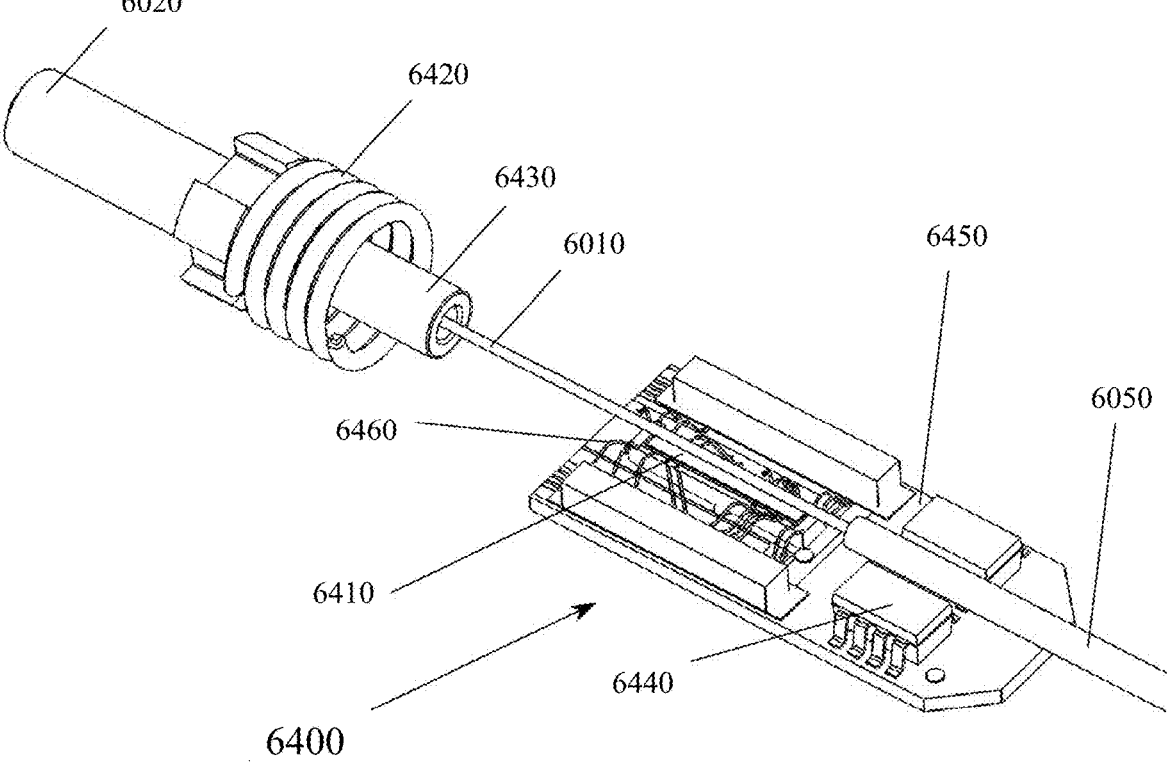
Figure 64

6400
6710
6050
6730
6720
6700
6420
6020
6050

6050
70
6040
68
6220
6230
6700    6010
6020 6420  6810
6030
6840

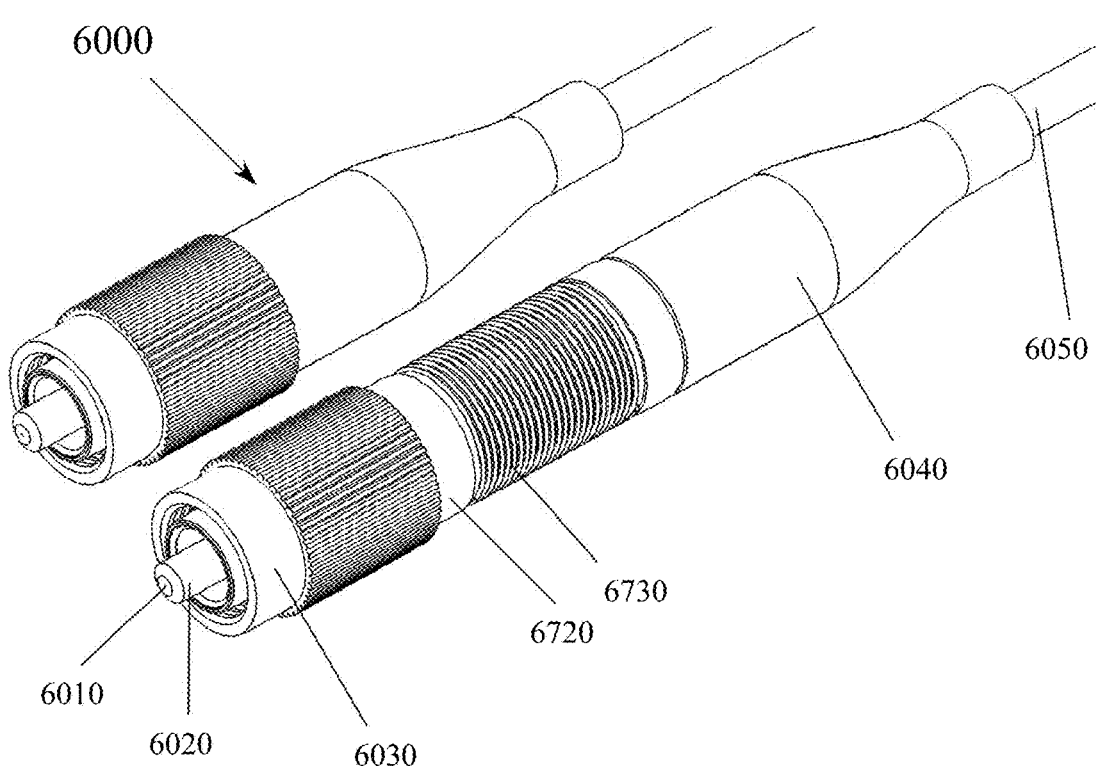
6000
6050
6040
6730
6720
6010
6020
6030
Figure 69
Figure 70
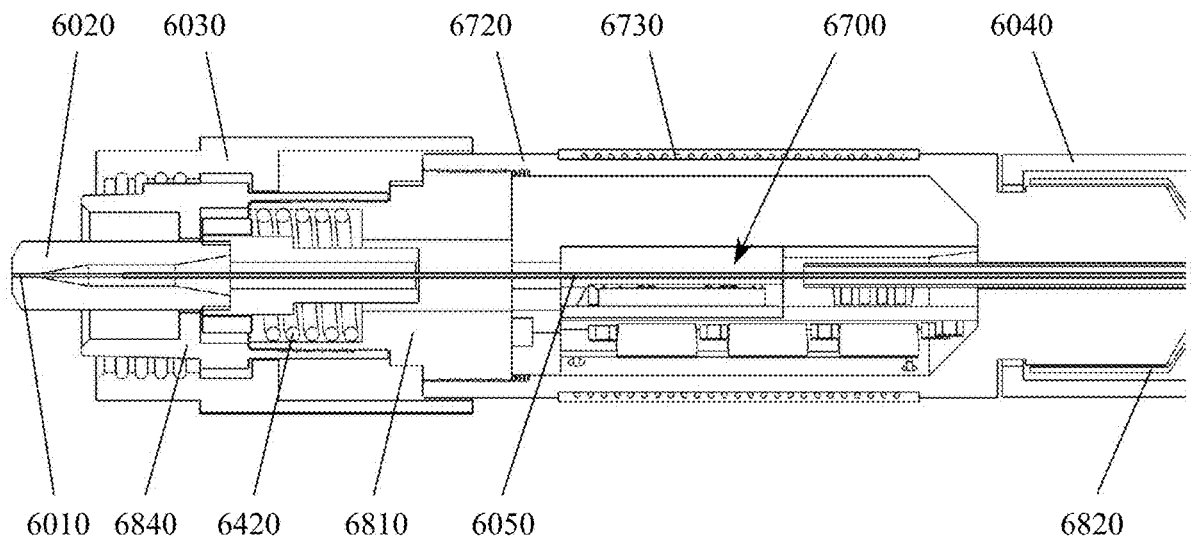
6020   6030   6720   6730   6700   6040
6010   6840   6420   6810   6050   6820

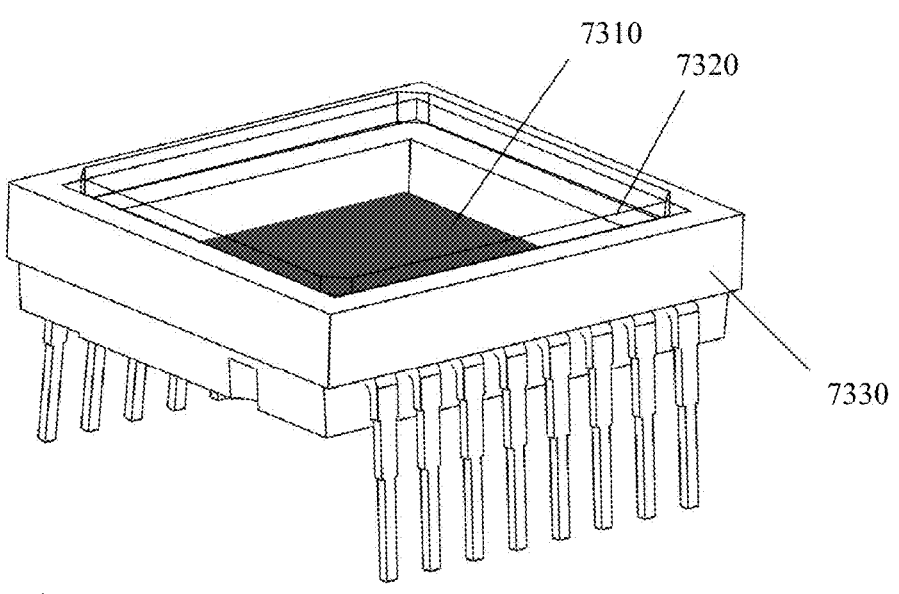
Figure 73                                                    PRIOR ART
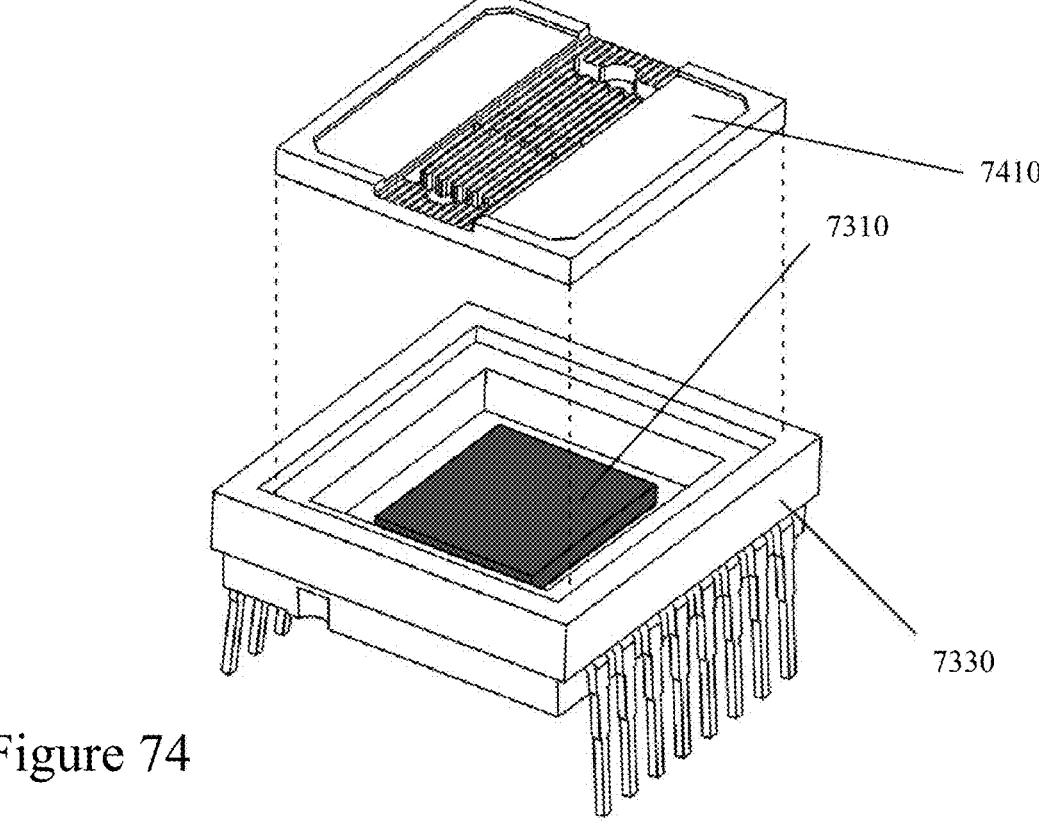
Figure 74

7520

7410 7510

7250 7410

7520 7310

7330

7510

7600A 7600B

COMMUNICATION METHODS, SYSTEMS AND DEVICES

CROSS-REFERENCE TO RELATED APPLICATIONS

This patent application claims the benefit of priority as a 371 National Phase Entry application of PCT/CA2022/050422 filed Mar. 22, 2022; which itself claims the benefit of priority from U.S. Provisional Patent Application 63/163,943 filed Mar. 22, 2021; as well as the benefit of priority from U.S. Provisional Patent Application 63/163,945 filed Mar. 22, 2021; and the benefit of priority from U.S. Provisional Patent Application 63/167,703 filed Mar. 30, 2021.

FIELD OF THE INVENTION

This patent application relates to communication methods, systems, and devices and more particularly to low latency switch architectures for packet-based data switching, digital optical logic devices, digital optical processing structures, and optical connectors with embedded monitoring and analytical functionality.

BACKGROUND OF THE INVENTION

Telecommunications provides connectivity between electronic devices on scales from personal area networks through local area networks and metropolitan area networks to national networks and international networks. These telecommunication networks provide us with a wide range of existing and evolving applications for individuals, enterprises, governments, and international organizations. These telecommunication networks may be optical, electronic or combine optical and electronic elements such as optical interconnectivity between electrical switching nodes or data storage devices for example.

Accordingly, the ability to efficiently and reliably transmit, route and receive data across these telecommunication networks is essential for these existing and evolving applications where connectivity to these networks is a ubiquitous aspect of our society today.

The inventors have established within the field of telecommunications with respect to the provisioning of:

- low latency switch architectures for improving packet-based data switching which forms the dominant telecommunications data format;
- digital optical logic devices and digital optical processing structures for enhanced functionality and processing within optical telecommunication networks; and
- improved optical connectors which provide embedded monitoring and analytical functionality for improved management of optical telecommunication networks.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to communication methods, systems, and devices and more particularly to providing low latency switched architectures for packet-based data switching, digital optical logic devices, digital optical processing structures, and optical connectors with embedded monitoring and analytical functionality to address these limitations.

In accordance with an embodiment of the invention there is provided an optical power monitor comprising a casing and a photodetector disposed within the casing to receive optical signals exiting laterally from an optical fiber disposed parallel to the photodetector.

In accordance with an embodiment of the invention there is provided an optical power monitor comprising a casing and a photodetector disposed within the casing to receive optical signals exiting laterally from an optical fiber disposed parallel to the photodetector wherein the casing is an optical connector and the optical signals exiting laterally from the optical fiber are a portion of other optical signals not coupled to a core of the optical fiber when the casing is mated with another optical connector.

In accordance with an embodiment of the invention there is provided an optical power monitor comprising a casing and a photodetector disposed within the casing to receive optical signals exiting laterally from an optical fiber disposed parallel to the photodetector wherein the optical fiber is continuous through the casing and the optical signals exiting laterally from the optical fiber are a portion of other optical signals not coupled to a core of the optical fiber when the optical fiber is coupled to another optical fiber.

In accordance with an embodiment of the invention there is provided a photonic device comprising:

- an optical waveguide structure for generating an output in dependence upon a phase shift induced within a predetermined portion of the optical waveguide structure; and
- an optical waveguide coupled to a photodetector for receiving an optical signal; wherein
- the phase shift induced within the predetermined portion of the optical waveguide structure is established in dependence upon a magnitude of the optical signal coupled to the photodetector.

In accordance with an embodiment of the invention there is provided a photonic device comprising:

- an optical waveguide structure for generating an output in dependence upon a phase shift induced within a predetermined portion of the optical waveguide structure; and
- an optical waveguide coupled to a photodetector for receiving an optical signal; wherein
- the phase shift induced within the predetermined portion of the optical waveguide structure is established in dependence upon a magnitude of the optical signal coupled to the photodetector;
- the photonic device provides an optical logical gate function; and
- the photonic device only receives DC electrical power.

In accordance with an embodiment of the invention there is provided a switch architecture comprising:

- a switch comprising N input ports and N output ports; wherein
- the switch comprises a plurality L planes of M×M sub-switches and a plurality L–1 planes of interconnections between adjacent planes of sub-switches of the plurality of L planes of sub-switches;
- each M×M sub-switch comprises a plurality R planes of other T×T sub-switches and a plurality R–1 planes of other interconnections between adjacent planes of other T×T sub-switches of the plurality of R planes of other T×T sub-switches;

N, M, L, R, and T are positive integers;

$N=2^X$ and $X \geq 2$; and $M=2^Y$ and $Y \geq 1$.

In accordance with an embodiment of the invention there is provided a method of implementing a switch architecture comprising:

a) establishing a dimension of the switch architecture, where the dimension is a number of input ports;

b) establishing the dimension of switch architecture with a number of switches of a smaller dimension established in a number of layers where the switches within each *intermedia* layer are coupled to the switches within a preceding layer by a fully connected mesh network and to other switches within a subsequent layer by another fully connected mesh network;

c) iteratively repeating the step (b) for each switch of the smaller dimension until a final iteration wherein the smaller dimension is 4;

d) providing on each input of the switch architecture a buffer to accept packets of data to be routed by the switch architecture; and e) populating each buffer with null packets at a predetermined ratio wherein the switch architecture ignores null packets; wherein each switch pseudo-randomly distributes packets of data to the number of switches of small dimension such that each switch of the number of switches of smaller dimension is loaded at a predetermined ratio.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts a schematic of a crossbar interconnect architecture according to the prior art;

FIG. 2 depicts a schematic of a CLOS network composed of 3 layers of sub-switch crossbars and 2 mesh interconnects according to the prior art;

FIG. 3 depicts a schematic of a 16×16 Banyan switch architecture according to the prior art;

FIG. 4 depicts a schematic of a 16×16 Batcher switch architecture according to the prior art;

FIG. 5 is a representation of a 4×4 microelectromechanical systems (MEMS) mirror array based optical switch for an optical crossbar switch according to the prior art;

FIG. 6 is a schematic of a dual star connected electrical backplane with 2 switch cards and 8 port cards according to the prior art;

FIG. 20 is a plot comparing the performance between a standard 16×16 Banyan switch of FIG. 13 and the 16×16 distributed, layered architecture showing the maximum FIFO buffer utilization versus "Null Packet" input probability for the architectures depicted in FIGS. 15 and 17;

FIG. 23 is a representation of a 256×256 distributed layered architecture showing the distribution of switch chips and input/output ports with the mesh interconnects not depicted for clarity according to an embodiment of the invention;

FIG. 33 depicts cross-sectional and plan schematics of the optical waveguide arms of a MZI structure and the 3 functions it provides according to an embodiment of the invention;

FIG. 34 depicts schematically a germanium photodetector patterned as part of a silicon PIC according to an embodiment of the invention;

FIG. 45 depicts a schematic of a full optical logical NAND gate according to an embodiment of the invention as realized using a MZI with diode combinations to implement the logical NAND function optically;

FIG. 46 depicts schematics of the optical logical NAND gate according to an embodiment of the invention depicted in FIG. 45 with and without incident light and the respective voltages (E-Fields) across the phase-modulation diodes;

FIG. 47 depicts an exemplary logic symbol for the optical NAND gate according to an embodiment of the invention depicted in FIG. 45;

FIG. 48 depicts the logic states of the optical NAND gate according to an embodiment of the invention depicted in FIG. 45 along with logical symbol and truth table;

FIG. 51 depicts schematically aa full optical logical NAND gate according to an embodiment of the invention utilizing a ring resonator optical structure with complementary diodes to implement the logical NAND function optically;

FIG. 52 depicts schematically the functionality of the optical NAND gate according to the embodiments of the invention depicted in FIGS. 50 and 51 together with truth table and high-level symbol for the 2×2 logical switch

FIG. 56 depicts schematically a representation of the 4×4 logical switch depicted in FIG. 55 implemented using multiple optical PICs connected with multiple external optical fibers although a single PIC implementation with optical waveguide interconnects may also be implemented;

FIG. 57 depicts a schematic, truth table and high-level symbol for a Delay Flip-Flop (D-FF);

FIG. 58 depicts schematically an optical ring resonator circuit implementation of the D-FF logical function depicted in FIG. 57;

FIG. 59 depicts schematically a 7-bit serial register with negative feedback implementing a $2^7$-1 pseudo-random bit patten generator according to the prior art;

FIG. 60 depicts schematically a perspective view of an FC-type optical fiber connector according to the prior art;

FIG. 63 depicts schematically a cross-sectional side view of an optical FC connector-optical FC connector mating according to the prior art;

FIG. 64 depicts schematically a perspective, exploded view of an optical FC connector with a PCB including an optical detector and control circuitry according to an embodiment of the invention;

FIG. 69 is a perspective, side-by-side, comparison view of a standard FC-connector (upper left) and a modified connector monitor assembly in the FC-connector form factor comprising the integrated sensor-assembly assembled around the optical fiber in accordance with an embodiment of the invention;

FIG. 70 depicts schematically a cross-sectional side view of the FC connector with integrated sensor-assembly assembled around the optical fiber in accordance with an embodiment of the invention as depicted in FIG. 67;

FIG. 73 depicts schematically a perspective view of a packaged charge-coupled detector (CCD) array chip with a glass lid according to the prior art;

FIG. 74 depicts schematically a perspective view of a packaged CCD array chip employing a custom parallel slot aperture coupling and isolating optical signals from adjacent optical fibers in a ribbon fiber cable according to an embodiment of the invention;

DETAILED DESCRIPTION

Figure 7:
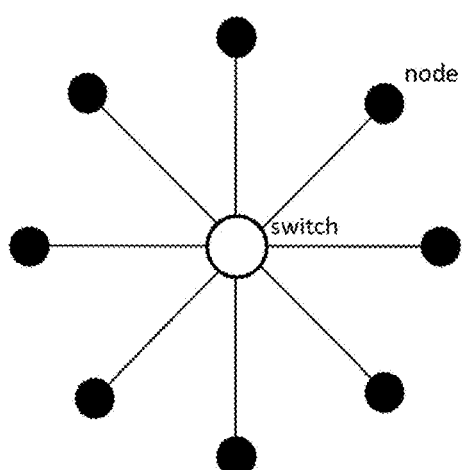
FIG. 7 depicts a schematic of a star topology interconnection network according to the prior art.

The present invention is directed to communication methods, systems, and devices and more particularly to low latency switched architectures for packet-based data switching, digital optical logic devices, digital optical processing structures, and optical connectors with embedded monitoring and analytical functionality.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting," and grammatical variants thereof do not preclude the addition of one or more components, features, steps, integers, or groups thereof and that the terms are not to be construed as specifying components, features, steps, or integers. Likewise, the phrase "consisting essentially of," and grammatical variants thereof, when used herein is not to be construed as excluding additional components, steps, features integers or groups thereof but rather that the additional features, integers, steps, components, or groups thereof do not materially alter the basic and novel characteristics of the claimed composition, device, or method. If the specification or claims refer to "an additional" element, that does not preclude there being more than one of the additional element.

A: Low Latency Switching Architecture

The capacity of today's data communication networks is limited by the switches used to route this data traffic. Switches are used simply because the resources required to have "everything connected to everything" is financially and likely physically impossible to construct. Accordingly, to still realize maximal connectivity with a cost-effective infra-structure, a common or "shared" set of resources must be employed. This essentially means that all "end-points" of a network (users at computers, servers, databases, smart-phones, etc. . . . ) must be aggregated and routed through common resources called switches (or routers). These switches are required to balance the cost of the resources (equipment, cables, etc. . . . ) with the bandwidth demanded of it. However, the common resource, such as a switch, has a challenging drawback; it limits or slows the accessibility (usually in terms of time) to each of the other resources. The switch cannot guarantee immediate and continual point-to-point access for all users of the network at the same time and therefore be part of overall latency of the network, especially when the network is being heavily used. Since the switch is a "shared resource," the fundamental latency occurs within the switch because of contention. Contention arises when two inputs require access to the same single output, at the same time. Either one request at one input is granted access over the other request at the other input, and this second request is simply "dropped," or the second request is stored in a memory buffer until it is given access to the output. This incurred "storage" delay relates to the switch latency. How-ever, the amount of memory is also an issue, and an excessive amount of time spent in a memory queue waiting for access to the output might also result in "dropping" the request anyway, depending on the protocols used.

The network protocols deployed today, such as Transmis-sion Control Protocol/Internet Protocol (TCP/IP), Hypertext Transfer Protocol (HTTP), and Post Office Protocol (POP) along with others, all have contingency features built into their protocols and algorithms to deal with latency. The "time-out" feature when waiting for a response and the re-sending of requests, along with the out-of-order sequenc-ing and re-sorting of packets in higher abstraction layers of the protocols are all methods used to deal with imperfect data links and switches. Today, most of the input data traffic eventually gets access to the output ports of the switch, although, during peak access times during the day, data packets will be dropped.

However, as the continual increase in demand for resources and bandwidth continues, the struggle to maintain a certain quality of service (QoS) in the network is not so much because of the ever-increasing data rates demanded by the devices themselves but because of increasing data delays due to contention. The latency of a packet transaction using (for example) the TCP/IP protocol uses timers based on transmitted messages, acknowledgements, congestion, and round-trip times to determine when a message must be re-transmitted. This is a complicated protocol where essen-tially, if the physical distance and possible switch contention becomes too long, the transmitted message might be lost and the sender may be required to resend the request numerous times before giving up entirely.

Within the prior art the first switching platforms were based on crossbar interconnects, of which an exemplary 5×5 crossbar is depicted in FIG. 1 according to the prior art and employed telephony applications and typically provided a so-called "circuit-switched" architecture that provided an end-to-end connection for as long as the connection was required. This architecture is simple and could connect any input to any output and could be implemented as a blocking or non-blocking switch (M×N inputs/outputs (N<M) or M×M inputs/outputs, respectively). The number of switches scales as the power of 2, in other words, for M inputs and M outputs, the total number of switches is M×M (M squared) and such are resource intensive. While crossbars are straight-forward structures and connect all inputs to all outputs, most of the infrastructure is "wasted" as all the switches except one for a row or column are left open except the one which is closed to make the appropriate connection between the input and the desired output. However, the open switches also need to know which state to be in, implying that all M×M switches need to be controlled and has pushed engineers over time to develop other interconnect strategies.

Hybrid architectures, such as the CLOS network, as shown in FIG. 2 according to the prior art, were solutions to the scaling resources problem. A CLOS network uses smaller crossbar "groups" interconnected with mesh inter-connects, for example there are typically 3 layers of cross-bars with 2 layers of mesh interconnect. This reduces the total infrastructure required but does so at the expense of more complicated control along with greater latency issues. Whilst the crossbar can suffer from contention issues, 2 inputs want to talk to the same output, the CLOS network may cause a contention issue for an input simply because another input is using part of the resource. Hence, even when 2 inputs do not necessarily need to access the same output there can still be contention inside the switch.

Other structures that further reduced the cost and resource with increased "computational" complexity have been dem-onstrated over the years. The Banyan switch, as shown in FIG. 3 according to the prior art, uses arrays of 2×2 switch cells with butterfly crossovers between each layer. With the interconnect links at a premium the Banyan network reduces the number of links to a "linear" scaling, but of course increases the complexity of the algorithms and the possibil-ity for contention. The Batcher architecture, as shown in FIG. 4 according to the prior art, uses a similar interconnect structure, but does so with a more simplified algorithmic approach. The algorithm uses self-routing methods to move an input to an output from one layer of the switch to the next which simplifies the overall control of the switch fabric. Many other switch fabrics have been established within the prior art, such as the Fat-Tree, the Benes, and the Sunshine packet switch architectures, along with many proprietary versions of switching fabrics. All of these architectures use interesting techniques, such as recirculating algorithms as well as complicated look-ahead, optimizing flow control algorithms to manage the switch loading.

Some of these architectures have also been implemented in the optical domain rather than the electrical one as telecommunications exploited the low loss characteristics of optical fiber together with its ability to simultaneously carry multiple multi-gigabit per second streams through wave-length division multiplexing. For example, optical crossbars have been demonstrated using optical microelectromechani-cal systems (MEMS) elements on microchips, as shown in FIG. 5 according to the prior art, where M×M matrices of tiny flip-up mirrors are arranged in a regular matrix where linear arrays of optical fibers along 2 sides of the regular matrix are aligned with the tiny mirrors. When a minor is activated, it flips-up and reflects the beam of light at 90 degrees towards the receiving optical fiber. Other implemen-tations of optical fiber meshes and shuffles have also been employed inside Banyan, Batcher, and other architectures, all with the intension of providing "lower-cost" and "higher-speed" solutions than electrical interconnect, and with the possibility of providing higher numbers of interconnections.

However, most interconnections within switch fabrics remain simple, point-to-point, interconnected copper trans-mission lines on standard electrical backplanes, as shown in FIG. 6 according to the prior art. Large telecom routers have typically been implemented as types of standard star-interconnects between the main switch and the inputs and outputs as shown in FIG. 7 according to the prior art. At the center is the main resource (the switch) and at the endpoints the access (inputs and outputs).

Figure 8:
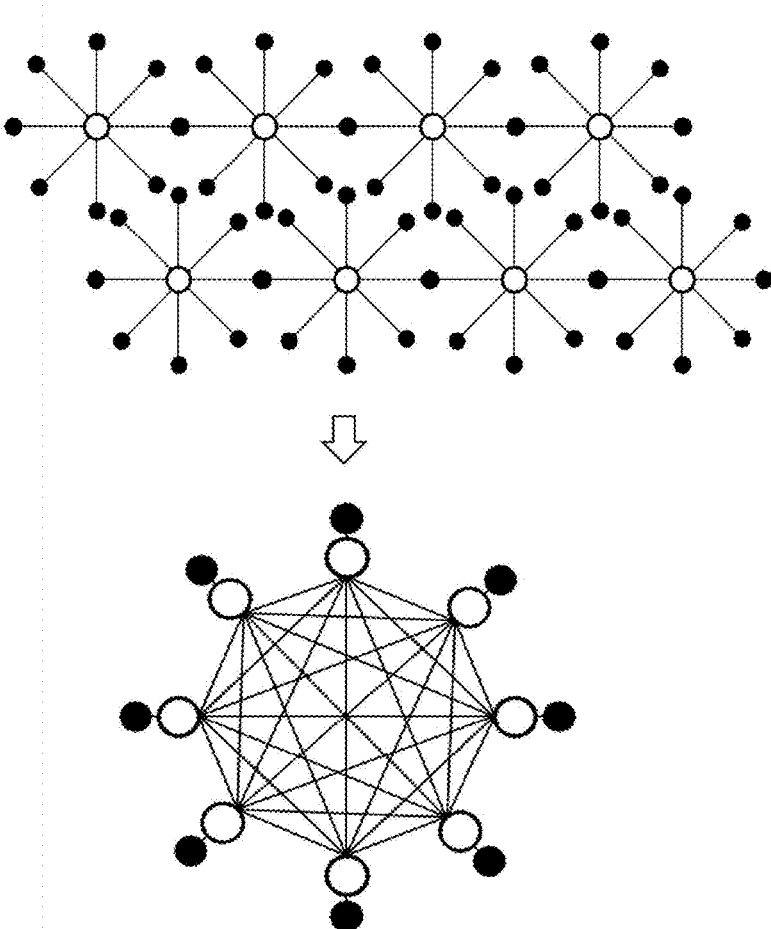
FIG. 8 depicts a schematic of combining multiple star topology interconnection networks to implement a crossbar interconnection between devices.
Figure 9:
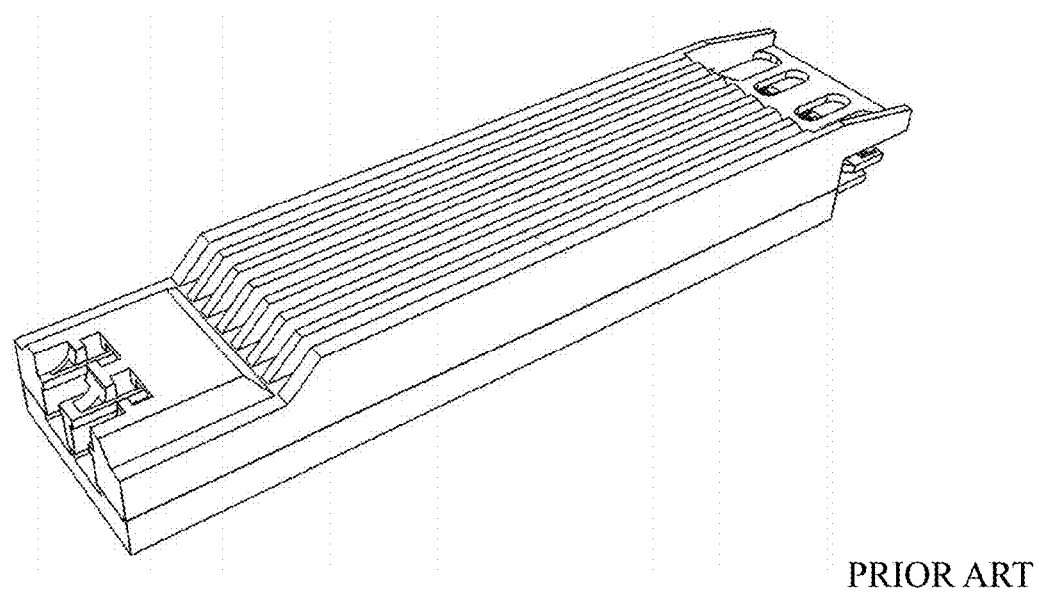
FIG. 9 depicts a schematic of an OSFP optical transceiver module according to the prior art.
Figure 10:
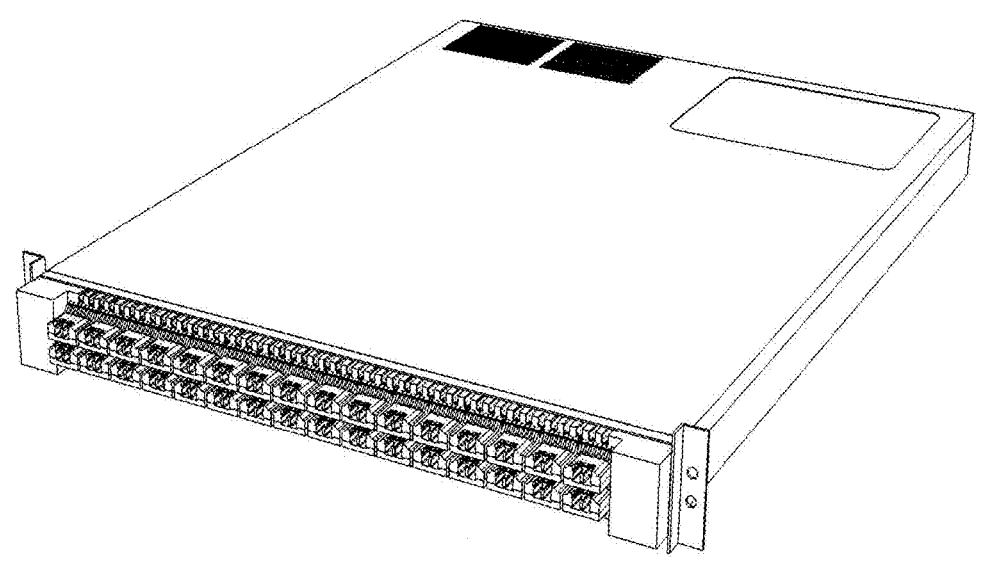
FIG. 10 depicts a schematic of a top-of-rack 32-port switch according to the prior art.

An alternative way to view a crossbar interconnect (everything connected to everything) is also to implement an overlay of as many star interconnects as there are end-point terminals as shown in FIG. 8. These interconnects either connect the input/output traffic to the central switch, or sometimes are responsible for connecting multiple switches together along with the input/output traffic. The reliance on simple, copper, point-to-point interconnects has been understandable because of the low cost, but has been reducing due to the transition to optical transmission media over the past 2 decades. Data rates could be increased for longer distance using optical fiber while the lengths of copper interconnects have been reserved for only the last "few centimeters" or so between the optical transceiver, as shown in FIG. 9 and the data-center switch as shown in FIG. 10 according to the prior art. Most top-of-rack switches today in datacenters take advantage of the massive numbers of transistors possible with very small node complementary metal-oxide-semiconductor (CMOS) technology in silicon. For example, Taiwanese Semiconductor Manufacturing Corporation (TSMC™) has a commercial process for 3.5 nanometer sized transistors and manufacturers can pack billions of transistors into a single microchip. The Broadcom™ Tomahawk series of switching cores is essentially based on fully dynamic crossbar interconnects (although it may be implemented more as memory sorting algorithms) with very complicated dynamic switching, look-ahead inspection, and very deep memory buffers among other functions. Furthermore, the high-speed Serializer/Deserializer (SERDES) interfaces make it possible to allow for hundreds of multi-gigabit inputs and outputs to a single chip. However, this reliance on continuous transistor scaling places the entire burden of switching down on a single point, the microchip (also known as an integrated circuit or IC). The input/output signals must all be routed to this central point, the central chip becomes dense, expensive, and very power hungry. Furthermore, the chip packaging technology has increasingly become an issue as the speed and density of the microchips has been further increased over time.

As microchip transistor density increases, it places a greater strain on the packaging of these chips and how signals from the outside world reach the inside world of the microchip. The ratio of transistors in a chip to connection points to and from the same chip is becoming ever greater. Because of practical packaging reliability issues, such as pin size, heat-dissipation, thermal expansion, and crosstalk (e.g., electromagnetic interference), the number of outside electrical connections to a microchip is becoming many orders of magnitude less than the number of transistors within it.

The only available solution to feed the many billions of transistors inside the microchip with data is to then increase the data rates per pin to the package. However, as the connections to the microchip remain electrical, ever more sophisticated optical transceiver modules become the bridge between the external optical transmission world and the electronic processing world inside the microchip switch.

To date, the expected data rates that are projected for the highest end optical transceivers are roughly 1.6-Terabits/sec per port and may require up to 30 Watts for each transceiver. A full switch may require for example 32 transceivers and over 1-kWatt of power not-including the power for the switch itself.

Unfortunately, we are somewhat victims of our own success in this development. With every improved transceiver and data-format that funnels more data along the same path, more data is available for the switch, as the switch has ever more transistors in the same physical area that all go faster. However, the increase in power, the higher signal integrity costs and the lower noise margins that result required ever more sophisticated processing power (such as digital signal processing (DSP)) to "un-scramble" the distorted electrical signals that travel at ever higher data rates along short copper traces and connection pins to the microchip itself.

A1: Formulation of the Switch Architecture

The goal of a switch architectures is to direct input messages to appropriate output destinations using the least amount of resources, the lowest cost, and the highest efficiency possible. The architecture described herein is based on a hybrid of the Banyan switching architecture and the crossbar interconnect but uses novel observation and performance features that allow the switch to have very low latency while scaling almost linearly. Whilst the following description is presented with respect to the Banyan switching architecture it would be evident to one of skill in the art that the methodologies and techniques presented can be employed with other switch architectures, such as the Dragonfly, Batcher, Benes, etc. for example, so that these can be similarly recast in a more efficient manner as well.

At the root of this new architecture is the principle of space division multiplexing (SDM) which allows information to take multiple independent paths in a network. However, the novelty of this invention is also related to how many paths are needed which further relates to the fundamental latency optimization of the sub-structures that compose the overall architecture.

This first exercise in developing this new architecture was a fundamental examination of two diametrically opposed switching systems: the crossbar and the Banyan. While the crossbar results in very low latency it scales rapidly with the number of ports requiring a huge number of resources. In contrast, the Banyan network whilst resulting in fairly poor performance scales linearly requiring far fewer resources.

By examining the switching performance of different sized Banyan switches the inventor established that the efficiency of a particular size of switch was related to a rate of incoming data packets. Four Banyan switches were simulated: the 2×2, 4×4, 8×8 and the 16×16. In each case, the rate at which data packets arrived at the switch per unit time interval was varied from 0% to 100%, in other words, from no packets at each input (0%) each clock cycle to packets arriving at all inputs every time unit interval (100%). The way the simulation provided for a varying arrival rate of input data packets was to introduce a "virtual" packet called the "Null" Packet. The Null Packet had the property of having no destination address but filled the timeslot of a normal packet. The switch algorithm was then able to ignore the Null Packet when routing all packets but still include an available time slot as a type of break in the data packet stream.

The simulation results showed, as expected, that any switch was able to properly route data packets with a high, first pass, success rate when few packets were sent to the switch (i.e.: high numbers of Null packets introduced). This was true for all switch types. However, in particular for the Banyan, the maximum rate at which data packets could arrive and still be routed with a high, first pass, success rate decreased as the size of the switch increased. A further measure was added to the simulation that included first-in first-out (FIFO) memory buffers at the inputs of each input port for each switch. The FIFO buffers could be used to store data packets that were unsuccessful in finding a unique path through the switch on the first pass and stored until they could be properly routed. The FIFO buffers then also gave the opportunity in the simulations to measure the latency of a data packet through the switch by tracking the average time the average packet remained in the FIFO. All simulations were done using a Monte Carlo style simulation approach of many randomly generated data packets over many thousands of time cycles for each switch system.

It was established that the level of efficiency for each of the Banyan switches decreased with a definite pattern. The 2×2 switch had an optimal efficiency of over 60% of high, first pass success rate for incoming data packets but was in fact disregarded because it is the smallest possible instance of switch. However, the 4×4 had an efficiency of 50%, the 8×8 had an efficiency of 33% and the 16×16 had an efficiency of 25%. These efficiencies inferred ratios of 2:1, 3:1, and 4:1, respectfully.

Since the goal of any switch is to attempt to have the highest possible first pass success rate given a continuous, 100% data packet arrival rate (i.e.: a packet arriving at every port on every time cycle), the concept of simultaneously using 2 4×4 switches, 3 8×8 switches, 4 16×16 switches to create a 100% capacity switch was considered possible. However, the scaling in resources for this type of solution would be completely unreasonable and would lead to many, large, cloned Banyan switches as the port size increased.

A novel solution however was established by the inventor by applying this scaling methodology to larger switches using instances of smaller switches. The 16×16 switch, for example, being divisible into an integer number (8) 4×4 switches. Similarly, the 64×64 switch divisible into 16 8×8 switches, and a 256×256 switch divisible into 32 16×16 switches.

By now using 2 4×4 switches for each 4×4 switch instance in the 16×16 switch, or 3 8×8 switches for each 8×8 switch instance in the 64×64 switch, or 4 16×16 switches for each 16×16 switch instance in the 256×256 switch, a dramatic performance increase with an almost linear scaling could be achieved.

The next aspect was to introduce the concept of spatial division multiplexing (SDM) to provide the independent paths for each "layer" of switches. The butterfly interconnect that defines the larger Banyan network needed to be broken to eliminate the dependency of the data packet routing, and hence collision. A version of crossbar interconnect, also known as a fully connected mesh, was employed as the SDM layer. Therefore, the 16×16 switch required 2 layers for all the pairs of 4×4 switches used, the 64×64 switch required 3 layers for all the triplets of 8×8 switches used, and the 256×256 switch required 4 layers for all the quadruples of 16×16 switches used.

The linear scaling of layers for exponentially larger switch sizes is clear, along with the linear increases in sub-switches required for each layer. Further, an almost recursive pattern can be defined for the novel architecture in that a 256×256 switch made up of 4 layers of 16×16 switches, can in turn have its 16×16 switches themselves substituted with 2 layers of 4×4 switches. Each of the groupings still having 100% data packet efficiency. Within the embodiments described the size of each switch and its sub-switches are based upon N×N switches where N is an integer and $N=2^X$ where X is a positive integer greater than or equal to 2.

Lastly, because the sub-switches required proportionally reduced input data packet rates, the 100% loaded input data packet streams at each input port were randomly multiplexed to each layer to maintain the maximum data packet rate for a particular sub-switch. For example, the 16×16 switch using 4×4 sub-switches required the input data packet rate to be split into 2 equal (but random) streams for each layer. This being referred to as "packet parsing." Of course, for the 64×64 and 256×256 switches, the input data packet streams were parsed into 3 streams and 4 streams, respectively. At the output port, the layers were required to be merged back together, after each layer had properly sorted the packets. This being referred to as "packet merging." Accordingly, the number of streams within embodiments of the invention is established in dependence upon one or more dimensions of the switch.

According to an embodiment of the invention, there is provided an architecture for a switching fabric that can provide very low switch latency for a fabric with M inputs and N outputs (where M can equal N). The switch fabric is based on multiple layers, "L," which is related to the size of the switch. The full switch fabric is based on a divisible number of sub-switches that are spread across the entire fabric connected through "L" layers of perfect-shuffle mesh interconnects. These sub-switches are based on any divisible switch architecture. Within an embodiment of the invention these may be based upon the Banyan switch architecture. Accordingly, in this embodiment of the invention each Banyan sub-switch is a portion of the original M×N Banyan switch required to complete the full switch. Accordingly, in the generalized instance each sub-switch is a portion of the original switch and is interconnected via one or more mesh interconnects depending upon whether sub-switch is an edge sub-switch or an embedded sub-switch (i.e. on a layer of sub-switches between an initial input plane of the L+1 layers or planes of M×M sub-switches (as there are L interconnects) and the final output plane of the L+1 layers of M×M sub-switches). The number S of sub-switches in each plane is established by N=M*S, where N, M and S are positive integers. Within embodiments of the invention for these sub-switches N is an integer and $N=2^X$ where X is a positive integer greater than or equal to 2.

Based upon the recursive structure then each M×M sub-switch is itself comprised of R+1 layers or planes of T×T sub-switches with R interconnects between them where the number U of T×T sub-switches in each plane is established by M=U*T. Within embodiments of the invention for these sub-switches M is an integer and $M=2^Y$ where Y is a positive integer greater than or equal to 1. As such each sub-switch can then itself be formed from sub-switches in a recursive manner. Optionally, each sub-switch may also exploit packet parsing and packet merging such that within the sub-switches another number of streams are employed where within embodiments of the invention this another number of streams is established in dependence upon one or more dimensions of the sub-switch. This recursive structure may repeat down through the design of the switch until the final lowest level of the recursive structure is formed from a 2×2 switch.

Accordingly, based upon the size of the switch and the type of sub-switches used, the layers can be optimized to maintain a 100% data packet arrival rate whilst loading each of the sub-switches to only their maximum rate of highest first pass routing success.

Accordingly, within an embodiment of the invention each layer of the L layers comprises a hybrid Banyan switch topology and perfect-shuffle interconnect mesh with a final L+1 layer comprising a hybrid Banyan switch topology.

Further to the embodiment of the invention, at each input port to the switch fabric, a method of parsing the input port's stream of data packets into "W" number of separate streams of packets directed to each of the sub-switches in a layer is implemented, where each of the "W" parsed streams of data is a randomly selected portion of the input port's data stream, so that each of the sub-switches in the first layer received "1/W" packets of the original stream (on average) from each input port. Further, "Null Packets" (packets that are "zero padded" and have no address assignment and are not considered by the switch) are introduced into the "W" parsed streams of data when real packets are not present. Conversely, at the output of each layer there is a method for merging the "W" output streams from all the layers to the appropriate output port. As noted within this specification "W" is established in dependence upon the size, N, of the N×N switch.

This merging algorithm may, for example, use a queuing memory to avoid conflicts but given the random assignment of packets to each layer at the inputs, and considering a reasonable degree of random address headers, the merging algorithm need only re-order the packets to create a steady, full output stream of packets.

Further, by using a distributed set of divisible sub-switches, the control for the large switch can employ simpler, faster, less intensive control algorithms which are associated with each sub-switch. Accordingly, control can be distributed to the set of divisible sub-switches further improving a robustness of embodiment of the invention as a failure in a controller only impacts part of one layer of the overall switch.

Each sub-switch control algorithm greatly reduces computational requirement along with associated lower power consumption over the larger switch fabric, this is a function of the $(M/2) \times \log 2(N)$ number of control signals required for a Banyan switch. Further, the embodiments of the invention by virtue of exploiting a spatial division multiplexing architecture support multiple paths through the switching fabric such that, if for some reason, a partial failure occurs in the fabric the impact is reduced.

This re-routing of packets allows for continual system operation (albeit at the cost of performance and sub-optimal latency and with possible contention and loss-of-packets typical of standard systems). However, it does not require a fully redundant switch fabric in "standby mode" with its associated cost of ownership.

Accordingly, within an embodiment of the invention a novel architecture is presented based on a set of divisible Banyan "sub"-switches interconnected using a plurality L layers of perfect-shuffle mesh interconnects that provide for M inputs and N outputs.

In order to remain independent from any of the possible physical layer technology implementations (such as optical fiber, copper transmission lines, VLSI transistors, Clock cycles, SERDES inputs and outputs, etc. . . . ) and focus on the attributes of the architecture itself, the determination of performance and latency within this specification is based upon the depth that the FIFO memory buffer must hold delayed packets and not their unit of time. A FIFO memory that becomes full and can fit no other packets is evidence that the switch is not performing well. But a FIFO memory that has zero or close to zero packets stored at any one time indicates that the switch performance is doing well. Therefore, latency is determined from the number of packets stored within a memory buffer at any one moment thereby avoiding the confusion of specifying a specific time unit (such as "microseconds") and simply references everything through equal "time-steps." Note also that latency of the physical "time of flight" of the connections within the switch are not considered here, these are a measure of how quickly signals propagate along a path (such as copper wires or optical fibers). However, it is assumed that best efforts are made to reduce these "time-of-flight" issues as much as possible and that most, well-engineered systems will have equivalently low "time-of-flight" latencies.

Furthermore, as described above, the memory buffers used within the switch are used to mitigate the effects of packet contention. However, they are of finite size and can only store a certain maximum number of packets. For example, if all memory buffers only ever store, at maximum, a single packet before it is subsequently forwarded on again, then this would have ideally "zero" switch latency associated with the switch. However, if a memory buffer is caused to "overflow" (meaning it cannot store any additional packets and all subsequent packets must be "dropped") then this would indicate an ideally "infinite" latency (at least for some packets). No protocols (such as TCP/IP) are assumed in the architecture description, only a direct measure of the throughput of the switch is being analyzed. Memory FIFO buffer sizes have also been chosen to be representative of the real situation, along with the packet lengths. While real world FIFO's and packet lengths can have many thousands of bits, the architecture described here represents these cases with small and simply constructed data structures.

It is also assumed within this analysis that the switch architecture is a fully synchronous system and that all packets are of the same length. Although this is not representative of real-world packet traffic, most switches in use today convert incoming packet traffic so that it becomes both synchronous and has equal, or at least conveniently segmented packet data payload lengths once inside the switch core fabric memory. This is done primarily because of the computation and processing algorithms performed inside the switch cores and a necessity of modern processor architectures.

Simulations of traffic patterns can be difficult to match with real world packet flow in large networks, although several standard random variable methods have been used such as the Poisson, Bernoulli, and Binary random variable approaches. These random distribution models can emulate the random arrival rates and what is referred to as the "bursty" nature (i.e., a number of consecutive packets followed by an arbitrary length of time without any packets) of data packets in networks. Most of the random variable probability functions also offer the possibility of closed-form solutions when modeling with Markov-chains and using queuing theory.

The modeling technique employed within the analysis by the inventor is based on random arrival rates but assumes a continuous stream of generated packets (i.e., random in their header addresses), but otherwise having absolutely no breaks or down-time between packet arrivals for every input port, i.e., a 100% loading at each input port.

A drawback of this particular model is that is does not model the real-world packet dependency. In other words, the relationship that sequential packets might have for the same specific addresses. This is a noticeable feature in network architectures; many sequential packets may all require access to the same output port, or many inputs may be trying to access the same output port at the same time (i.e., many users all directed to the same server). This type of data collision does not really have a specific solution, independent of the architecture used, except for making buffer queues long enough and/or having to "drop" packets or prioritize packets.

Figure 11:
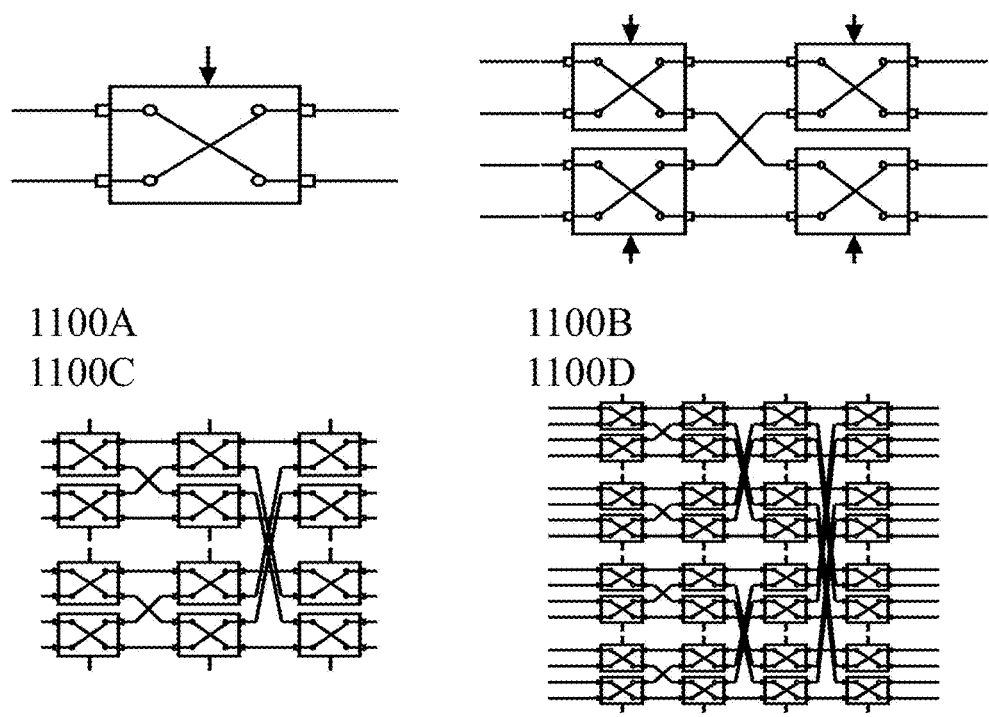
FIG. 11 depicts schematics of 2×2 Banyan, 4×4 Banyan, 8×8 Banyan, and 16×16 Banyan switches.

A2: Initial Switch Analysis:

The 2×2, 4×4, 8×8 and 16×16 Banyan switches shown in FIG. 11 in first to fourth images 1100A, 1100B, 1100C and 1100D respectively, were first analyzed for their performance. However, to exercise each switch, a simple algorithm, which was easily scalable for any size switch, was developed. The algorithm was based on a simple "if you can go" protocol and used a table look-up matrix that contained all possible combinations of control settings needed to route an input to an output. The algorithm started with the first input port and assessed the packet header address of the incoming (randomly generated) packet. Being the first packet, the algorithm set the required switches for the packet and proceeded to the next input port to assess its packet header address. On subsequent packet header inspections, if all control settings could be set without interfering with the previous set by other packet headers, then these new control settings were also set. This included the possibility of "re-using" a control setting that could be used by more than one packet header as well. However, if a specific control setting was in conflict with the way it had been previously set, then this would require that the particular input port with its packet would not get access to the switch fabric and it would have to wait or be buffered in a memory queue. One additional measure was used to "randomize" the "first port" so that the physical "first port" of the switch fabric would not always have 100% access to the fabric. The first "physical port" (i.e.: port 1) would be randomly assigned to an arbitrary "switch fabric port" to do essentially a re-shuffling of all the physical input ports on each access to the switch fabric.

It should be noted that this simple algorithm did not include any features for mitigating issues such as the so-called "head-of-the-queue blocking" (where a packet at the head of the queue blocks other packets behind it from successfully accessing the switching fabric), nor did the algorithm have any type of re-circulating or feedback paths.

Figure 12:
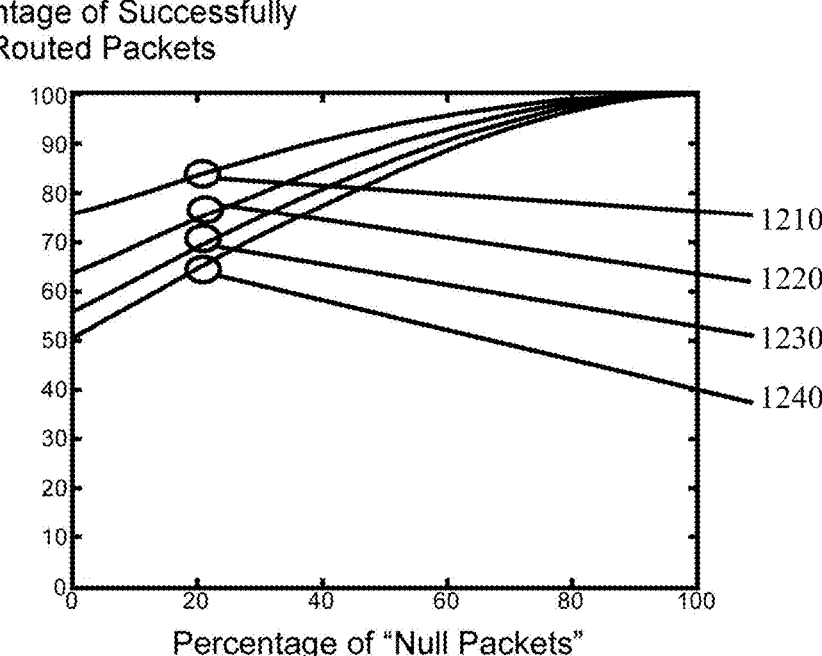
FIG. 12 depicts a plot of successfully routed packets versus Packet "Null Packet" Input probability, for each of the 4 Banyan switches depicted in FIG. 11.

The performance data for each of the switch sizes is shown in FIG. 12. The plot's vertical axis shows the percentage of successful packets through the switch fabric. On the horizontal axis, the percentage of "Null Packets" used as part of the input port data streams is given. The "Null Packet" as described above, is simply a packet that is equivalent to sending "nothing" and takes the place of a real packet. The switch and the algorithm are able to ignore this packet, and it serves as a "temporal space" in the flow of data packets with respect to other real packets on the other input ports. The simulation used a Monte-Carlo approach and used more than 10,000 randomly generated packets for each of the input ports for each of the switch sizes. This generated stable ratios of successfully routed packets per total number of packets for each iteration of "Null Packet" percentage.

In FIG. 12, when all input ports have a continuous stream of packets (where it is 0% "Null Packets"), the larger switches successfully route less packets than the smaller ones relative to the size of the switch. The "high-level" reason for this is simply that the Banyan switch, as it becomes larger, has increasing opportunity for paths to be in contention with other paths due to the larger number of cross-over interconnects in the later stages of the switch. Of course, in the extreme case where all input ports are sending ~99% "Null Packets" (furthest right on the horizontal axis), then "theoretically" 100% of the data traffic can be routed through the switch fabrics, which is why the graphs asymptotes towards 100% at the far upper right. The graph shows the raw packet performance for the 2×2, 4×4, 8×8 and 16×16 switch matrices in plots 1210 to 1240, respectively.

The introduction of "Null Packets" in each of the input port data streams was simulated by randomly replacing a real packet with a "Null Packet" based on a variable percentage probability set between 0 and 100 percent for any given iteration of the simulation.

To continue this analysis, the next step was to determine the efficiency of the switches and algorithm when input FIFO (First-In/First-Out) queues were added to each of the input ports. First to fourth Images 1300A to 1300D depict how the FIFOs were configured as part of the 2×2, 4×4, 8×8 and 16×16 switch fabrics, respectively. The FIFO queues 1310 were capped at 200 memory locations, so that they could only hold 200 packets. Whilst an arbitrary limit the inventor considered this large enough to see noticeable trends in the analysis. If the algorithm forced a FIFO to keep its packet, then the queue would get bigger by 1 packet at the next iteration of packet routing, unless, of course, the FIFO received a "Null Packet" wherein the FIFO would be allowed to disregard the storing of "nothing."

Figure 14:
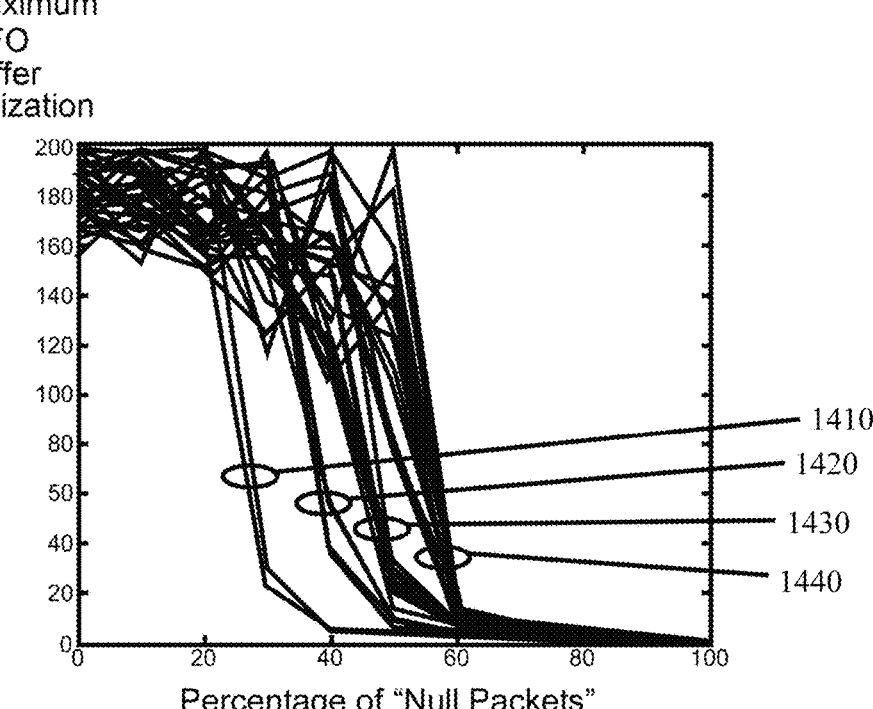
FIG. 14 depicts a plot of the performance data of maximum FIFO buffer utilization versus "Null Packet" input probability, for each of the 4 Banyan switches depicted in FIG. 13.

Now referring to FIG. 14 there is depicted a plot of maximum memory FIFO buffer utilization on the vertical axis and the percentage of "Null Packets" on the horizontal axis. Using the same Monte-Carlo simulation approach as before, it showed that when the "Null Packet" rate is very high (towards the right of the plot), the usage of the FIFO's is quite small, namely under 10 memory locations are used. However, as the "Null Packet" rate decreases (and more real packets are sent in each input port), there is a point where the size of the FIFO queues become unstable and begin to rapidly accumulate packets in their buffers until, at very low "Null Packet" rates, the FIFO queues are constantly being over-flowed. The most noticeable trend, however, is that for each size Banyan switch there is a specific "Null Packet" rate where it becomes unstable, i.e., where the rapid vertical rise of the graph as it passes from 100% to 0% "Null Packets" (moving right to left). The trend suggests that smaller Banyan switches have better latency performance than larger switches and depicts the maximum FIFO queue sizes reached for the 2×2, 4×4, 8×8 and 16×16 switch cases as depicted in first to fourth plots 1410 to 1440, respectively.

If an arbitrary choice of approximately 5 packets is used as the maximum FIFO usage, then, if a line is drawn horizontally from at the 5-packet mark on the plot until it intersects with each group of lines for each switch size, roughly 50% for the 4×4, 65% for the 8×8 and 75% for the 16×16 is obtained.

An extension of the base Banyan architecture can now be developed. If the original full M×N Banyan switch can be decomposed into smaller sub-switch blocks, then the overall latency through a group of such decomposed sub-switches can be lower than the original M×N Banyan switch if a specific "Null Packet" rate can be maintained through each sub-switch. The other aspect is the interconnect needed to connect many smaller sub-switches together in a useful manner.

An appropriate and fully distributed interconnect is the fully dilated, perfect-shuffle mesh interconnect. A perfect-shuffle mesh does not, by itself, constitute an "intelligent" switching architecture, in fact, if M inputs broadcast to each of N-outputs, then the M perfect-shuffles of N-links would simply be "everything connected to everything." This takes no sorting power but leads to the receiver having to select among all the broadcasted packets. Therefore, as a compromise, some amount of "switching" power is introduced by way of the sub-switches.

Figure 15:
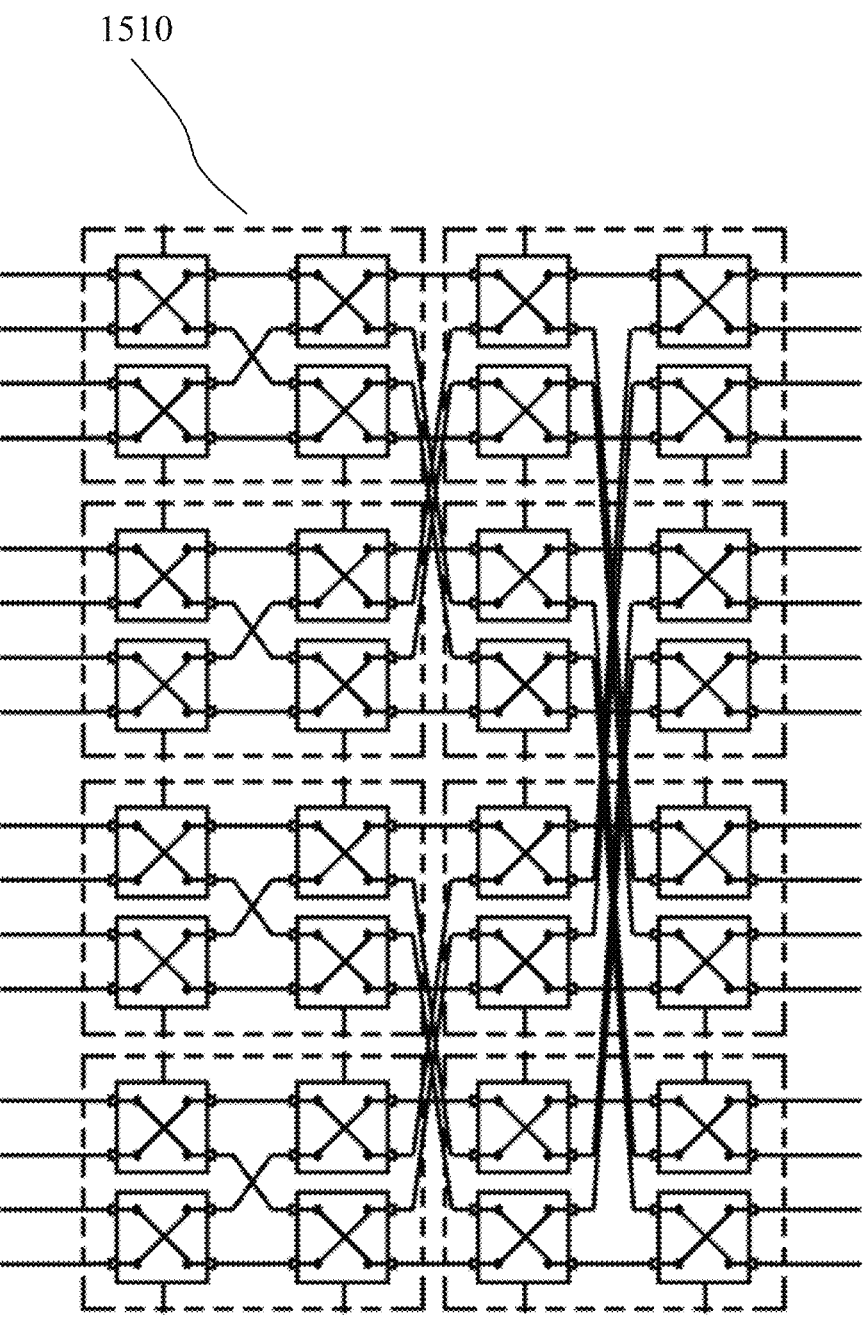
FIG. 15 depicts a schematic of a 16×16 Banyan switch architecture with 8 dashed boxes indicating the 4×4 sub-switches.

The way that the sub-switches are distributed among the fabric is also important. FIG. 15 shows the same full 16×16 Banyan switch as depicted in FIG. 3, but with the 8 sub-switches 1510 outlined in dashed boxes. Then, in FIG. 16, these sub-switches are rearranged in 4 groups 1610 to 1640 respectively, so they can take advantage of a symmetric 4×4 perfect shuffle mesh interconnect 1650.

Figure 16:
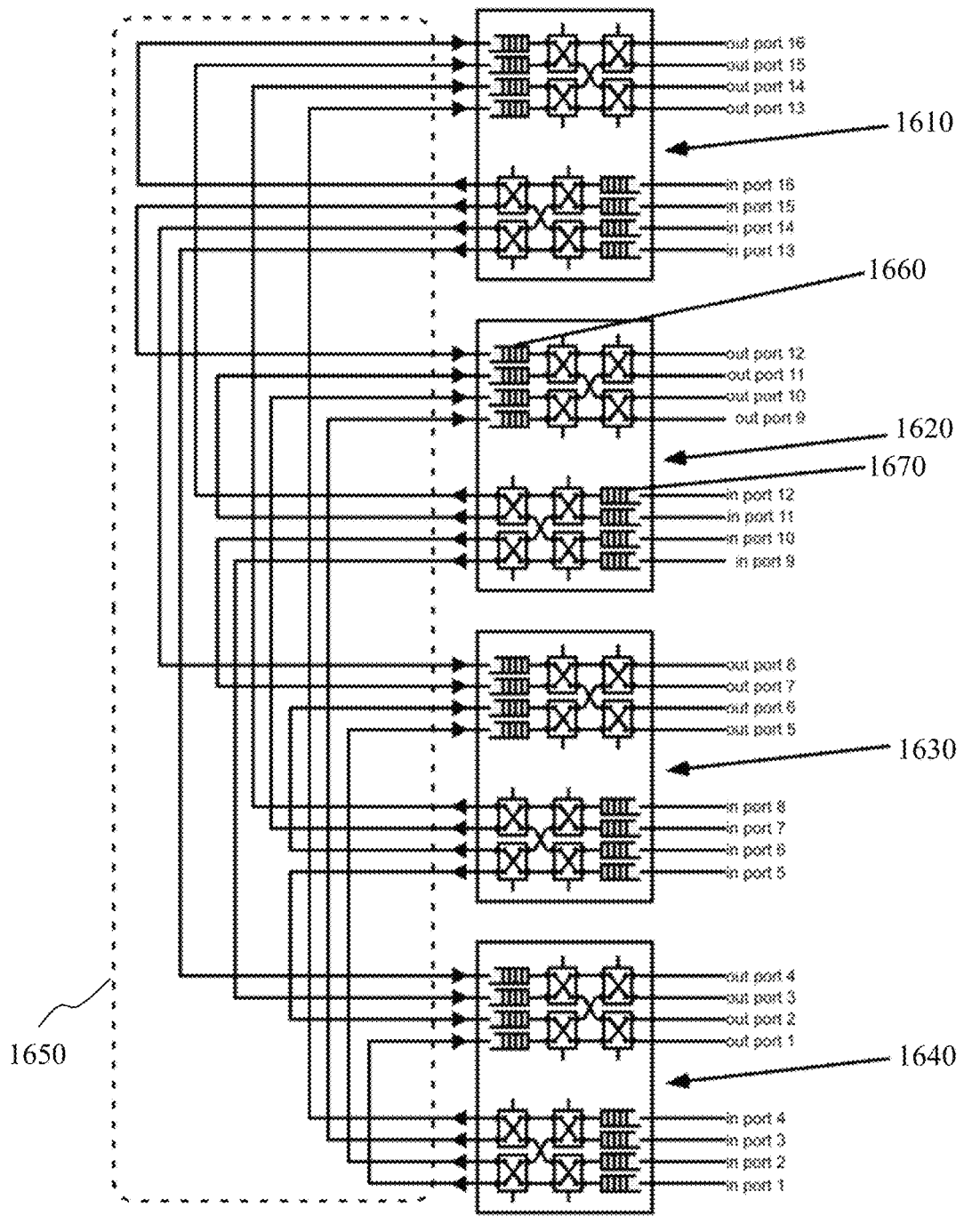
FIG. 16 depicts a schematic of a single layer of the distributed, layered architecture implementing 8 4×4 Banyan sub-switches and 1 perfect-shuffle mesh interconnect.

In addition to the sub-switch arrangement and the mesh interconnect, each of the sub-switches, in FIG. 16, require their own FIFO memory buffer queues at each of the inputs from the port of the mesh side 1660 and 1670, respectively. The FIFO memory is spread more uniformly throughout the entire system.

Figure 17:
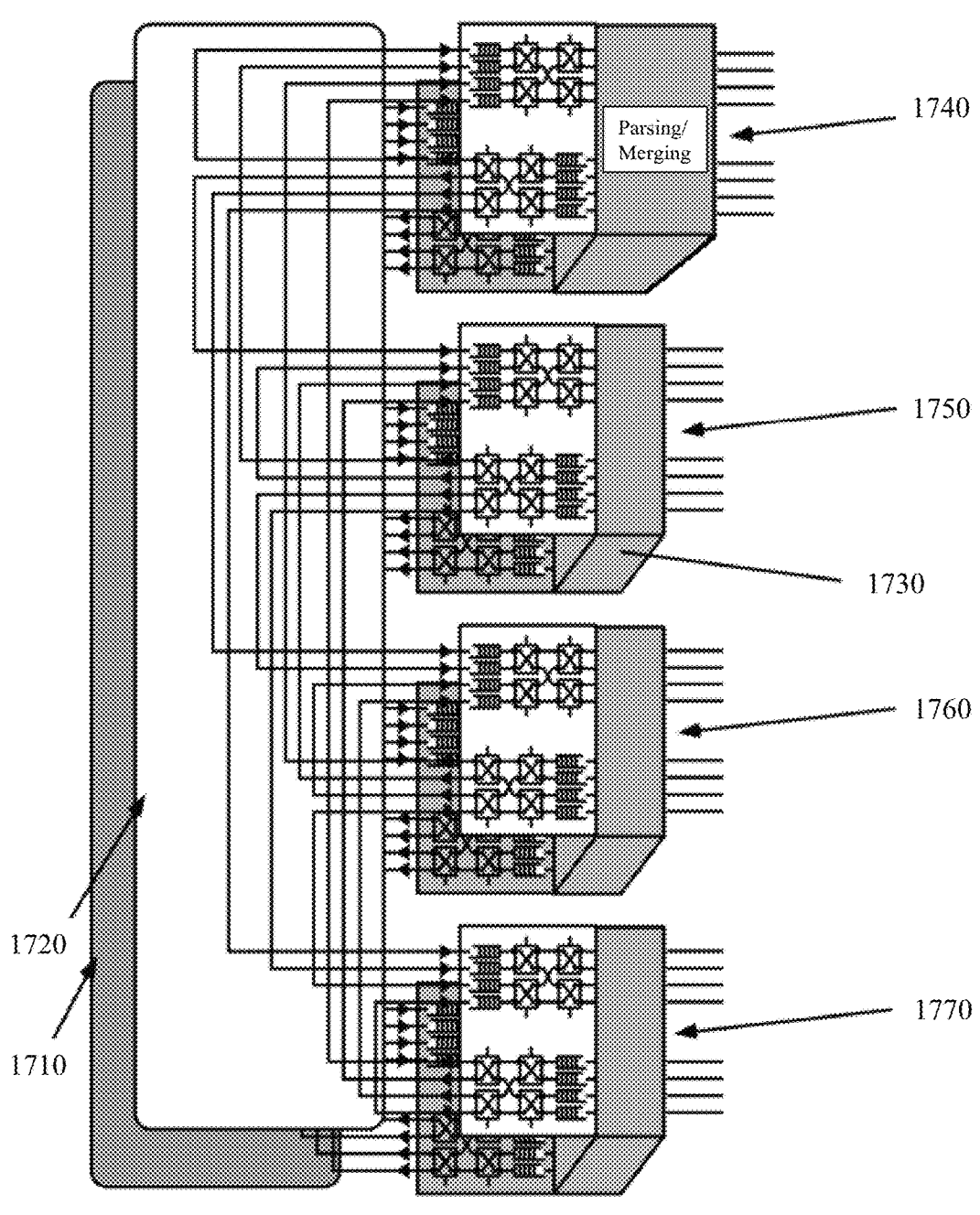
FIG. 17 depicts a schematic of a complete distributed, layered architecture implementing 2-layers (L=2) of 8 4×4 Banyan sub-switches and perfect-shuffle mesh interconnect.

The next step is to take advantage of the stable "Null Packet" rates as described in FIG. 14. For example, the 4×4 Banyan switch had a stable "Null Packet" rate of 50%, this suggests that if the constant 100% occurring random packet streams at each input port were divided by 2, such that 2 50% loaded random packet streams were created, and then directed to 2 separate and independent layers based on 4×4 Banyan switches, then none of 4×4 switches would have FIFO queues that would be much more than 5 packets deep (on average, and assuming fully random and independent packet header addresses). FIG. 17 shows the 2 layers 1710 and 1720 (i.e., L=2) where each of the 4 nodes has 4 input/output ports connected using 2 perfect-shuffle mesh interconnects. The parsing and merging section 1730 for the input and output data ports are also shown and common to the 2 layers. Each of the 4 "dual-nodes" 1740 to 1770, respectively.

By implementing 2 layers, the architecture takes advantage of traditional spatial division multiplexing (SDM), in that 2 independent physical "spaces" are used to accommodate the data paths, where only a portion of data is attributed to either data path.

Figure 18:
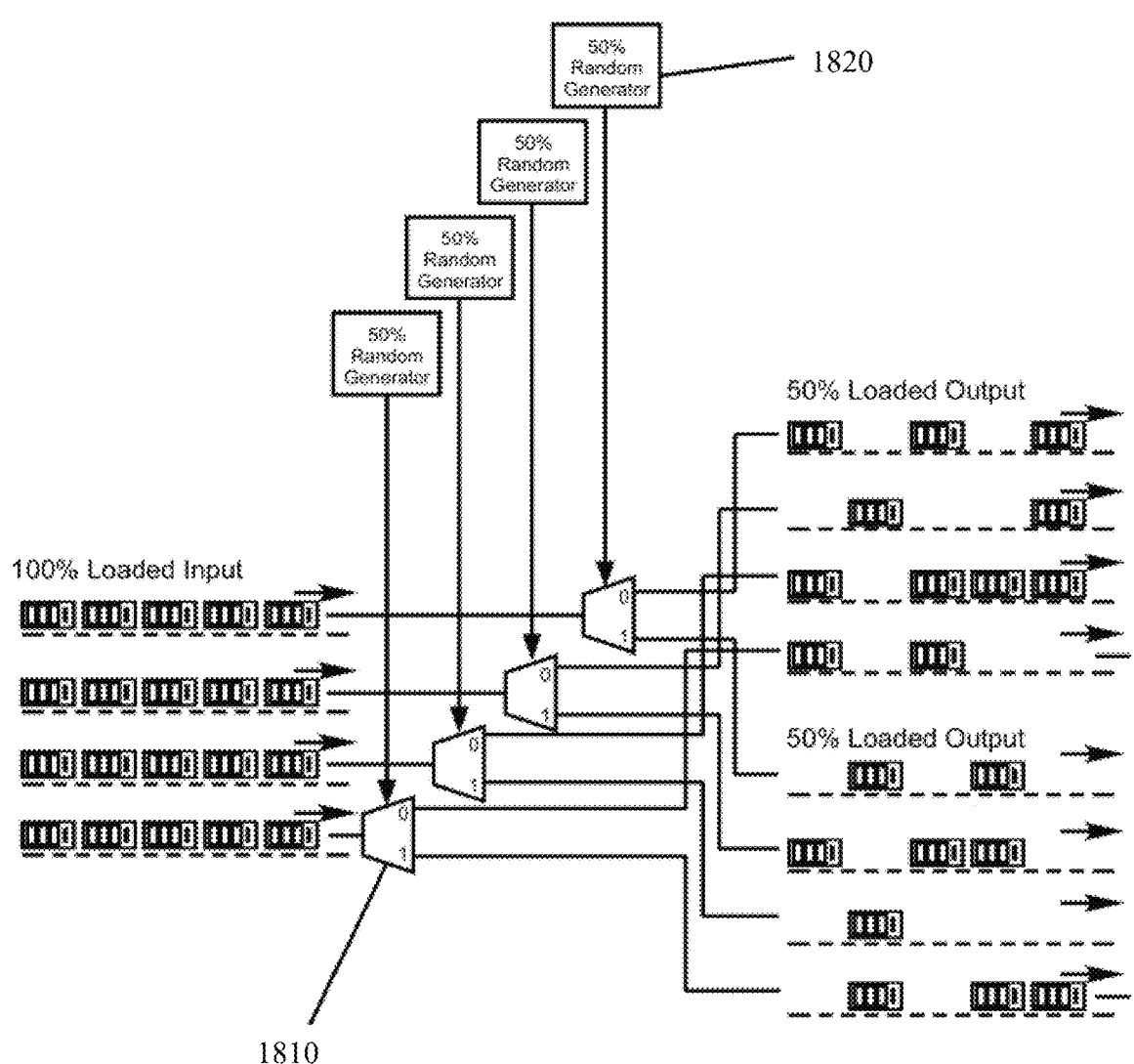
FIG. 18 depicts a schematic of a simple parsing circuit for separating one 100% loaded input stream into 2 50% loaded streams using a random selector.

The parsing of a 100% constant stream of packets into 2 50% streams involves a simple circuit shown in FIG. 18, using multiplexers 1810 and a random port selector 1820 (based on a PRBS 2n–1 polynomial) and a way to introduce "Null Packets" into the "non-selected" path (not specifically shown for ease of description, but easily constructed). This parsing circuit can, of course, be easily extended for "by 3", "by 4", and higher parsings.

Figure 19:
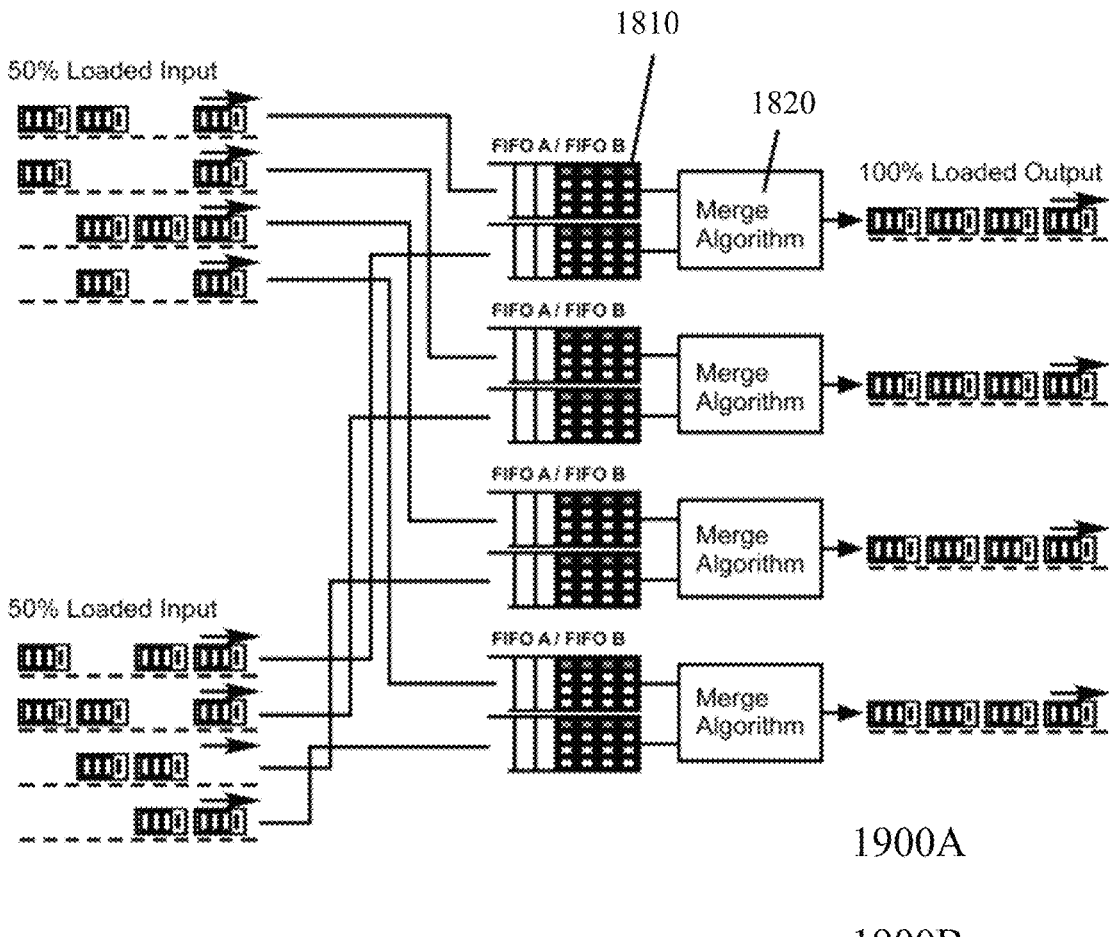
FIG. 19 depicts a schematic of a merging circuit for combining 2 50% loaded streams into a single 100% loaded output stream using a random selector and a FIFO memory buffer.

The merging circuit, for the output ports, requires a slightly more involved algorithm that has to deal with 2 streams of data from each of the 2 layers (in the case of the 16-port example being discussed). The merging algorithm must use a FIFO queue as well, such that if packets arrive from the 2 layers at the same time, then they both can be managed without packet loss. Even though, both layers contain only 50% loaded data streams (on average) and should in theory be able to be merged back into a single 100% data stream, the issue is absolute arrival times of the packets in each layer. FIG. 19 in first Image 1900A depicts 2 FIFO queues 1910 and a merging block 1920. Second image 1900B in FIG. 19 shows an example "simplified" textual version of the merging algorithm.

Figure 13:
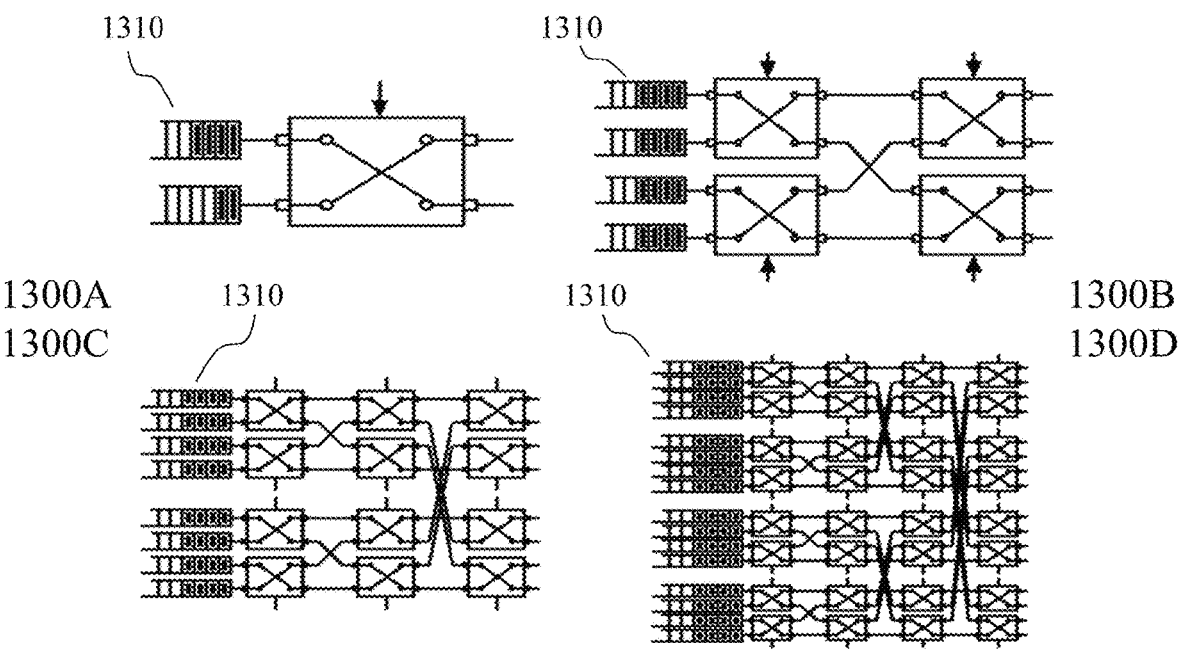
FIG. 13 depicts schematic of 2×2 Banyan, 4×4 Banyan, 8×8 Banyan, and 16×16 Banyan switches that include First-In First-Out (FIFO) memory buffer queues on each input.

Next, to demonstrate the superior latency performance of the 2-layer architecture versus the original Banyan switch, the new 16×16 distributed architecture shown in FIG. 13 (with the 2 layers) was simulated against an equivalent pair of 16×16 Banyan switches using the equivalent parse and merge technique. The results are plotted in first and second Images 2000A and 2000B in FIG. 20 and show that the maximum FIFO buffer queue sizes for this distributed layer architecture (first Image 2000A) perform much better than the maximum FIFO buffer queue sizes for the 2 16-port full Banyan switches (second Image 2000B). This is also observable from the initial simulations presented earlier, in FIG. 14, the 16×16 Banyan switch was not stable for a 50% "Null Packet" rate. Note also that the highest values of FIFO buffer utilization were in fact NOT the internal FIFO buffers associated with the 4×4 sub-switches, but the Merge-Algorithm FIFO buffers. This suggests also that if an output port could be augmented to allow for 2 "output" paths (i.e.: like an output "port 4*a*" and an output "port 4*b*"), then absolutely no packets would be dropped or lost independent of the type of real-world traffic loading that the input ports might have.

Figure 21:
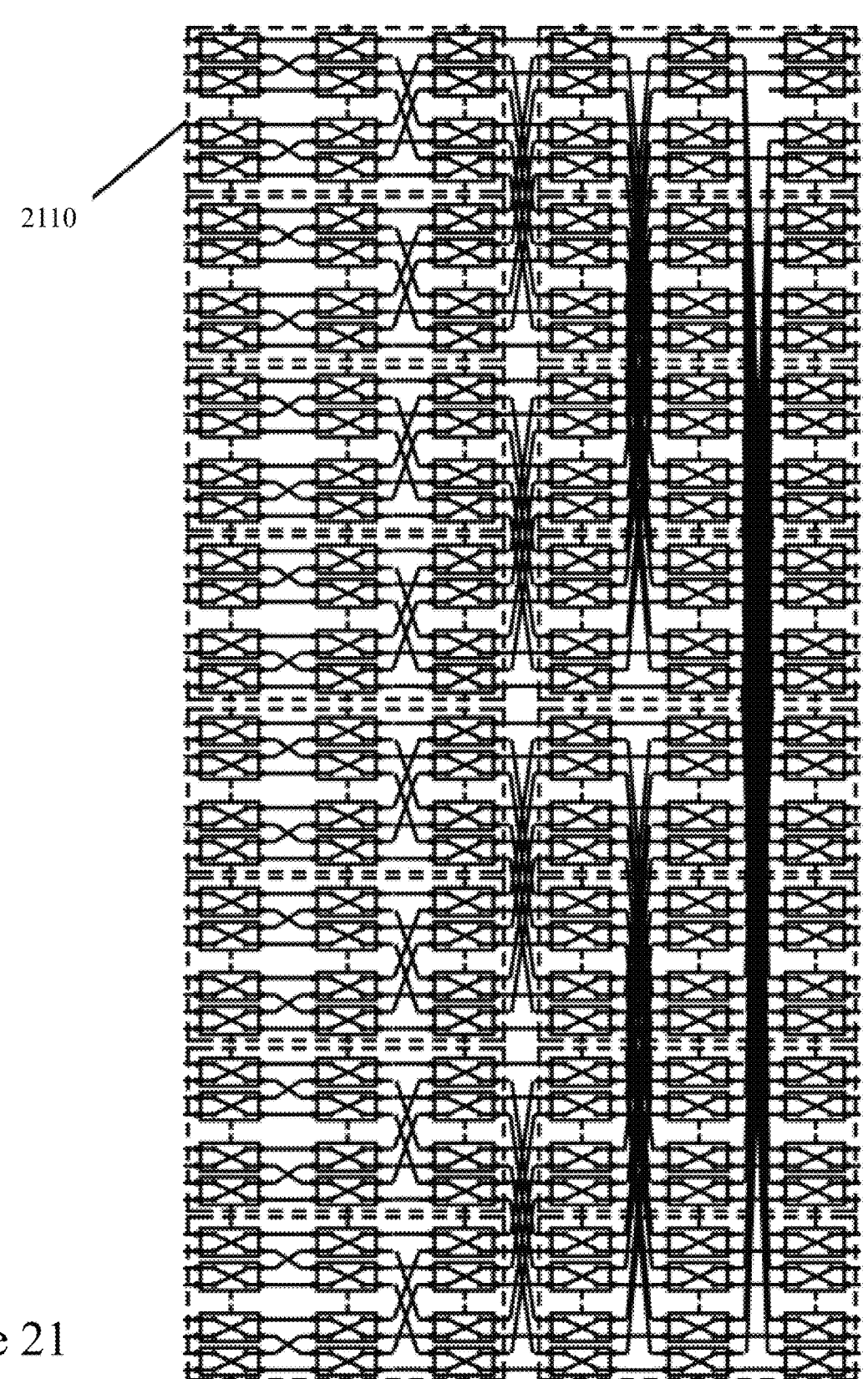
FIG. 21 depicts a schematic of an example 64×64 Banyan switch architecture with 16 dashed boxes indicating the 8×8 sub-switches.
Figure 22:
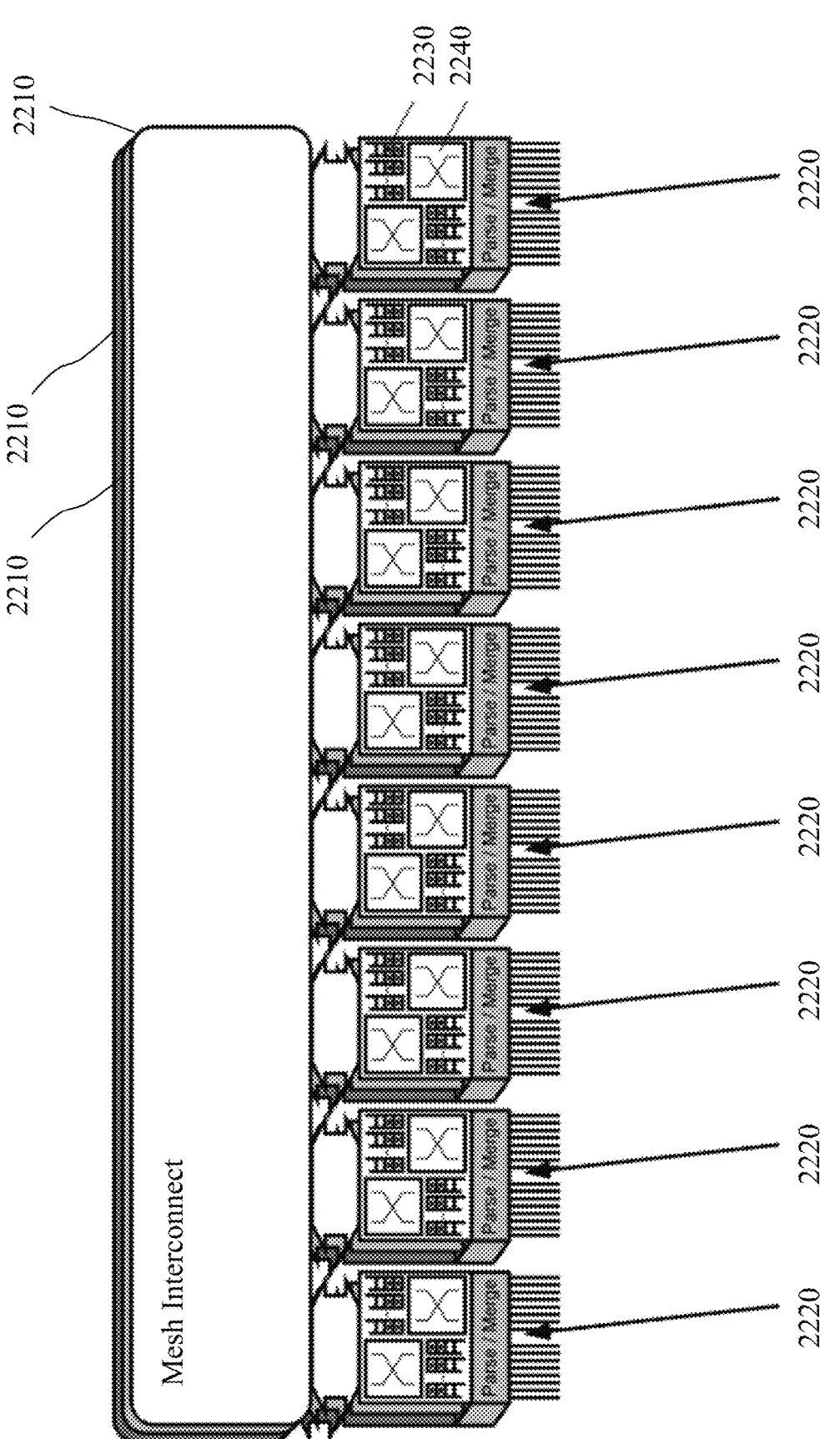
FIG. 22 depicts a schematic of a complete distributed, layered architecture implementing 3-layers (L=3) of 16 8×8 Banyan sub-switches and perfect-shuffle mesh interconnect.

FIG. 21 shows the full 64-port Banyan switch which can also be sub-divided into 16 8×8 sub-switches 2110, as indicated by the dashed boxes. The distributed and layered version of this new architecture with 3 mesh interconnects 2210 (L=3) is shown in FIG. 22. The number of layers (L=3) is obtained by looking again at the simulation results of FIG. 13. The FIFO queues 2230 and the sub-switches 2240 are depicted. A stable FIFO queue is obtained at a "Null Packet" rate of 66% for the 8×8 Banyan Switch. Hence, a data stream that provides for 33% (i.e.: ⅓rd) real packets will provide stability. Therefore, the parsing and merging algorithms are all expanded to convert a single 100% fully loaded input data stream into 3 33% loaded data streams. Each of the 8 "tri-nodes" 2200 being depicted.

Much larger switches can also be arranged from smaller sub-switches and mesh interconnects. A 256-port switch can be made from 128 16×16 sub-switches and a 4-layer mesh interconnect. Again, as depicted in FIG. 13 stable performance is achieved at around a 75% "Null Packet" rate (i.e.: ¼) real packets are needed per layer. First image 2300A in FIG. 23 depicts shows a representative chassis, with electrical mid-plane 2310, that can accommodate all 256 ports with 16 I/O ports on each of 16 cards, along with a representative set of integrated circuits (ICs, "chips" 2320) that hold portions of the overall switch. The mesh interconnect is not shown for the sake of clarity but consists of 4 independent 16×16 perfect shuffles connected to each card. Second image 2300B in FIG. 23 depicts the 16×16 sub-switch, where each "chip" 2320 comprises at least 2 of these sub-switches.

This architecture can also be applied to switches of other dimensions. The ones presented thus far were easier to simulate or visualize because the 16×16, 64×64 and the 256×256 can all be based on even numbers of 4×4, 8×8, and 16×16 sub-switches. Other size switches simply require combinations of sub-switch sizes and/or non-symmetric perfect-shuffle mesh interconnects.

The redundancy of the sub-switches is also an important aspect of the architecture. Instead of using an independent "standby" switch fabric in traditional switch architectures, as shown in FIG. 6, which is only used if there is a failure in the main switch fabric, the distributed architecture uses all sub-switches and mesh interconnects at the same time, but in a less loaded manner. Therefore, if a portion of the switch fails, all traffic could be routed through other paths. This defaults to a more traditional packet-loss scenario with more possible contention but would continue to function as a tradition switching system until a repair could be made.

A3: Energy and Efficiency

In terms of efficiency and overall power consumption, one of the main objectives of this proposed architecture is that the algorithms used to route traffic through the switch fabric are simple. The number of actual transistors required for the switch fabric itself is not very high, in fact, the 4×4 Banyan switch using CMOS pass-thru gates would not require more than 32 transistors. Even the larger 64×64 Banyan would only require 1,500 transistors (an exceptionally few number of transistors for a very large scale integration (VLSI) CMOS IC).

However, the algorithm used to compute the control states of the switch based on the interrogation of the packet header address can require an exceptionally large amount of compute power, something that normally requires the number-crunching power of a dedicated CPU within the switch.

The algorithm that was used to perform the computations for the results discussed herein may not be the most efficient or the most effective one possible, but it is common to each of the switch sizes analysed. This provides at least a common metric with which to compare traditional switch architectures with this distributed and layered architecture. More complicated algorithms that increase the efficiency of the switch may also use techniques that require much more computing power such as "look-ahead" address optimization (this is where the algorithm hunts for the best combination of packets, regardless of where they are situated in the memory buffers, in order to produce the highest number of successfully routed packets through the switch). This indeed takes very fast and very complicated processing and is likely very necessary for the present-day large switch fabrics because of the way these systems are architected.

It is the combination of the distributed switching fabric (using SDM techniques to match the optimal performance of the sub-switches) and the simple "go if you can" algorithm that produces a lower overall power consumption and complexity reduction. Given the very simple technique used here to check each header address and set switches and given that the complexity of this type of algorithm, for larger switches, grows exponentially, both power and complexity are optimized when the sub-switch size is kept as low as possible.

Again, without the need for detailed transistor-level simulations or experiments, the number of "Lines of Code" for the algorithms can be used to compare them. The number of "Lines of Code" is comparable to the complexity, the number of transistors and/or the number of compute cycles the algorithm requires to complete the task and is therefore comparable to the overall power consumption of the algorithm. For example, the algorithm for the 4×4 Banyan switch required a total of 301 "Lines of Code", whereas, for the same type of algorithm, the 16×16 Banyan switch requires a total of 8,097 "Lines of Code". By implementing a distributed 16×16 switch using 8 4×4 switches, the total number of "Lines of Code" was only 2,408, i.e., only 29.7% of the full switch. For a larger example, a full 256×256 Banyan switch required more than 4.2 million "Lines of Code" (for this algorithm), however, using 32 16×16 switches, the total "Lines of Code" is only 260,000, only approximately 6.3% of the full switch algorithm. Any other equivalently applied algorithm for a set of divisible sub-switches will have this same trend.

A further example of energy efficiency by virtue of the distributed arrangement of smaller sub-switches is that load balancing and load detecting schemes could be used to reduce power consumption. If the parsing and merging sub-systems have sensing circuits to detect low loading periods on particular ports, then entire flow-layers and sub-switches could be powered-down during periods where few input ports are active, or when many input ports have low packet arrival rates.

A portion of the flow-layers would of course always remain active, the switch would not necessarily "turn-off," and larger loading periods would be adaptively managed by the power efficiency algorithms.

Figure 24A:
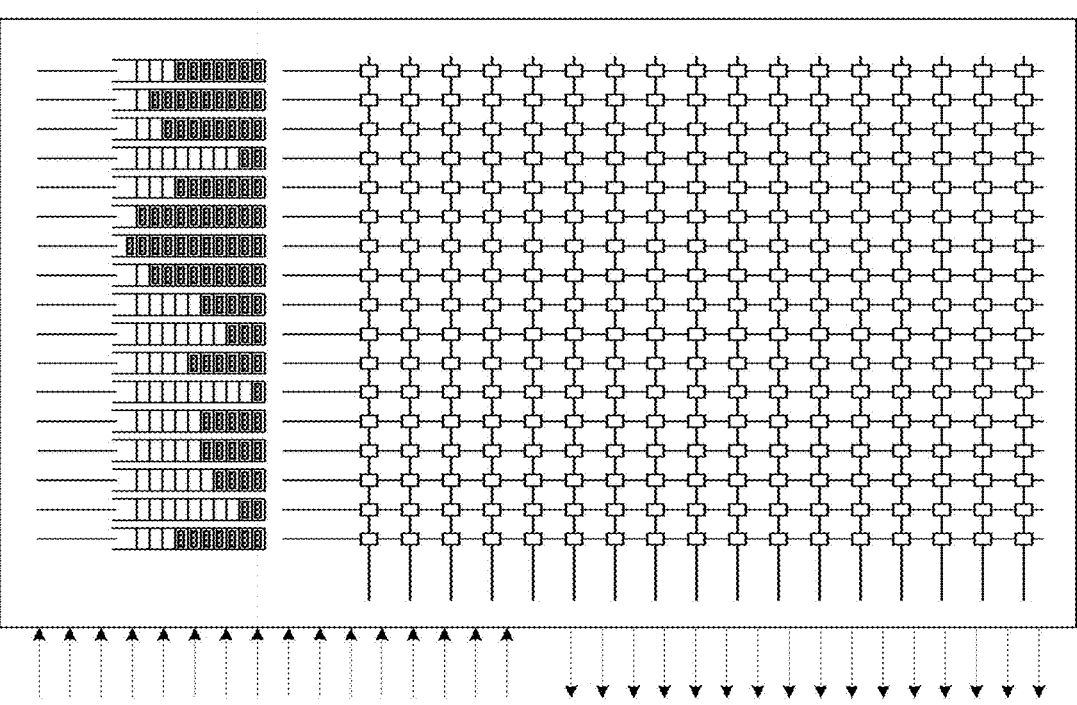
FIGS. 24A to 24B depicts schematics of the physical layouts of 16×16 crossbar and 16×16 Banyan switches respectively.
Figure 24B:
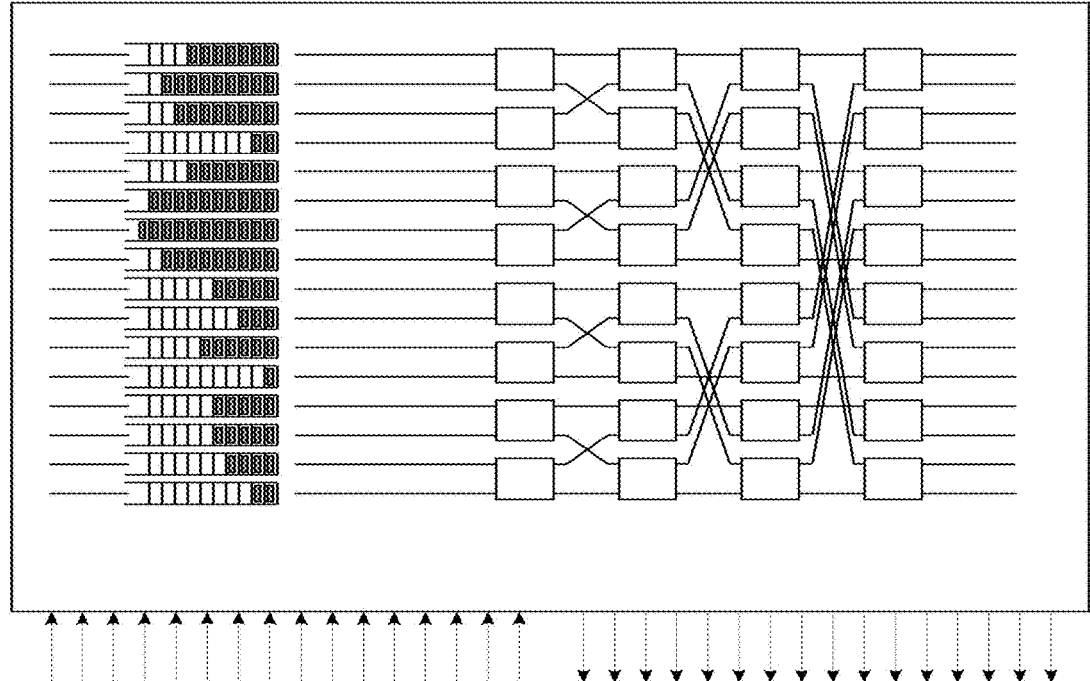
Figure 24C:
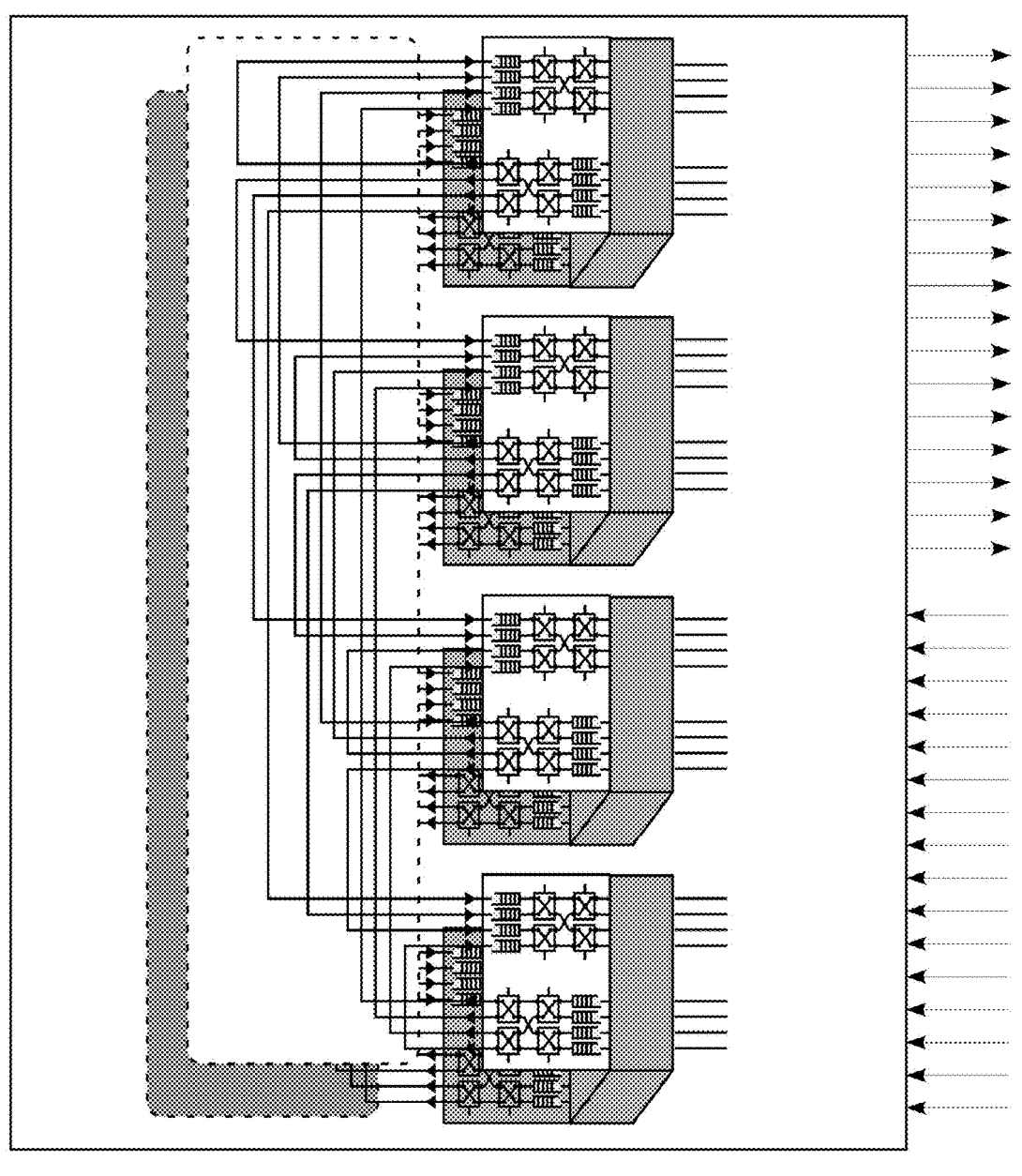
FIG. 24C depicts a schematic of a 16×16 low-latency switch according to an embodiment of the invention.
Figure 25:
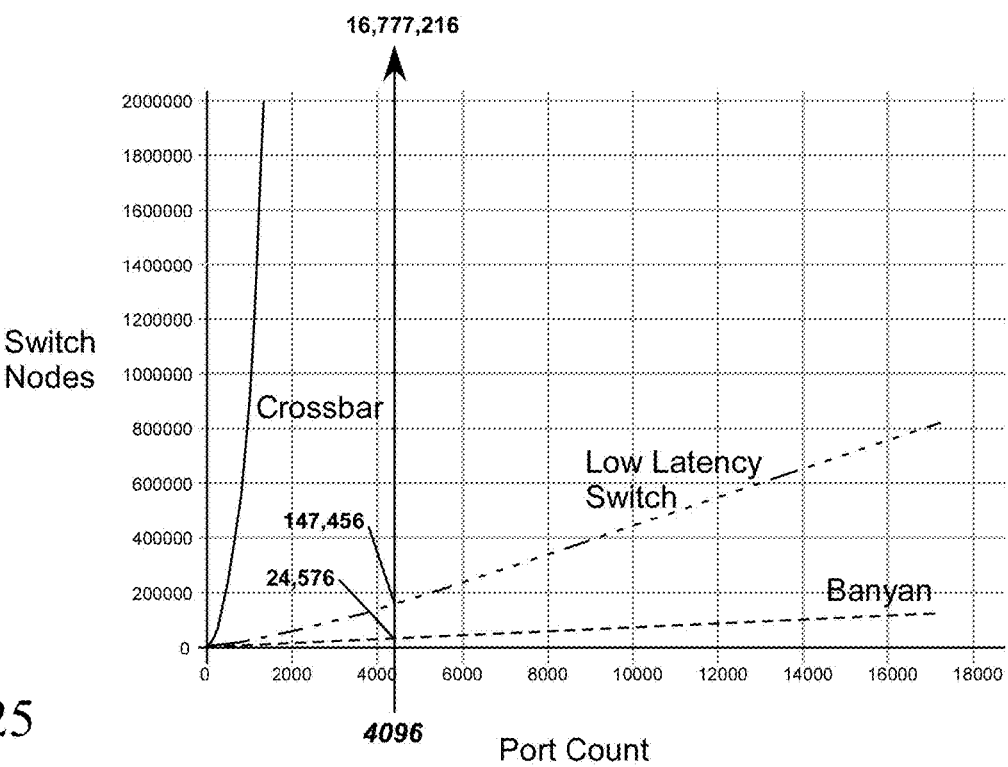
FIG. 25 depicts a plot of an Order Complexity (O(N)) in terms of the number of nodes, links and FIFOs for prior art crossbar, prior art Banyan and low-latency switches according to an embodiment of the invention versus port count.
Figure 26:
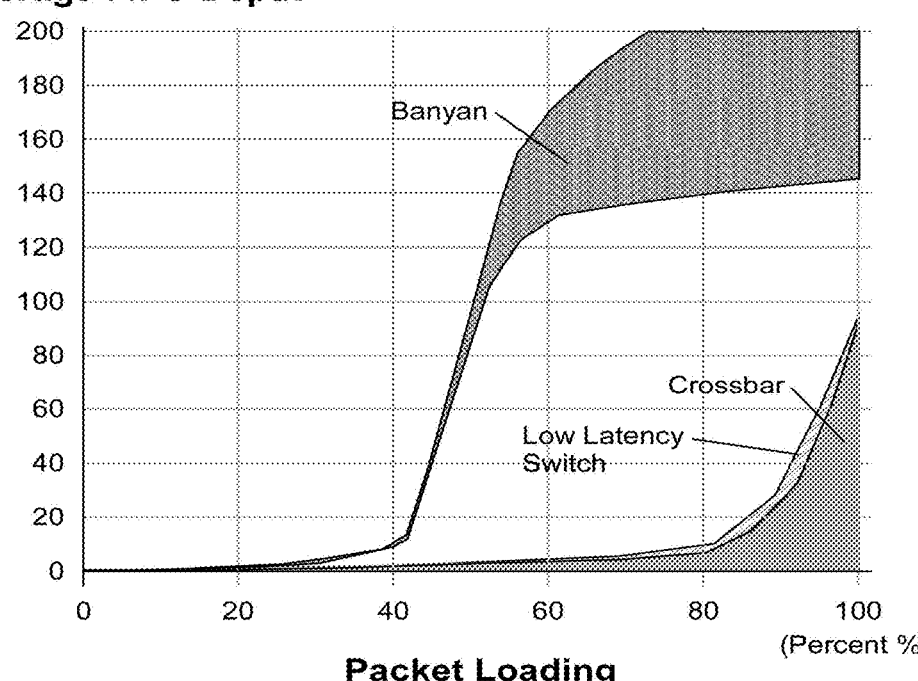
FIG. 26 depicts a plot of average FIFO depth as a measure of for prior art crossbar, prior art Banyan and low-latency switches according to an embodiment of the invention versus packet loading.

Lastly, a comparison of the 3 architectures: 1) the cross-bar, 2) the Banyan, and this 3) inventive low-latency switch architecture is given for a representative 16×16 switch. In FIGS. 24A, 24B and 24C physical representations of the crossbar, Banyan and inventive low-latency switches are presented. Analyzing each of the 3 types of architectures, a general set of complexity formulas can be derived for the number of a) nodes, the number of b) links, and the number of c) memory FIFOs required. These "Orders of N" 'O(N)' equations are shown in FIG. 25 for these switch matrices showing the number of switch nodes as a function of port count. It is seen that the low-latency switch architecture has a complexity closer to the Banyan, and many orders of magnitude smaller than the crossbar. In FIG. 26 the simulated performance of each architecture, based upon identical packet and algorithm methods used in each architecture, is presented for the three architectures where the FIFO buffer depths are plotted as a function of packet loading. From FIG. 26 it is evident that the inventive low-latency switch architecture has the same performance as the crossbar, whilst the banyan shows significant packet loss. Accordingly, the inventive low latency switch architecture provides a means of scaling a switch to achieve high packet loading comparable to the crossbar but without the node requirements of the crossbar.

A4: Optical Interconnects

As previously discussed, one of the main objectives for traditional architectures has been the reduction of physical resources to reduce costs. The Clos network, for example, uses sub-switches in the form of crossbars, with mesh interconnects between layers. However, using more mesh layers than what CLOS networks suggest has not normally been a cost-effective method for building a network, simply because mesh interconnects also require significant amounts of resources when it comes to traditional electrical, copper transmission lines on backplanes.

However, whilst the inventive architecture presented above has been described within no dedicated physical layer implementation, such as copper or optical links, the ability to provide large numbers of low-cost optical links provides an alternative framework to the electrical backplanes of the prior art and a low cost framework for implementing this multi-layer, mesh interconnected architecture.

By implementing the perfect-shuffle mesh interconnect as an optical fiber shuffle, any number of mesh layers and sizes of shuffle can be implemented for a very low cost of production and assembly. Distributing these shuffles can also be done in a cost-effective manner by incorporating the optical connectors and meshes into a representative switching chassis that is standard in the industry. Further, wavelength division multiplexing (WDM) enables the number of optical fibers to be reduced.

Furthermore, parallel optical-electrical modules and optical engines are now becoming cost effective ways to link boards within a system, especially as the data rates increase above 10-Gbps. The electrical power required for the more traditional electrical signaling methods has been increasing steadily because of the signal compensation techniques required to correct for the corrupted and distorted electrical signals. The cost of the high-speed electrical connectors and the more expensive copper/dielectric materials for the printed circuit boards is increasing as well, not to mention the initial costs associated with proper EMI designs and simulations to perfect the electrical path as much as possible. This all leads to an overall total cost increase for the copper-electrical solution which makes the parallel optical engine solution simple and very cost competitive.

Finally, although this low-latency switch architecture does not have a specific physical implementation, in other words, the network links and nodes and switches may use any convenient technology (such as transistors), the distributed nature of the architecture can be augmented in terms of performance if optical technologies, such as optical fiber, photonic devices, silicon photonics and lasers and detectors can be used. In the absolute extension of the physical implementation, the concept of using photonic "logic" might also further increase performance removing wholly or at least partially the dependence on electrical signaling and the eventual limits of microchip technologies.

B: Digital Optical Processing Logic

The basis of all computer processing, from simple AND-gates and OR-gates up to the largest of central processing units (CPUs) and graphics process units (GPUs) has exclusively relied on the electrical device called the "transistor." The transistor subsequently has been reduced in size and increased in sheer number within todays ICs to the point where incredibly complex processing systems can be constructed such as artificial intelligence computing, neural networks, and the data storage and sorting associated with modern data-center platforms. Transistor counts today can be counted for the largest circuit in the billions or tens of billions.

At its most fundamental level, the electrical transistor is used in the digital world to aid in the representation of inputs, instructions, memory, and outputs using collections of binary "lo" and "hi" voltage values (or "on" and "off" states) of the circuits that are further representations of a system based on "0" and "1" logic values—the so called binary "bits" inside the computer. These transistors are a form of electrically controlled switch that can be combined in different structures that form a physical representation of the Boolean Logical system on which all computation is based today (except, perhaps, that of quantum computing).

Boolean logic is a mathematical construct that defines and assigns specific relationships to notions such as the word "and" or "or" for a given set of inputs resulting in a given output. However, Boolean logic does not specifically require electricity or transistors. Boolean logic has been shown to work in mechanical gearing systems, and can be, in theory, applied to any well-defined physical system where fundamental rules of logic can be applied.

As the trend in transistor miniaturization seems to be drawing to a close, with transistor sizes reaching less than 3.5-nanometers (or the equivalent of about 3 glucose molecules), it is possible that the continuous improvements of ever more powerful computing systems relying on transistor density and sheer quantity of devices alone may start to slow its impressive rate of year-to-year performance improvement—the so-called "end" of Moore's Law. Admittedly, there are a few more exotic "electrical switch" technologies in the technology pipeline, such as FINFET transistors, or exotic carbon nanotube technology on the horizon, and many integrated packaging techniques are being developed that could keep performance rates increasing for a while still. However, the physical size of the transistor, does not have much more to shrink until it is into the world of quantum effects. However, an even more difficult aspect of this scaling paradigm will be to mitigate is the power consumption—and more specifically, the power density. The difficulty of removing ever more thermal energy produced within the same physical sized microchip, because of more transistors, is proving to be the most difficult aspect of this future growth. The thermal problem is a further limitation to indefinite size reduction with increased speed, because of the simple physics of the base materials (like silicon) and their heat conduction limitations. Lastly, and likely the most impactful of all the reasons for the eventual limits of the electrical transistor in computing systems will be the overall cost of implementing the fabrication plants. For example, over US$20 billion was spent by the Taiwanese Semiconductor Manufacturing Corporation (TSMC) to implement the smallest commercially available transistors at the 3.5-nanometer node size. This does not include the price for individual chip designs requiring mask sets that can exceed US$10 million nor does it include the actual cost of the fabrication runs themselves.

The challenges that we face going forward with transistor technology do not only strictly apply to the "computing" portion of our world's digital systems, but also will impact the means by which we move, sort, and distribute all this data though the Internet itself. The same transistor technologies that go into producing the computing structures also apply to the switch and router chips that manage incoming data and how it is passed along to the appropriate output (the familiar mail sorting system). The types of machines that are used to connect all of our devices together, whether those are personal home devices plugged into the web, or compute-server machines in a datacenter, will also suffer from a stagnation in transistor advancement.

There are many other secondary and tertiary impacts, such as testing, reliability, yield, and packaging along with software and algorithm development that also impact greatly the continued growth (or lack of) in our computer and switching systems. These fields, along with the electrical transistor, will certainly remain mainstream technologies and continue to develop and improve over the next decades, but the rate of their improved performance may not be at the speed that we have all come to expect.

B1: Summary

Fundamentally, the electrical transistor is a structure that uses electrons to control other electrons. The properties of the electron are such that it can interact easily with itself as a charged particle. The electron can also be manipulated to create both electric currents as well as electric fields. Without diving too deeply into the physics of the transistor, these two states have allowed device physicists to create "transistor switches" from materials like silicon that are able to manipulate the flow of electrons (currents) based on applied fields (voltages).

However, the benefits that come from electron-electron interaction to create a switch also come with drawbacks. For instance, electrons also affect and get-affected by the medium they propagate in. What this means is that since they are electric charges they also affect, and are affected by, the metallic or semiconductor materials that make up the circuits themselves leading to detrimental effects. For example, the metallic wires that electrons are conducted along can cause the electrons to move slower, or charge slower, or sometimes resonate—with thereby changing the speed of the entire system. Furthermore, electrons can release energy into their surrounding materials in the form of absorption leading to lower than expected voltages at the end points. These effects are commonly known the "parasitic" effects of both capacitance and inductance. The degree to which these parasitic effects impact the performance of the transistor is very much a function of the physical sizes of the structures. The trend to reduce the size of the transistor is as much to increase their numbers as it has been to mitigate parasitic effects and operate the devices faster. Of course, the added benefit of greater density allows ever more complex tasks to be done, while increasing the speed of the system as the transistor gets smaller.

There is a small caveat to the interpretation of the transistor size being responsible for speed. While this is fundamentally true, it is also the distance between transistors that can be a limiting factor for speed. The fact that increased density of transistors shortens the distance between the transistors themselves is often an overlooked (albeit somewhat obvious) aspect of circuit design. For example, even if two of the smallest and fastest 3.5-nm transistors are place several centimeters apart, without particular attention placed on the geometry of metallic interconnect between them (i.e.: as a simple wire and not as a well-terminated impedance-controlled transmission line), the speed of operation is unlikely to be very high.

Therefore, one of the fundamental reasons that ICs work as well as they do is because their signaling distances are kept to the minimum possible between transistors and particular attention is placed on routing signals, clock distribution etc. This applies to both the "data" (information) signals as well as the "control" signals propagating on the metallic conductors and leads to chip architectures that use massive amounts of pipelining to march-step instructions, control, and data from one cluster of transistors to the next cluster. This is analogous to the well-known original concept that the Ford Motor company used to pipeline car production in an assembly-line to increase the rate of car output. Each assembly station is responsible for a small part of the whole, but it is very close to its next neighbor, and thus the whole line outputs a finished car on each march-step of the assembly-line. There are of course a multitude of algorithms and structures that computer designers have invented over the years, but the fundamental requirement of short transistor to transistor lengths is a key to most of their success.

B2: Optical Logic Gates

There has been a steadfast assumption for many decades that the only effective way to implement digital systems was to use the electrical transistor, acting as a switch, to implement Boolean Logic. This assumption has of course led to some of the most complex systems ever created such as artificial intelligence and machine-learning. However, the real goal of computing is to implement logic, and not particularly to use a "transistor" to do it.

The idea of using light as the fundamental particle instead of the electron has been a dream and a goal of many research programs over the past several decades. The development of the "optical transistor"—where photons are somehow made to interact, and control, other photons (analogous to the electrical transistor) offers the promise of reaching another level of even faster and (hopefully) more integrated devices for a future generation of computing. Alas, photons, by their nature tend not to interact with each other very well, and in order to get an interaction at all they are typically required to combine in a complicated crystalline type materials (like Lithium Niobate) where the light imparts strain on the atom's crystal structure in different ways to produce Stokes, Raman or Pockels type effects on the light itself or on other, lower energy light to produce a controlling mechanism. While it is still hopeful that these types of experiments will one-day produce an optical transistor, so far nothing has been produced that could be commercialized on any meaningful scale.

Figure 27:
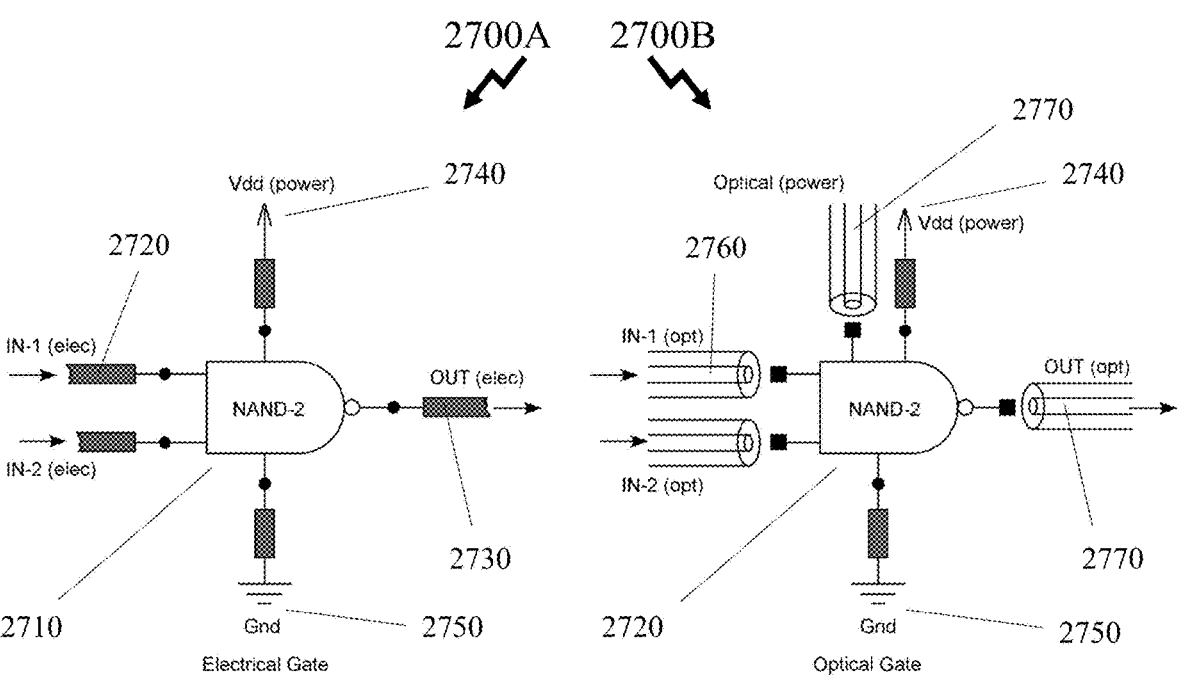
FIG. 27 depicts schematics of a standard electrical gate and a proposed optical gate according to an embodiment of the invention.

The invention described here very specifically describes a device that produces optical logic but is NOT an optical transistor. A generalized comparison between an electrical logical function and a proposed optical logical function is shown in first and second Images 2700A and 2700B respectively in FIG. 27. While both represent the fundamental 2-input NAND gate in electrical gate 2710 and optical gate 2720 representations respectively, the electrical logic gate 2710 uses uniquely electrical signals from the input wires 2720 and output wires 2730 with electrical power 2740 and ground 2750 suppling energy to the logic gate. In contrast, the optical gate 2720, uses optical signal inputs 2760 and produces optical outputs 2770, using both electrical power 2740 and ground 2750, but also an optical power supply 2770.

A very important aspect of this general description of the optical logic gate proposed in this invention is that it still requires electricity to function. However, as related to the discussion above about the distance electricity travels between electrical transistors, the electricity needed for the implementation of the logic function itself of the optical logic gate remains entirely inside the gate itself. Appropriate electro-optical effects and o-e and e-o conversions to implement the gate function are required, but the need for sending the results of this logical evaluation are propagated with only optical signals. All "data" signals and "control" signals for the gate are propagated optically, at the speed of light, without the electrical "parasitic" effects of capacitance and inductance. Clearly it is understood that technologies that use optical signaling such as transceivers and modulators, have shown remarkable speeds and distances therefore it is not unreasonable to assume that similar structures will also achieve great speeds with great distances. The transmission of light signals in a more complex optical logic structure should therefore allow the individual (photonic) devices to be separated by larger distances than transistors for the same speed.

By their nature, a photonic device's size is a function of its operating wavelength (such as the telecommunications wavelengths around 1.55 micrometers (μm)) and roughly dictates the minimum device size in the 10's or 100's of micrometers range. Typically, photonic devices are normally many times larger than the smallest transistor devices (perhaps 1,000 times bigger relative to the 3.5-nm transistor), thus limiting their ultimate density on a single chip. It is possible that other structures in the future may result in smaller photonic devices, leading to better density, but the same principles here should still apply. However, even this lower density today can still provide 100's to 1000's of optical structures on a single chip substrate (1-cm×1-cm in size typically) and has been demonstrated within the area of silicon-photonics design multiple times in the literature. This lower density, however, is still enough to create interesting and complex logic structures. In addition, the lower density, and the need to spread devices apart have the added benefit of spreading the power consumption over larger areas, and thus maintaining the benefit of very easily cooled systems done by natural convection. This is hugely impactful, as many large computing and switching systems based on electrical transistors are now using more than 50% of the total energy they consume to cool the very chips they are using.

Figure 28:
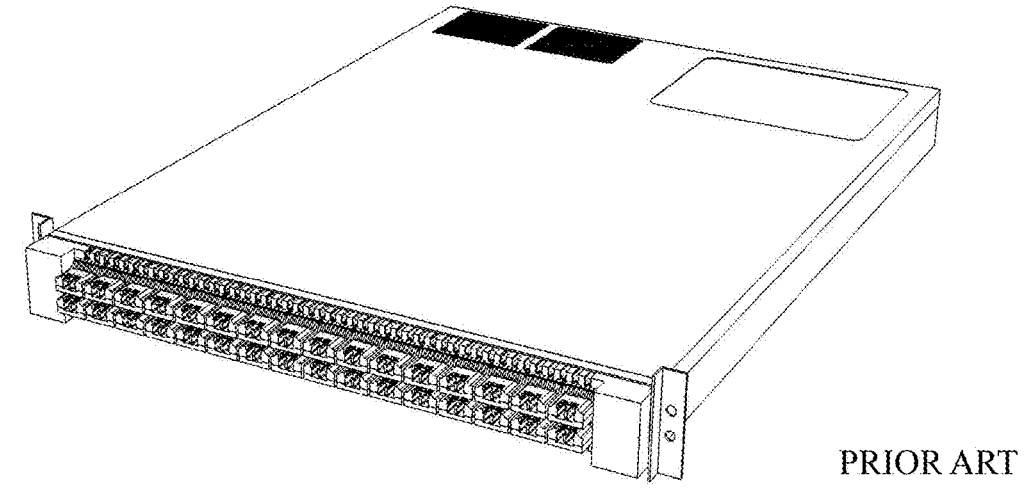
FIG. 28 depicts a 128-port top-of-rack switch module according to the prior art.
Figure 29:
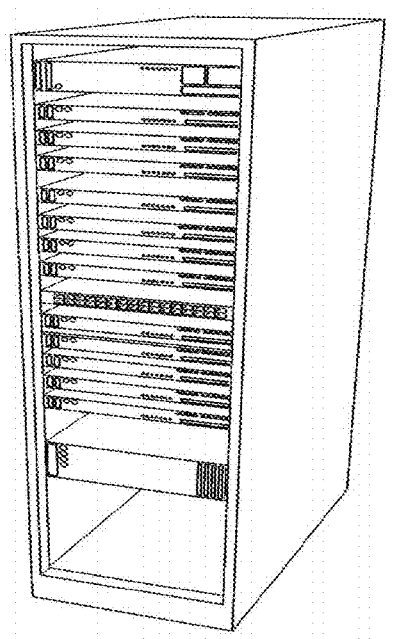
FIG. 29 depicts a prior art data-center cabinet with multiple of servers and an electrical switch.

This concept of going "bigger" to go "faster" is then an integral part of the way larger optical computing and switching systems can be created. The understanding that an equivalent logical set of optical devices, used to implement a particular logical function, will in fact be physically larger in total area and volume than the equivalent electrical system. However, the size increase between the electrical solution and the optical solution would be approximately the difference between the size of a pizza-box and the size of a refrigerator. This references the typical size of a 1 U 128-port top-of-rack Ethernet switch, FIG. 28, and the size of the rack holding the server-cards below it in FIG. 29. Therefore, this system form-factor is still well within industrial norms and expectations.

An additional aspect of a complex optical logic gate function would involve the physical packaging of the chips and the interconnect lines themselves between these chips. These lines would in fact have to be optical fiber (likely versions of single mode optical fiber), and therefore require novel and dense methods to couple light into and out of the photonic chips. Fortunately, there are numerous examples of these types of couplers for optical packages that use optical fiber links. Many of these couplers have already been demonstrated in the academic and industrial prior art. These couplers have been shown to be highly efficient while providing numerous pathways for the optical signals. The signals contained in the optical links can also use more elaborate including encoding techniques involving wavelength division multiplexing, quadrature-amplitude modulation, and even polarization states to increase the total bandwidth between devices while reducing the total numbers of optical fiber connections—thereby simplifying interconnect complexity.

Another added benefit of connecting the fiber interconnects directly to a distributed set of optical logic functions is that that signals travelling on these optical fiber links do not require specific external "transceiver" technology. The tedious step of converting between optical and electrical signals using external transceiver modules is entirely related to the type of dense electrical packaging required to access a single microchip with billions of transistors. A dense microchip has typically been packed using a 1000 solder ball connections or pins, because of the microchip's small size and because of the expected high-speed of the signaling, the overall system requires fine copper traces lines that are fanned-out to optical transceiver modules in-order to achieve the number of connections and data-rates desired. With the high data rates preserved in the optical domain and independent of size or distance using distributed sets of optical logic functions, a physically larger and less dense optical system can be as effective as a small dense electrical system—while distributing its thermal effects over larger areas and scaling to as large an area pr volume as desired.

Lastly, cost and fabrication are enormous advantages of such optical logic devices. The technologies required to implement photonic devices—especially those in the area of silicon photonics—currently use much less advanced process nodes to create physically larger structures. Much less expensive and older silicon wafer processing (around the 1-um and 0.8-um nodes) can be targeted instead of the extremely expensive 3.5-nm technologies, while still offering device speeds greater than 50-Gigabits per second. This performance using simpler production fabrication has also been well documented, published and productized in the market in terms of optical filter and modulator devices. Orders of magnitude lower costs can overcome the slightly physically larger form-factors required along with the added requirements for more external optical fiber cabling as well.

According to an embodiment of the invention, there is provided an optical logic device that primarily uses light as inputs and produces light as an output to implement a logical Boolean function but that is assisted by internal electrical circuits. The optical logic device will require electrical power but also require a source of optical power. The optical logic device is not limited by the distances of propagation as electrical circuits are while it maintains very high data modulation rates.

Although densities of optical logic devices will be less than their electrical counterparts for the foreseeable future, their distribution over large areas while maintaining their operational speed, allows for much better power dissipation.

Optical logic gates configured into small, distributed functional block with high bandwidth optical interconnections allow for an uninterrupted physical scaling of systems and the ability to increase in complexity as the systems increase in size.

Within embodiments of the invention the optical logic devices are described, depicted, and implemented based upon the technology platform of silicon photonics. However, it would be evident that the general principles outlined below can be applied to other photonic platforms including, but not limited, compound semiconductor photonics and organic photonics.

The optical logic device also targets fundamental and well-known device structures that have been implemented and well studies in other areas of silicon-photonics.

Within embodiments of the invention the optical logic devices are described, depicted, and implemented using elements such as waveguide Mach-Zehnder interferometers (MZIs), circular ring resonators, photodetectors, diodes, waveguide splitters, thermal tuning devices, doped delay line paths and other structures. However, it would be evident that other elements may be employed without departing from the scope of the invention.

Within embodiments of the invention the optical logic devices are described, depicted, and implemented employing electrical circuit structures such as transistors to both receive and transmit optical signals where these devices can be integrated into the physical layer technology platform or be post integrated such as by flip-chip die attach onto the optical chip. However, it would be evident that other elements may be employed without departing from the scope of the invention.

Within the following description an optical signal is denoted by a letter, e.g., F, A, B, etc.) whilst their logical inverse (complementary) are denoted by $\overline{F}$, $\overline{A}$, $\overline{B}$, etc. where within the following specification these are denoted by Fbar, Abar, Bbar etc. for ease of representation and reproduction.

A first embodiment of the simplest device structure uses the well-known 2×2 Mach-Zehnder waveguide interferometer (MZI). The 2×2 MZI (hereinafter MZI) has inputs comprising complementary constant optical power signal (P and Pbar). The simplest MZI device structure uses a complementary (A/Abar) optical control signal that terminates in optical photodetector diodes, which in turn though appropriate simple circuit design and some electric currents, acts on the delay line diodes within the arms of the MZI device, which lead or lag the propagating signals in the MZI producing either a "lo"/"hi" or a "hi"/"lo" output state (F/Fbar). The pairing of the photodetector diode(s) and the phase-modulation diode are important elements to the function of novel optical logic device.

More complicated logical functions are now also possible, given at least 2 complementary optical control signals (A/Abar and B/Bbar) and using combinations of series and parallel diode-diode logic, functions like NAND and NOR gates can be implemented.

Other embodiments of the invention may exploit, as described below, optical ring resonators with doped waveguide regions to interact with the diode-diode combinations as described to create single-ended devices with potentially faster response times.

The simplest optical logic gate device structure can in turn be used to create multiple possible devices using positive and negative feedback. For example, optical inverters can be constructed, along with optical resonators, and optical operational-amplifiers (Optical Op-Amps). These structures employing feedback can also be used stabilize and/or tune and/or balance optical elements such as MZIs or ring resonator structures in order to mitigate the effects of process variation.

In another embodiment of the invention, the individual optical gate structures are patterned together on a single substrate or chip to produce a larger and more complex logical function like an adder, a multiplexer, or a clocked flip-flop for example. These larger chip assemblies may require an optical power supply (which the inventor refers to as a continuous wave (CW) optical power supply (equivalent to a DC electrical supply) implying a constant optical power level rather than a time varying (or AC) optical power level together with an electrical supply for active elements such as photodiodes, laser diodes, semiconductor optical amplifiers (SOAs), These "active" photonic elements may be implemented through techniques such as in-situ growth, selective area epitaxy, grating, bonding, flip-chip bonding etc. although other techniques such as van de Waals attachment of epitaxially lifted-off elements etc. may also be employed together with others to be developed without departing from the scope of the invention. A laser diode may, within embodiments of the invention be a Fabry-Perot (FP) laser, single wavelength distributed feedback (DFB) laser, or a multi-wavelength laser.

In yet another embodiment of the invention, these chips are optically packaged using a variety of optical fiber coupling techniques like butt-coupling, grating coupling or photonic wire bonding, and still additional separate silicon chips are coupled together with optical fiber links to produce even larger functions and systems.

The details for the design and operation of an optical logic gate according to embodiments of the invention are described below. However, it would be evident that the general design assumptions can be applied to other optical structures and may also apply to other system that could benefit from limiting the distance of electrical signals such as those in analog designs for amplifiers, RF signal transmission and mixing and analog-to-digital (digital-to-analog) converters.

Within the following embodiments of the invention a fundamental structure that will be employed to describe the optical logic design and operation, without limiting the embodiments of the invention, is the waveguide Mach-Zehnder Interferometer (MZI) fabricated using the silicon photonics platform.

Figure 30:
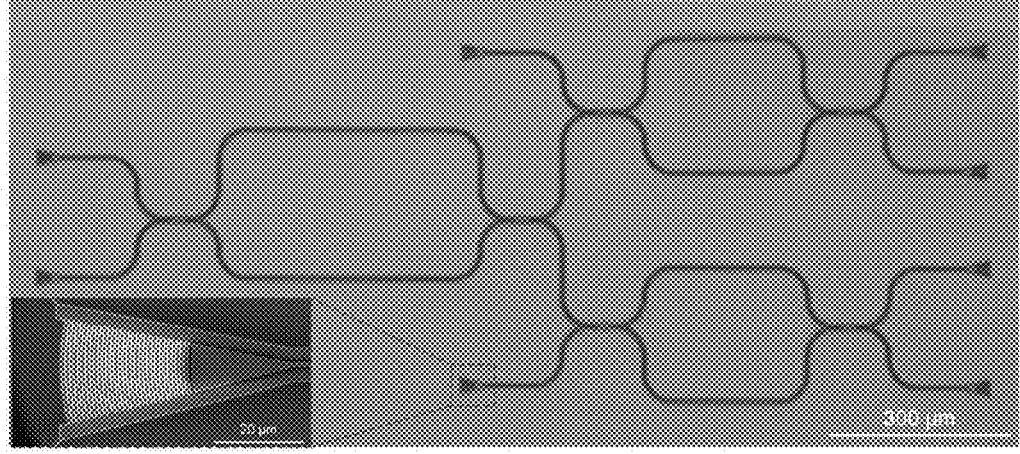
FIG. 30 depicts a photograph of a silicon photonics integrated circuit (PIC) with Mach-Zehnder interferometer (MZI) devices according to the prior art.
Figure 31:
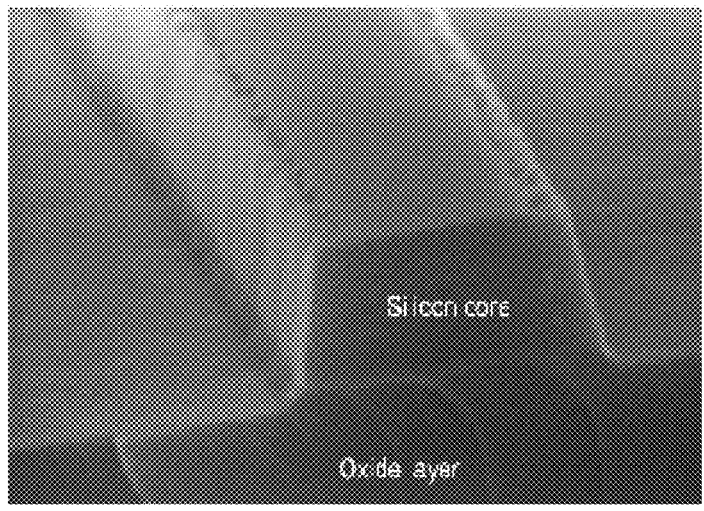
FIG. 31 depicts a photograph of a rectangular waveguide as employed within a silicon PIC according to the prior art.

The silicon photonics platform is a technology that allows long, narrow rectangles of silicon to be patterned on the surface of a silicon semiconductor wafer as shown in FIG. 30 according to the prior art. There is typically a lower cladding layer of silicon oxide (called buried oxide or "BOX") with an optical waveguide, for example, having a square shaped cross-section, etched into another layer deposited or grown on the BOX such as silicon oxynitride, silicon or doped silicon dioxide. An upper cladding may be deposited or the waveguide may be air clad. The dimensions of the square cross section are typically 0.2-um×0.2-um as shown in FIG. 31 according to the prior art. Silicon is transparent to infrared light at the 1.55 μm wavelength and hence can be guided along these embossed ridges on the surface of the wafer. There are many structures that have been developed in this technology, from optical grating couplers to modulators to photodetectors, and have been widely used in the academic and industrial areas. However, within other embodiments of the invention other waveguides and/or other waveguide material systems may be employed. For example, a compound semiconductor platform such as indium gallium arsenide phosphide (InGaAsP) allows for integration of "passive" waveguide structures such as ring resonators, MZIs etc. with "active" elements such as FP lasers, DFB lasers, SOAs, etc. However, a benefit of silicon is the ease of integrating photonics with electronics, particularly CMOS electronics.

Figure 32:
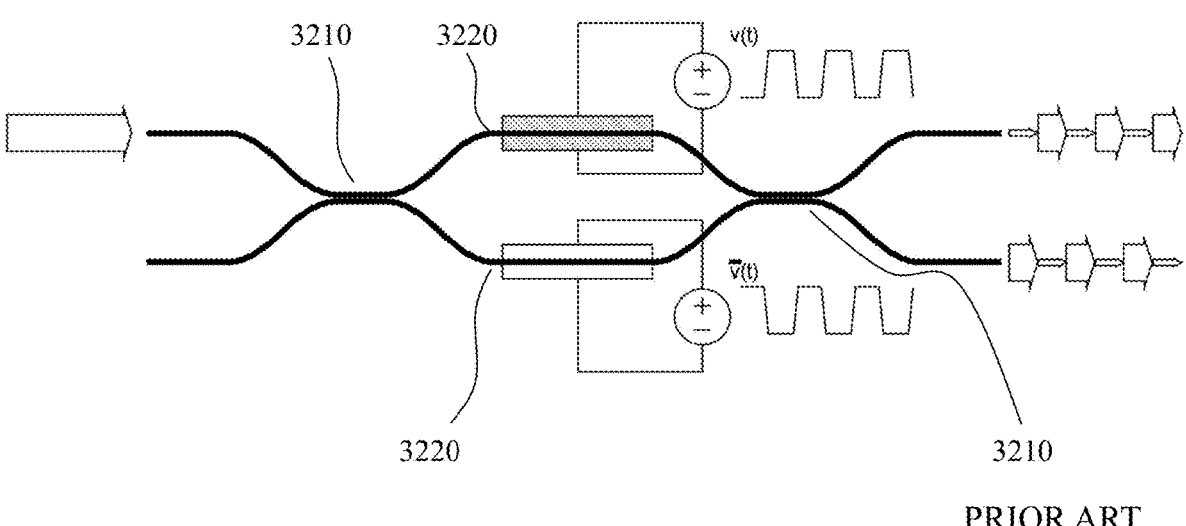
FIG. 32 depicts schematically a Mach-Zehnder waveguide interferometer for encoding data (generating optical pulses from pulsed electrical signals) according to the prior art.

The MZI is an example of a very well-studied structure of the silicon photonics design platform and has been typically used to carry out electrical to optical encoding by way of interference modulation techniques for external modulators to continuous wave (CW) lasers or providing optical switching, variable optical attenuators etc. The objective of this type of device as a modulator is to encode a digital electrical signal of 1's and 0's into an optical signal of high and low optical intensity pulses. FIG. 32 according to the prior art shows a typical schematic structure of the MZI modulator for such a functionality. Very high modulation rates for these types of devices have been shown in the literature up to 40 Gb/s.

There are 2 main elements of the MZI design: the optical directional coupler regions 3210 and the propagation arms 3220. There are certain extra design features that are incorporated into these types of structures such as thermal tuning areas that heat-up to tune the propagation velocity, which may be required for wavelength alignment, but these will not be discussed here as part of this invention.

The directional couplers (DC s) allow 2 independent waveguides to be brought very close to each other and this allows optical power to be transferred between the two waveguides. Depending on the length of the coupling region and the phase of the incoming light signals, the directional coupler can direct anywhere from 0% to 100% of the light in one or the other outputs of the coupler, with the reciprocal amount of power in the other output. The two waveguides may touch, referred to as a zero-gap directional coupler, or form a multi-mode region (multimode interferometer or MMI) to provide the requisite power splitting for the 2×2 input and output regions disposed either end of the pair of propagation arms 3220.

The arm lengths can use either thermal resistors or semiconductor doping with electrical control to alter the phase propagation of the light in either arm. These regions can be pattern along the arm. In an embodiment of the invention, a diode structure of p-type and n-type semiconductor is used to create a junction within the waveguide along the arm path. These being first and second phase-modulation diodes 3310 and 3320 depicted in FIG. 33. Also depicted in first to third cross-sections 3300A to 3300C are cross-section of the arms showing optical propagation, doping profile and device functional schematic, respectively. The arm being patterned with a long lateral diode structure 3330 that when reverse-biased (or forward biased) changes the density of mobile carriers (electrons and holes) in the arm, the speed of the light propagating down the arm 3340 can then be changed, either sped-up or slowed down, by changing the number of free-carriers in that region electrically thereby imparting an effective optical phase change in the optical signal at the end of the arm.

The overall effect of the directional couplers and the interconnecting waveguide arms allows a voltage applied to the phase-modulation diodes to control the difference in the speed of light in the two arms from a constant light source power and thereby imprint the voltage modulation onto the intensity of the output. When the light in each arm meets at the second coupler, their relative phase offset dictates which output port the light will exit from. By modulating the phase offset between 0 and 180°, an output port can be made to modulate with light pulses that correspond to the electrical pulses. Within a 2×2 MZI the outputs are complementary and accordingly an optical 2×2 MZI (or a 1×2 MZI with single input port) automatically generates an output and its complement. Whilst not described nor depicted it would be evident that a 1×1 MZI with single input/single output allows for unitary logic gates.

The silicon photonics platform also provides for the integration (either hybrid or monolithic) of devices such as photodetectors 3410 as depicted in FIG. 34. These devices, if exploiting silicon, are typically doped slightly differently to be able to absorb the longer wavelength light that is normally transparent in silicon. However, a suitable semiconductor material such as germanium, for example, can be grown to form the waveguide as can silicon-germanium multi-quantum wells (MQWs), germanium quantum dots etc. or grown separately and hybrid integrated, e.g., InGaAsP/InP for example. These devices behave as photodetectors in the reverse bias condition and are sensitive to the 1.55 μm wavelength optical signals 3420. However, whilst the embodiments of the invention are described with respect to 1.55 μm. FIG. 34 depicts an exemplary cross-section of a waveguide 3430 with doped region 3440 to form the photodetector. Whilst typically a photodetector is implemented for maximum absorption it would be evident that these may be alternatively either coupled to monitoring couplers that tap a small percentage of optical signal to provide monitoring and/or control or be very short and disposed within a waveguide 3430 such that the non-absorbed optical signals continue propagation.

An important aspect of embodiments of the invention is the use of the phase-modulation diodes and the photodetector diodes together. With these diodes arranged close together within the optical structure itself, optical signal inputs can affect optical signal outputs using intra-device electrical signals so that electrical signals do not need to propagate outside of the optical logic functional block such that the external connections are optical allowing multiple circuits to be connected over optical fiber interconnects either locally or over larger geographic areas as optical telecommunications support multi-gigabit transmission over large distances with or without wavelength division multiplexing to increase capacity per optical fiber. The dominance of the 1.55 μm window for local area networks (LANs), metropolitan area networks (MANs), regional networks, and international networks allowing infrastructure and/or new networks to support communications between distributed optical logic functional circuits has led to the description of embodiments of the invention being centered the wavelengths around 1.55 μm including the. However, it would be evident that other embodiments of the invention may support other wavelength ranges according to the requirements for cost, interconnectivity distances, etc. and the availability of photonic integrated circuit (PIC) and semiconductor devices to support them. For example, such embodiments of the invention may exploit devices operating in the 1.3 μm and 850 nm windows for example although nothing within this description should be viewed as limiting the wavelength(s) of the optical functional elements described and depicted.

Figure 35:
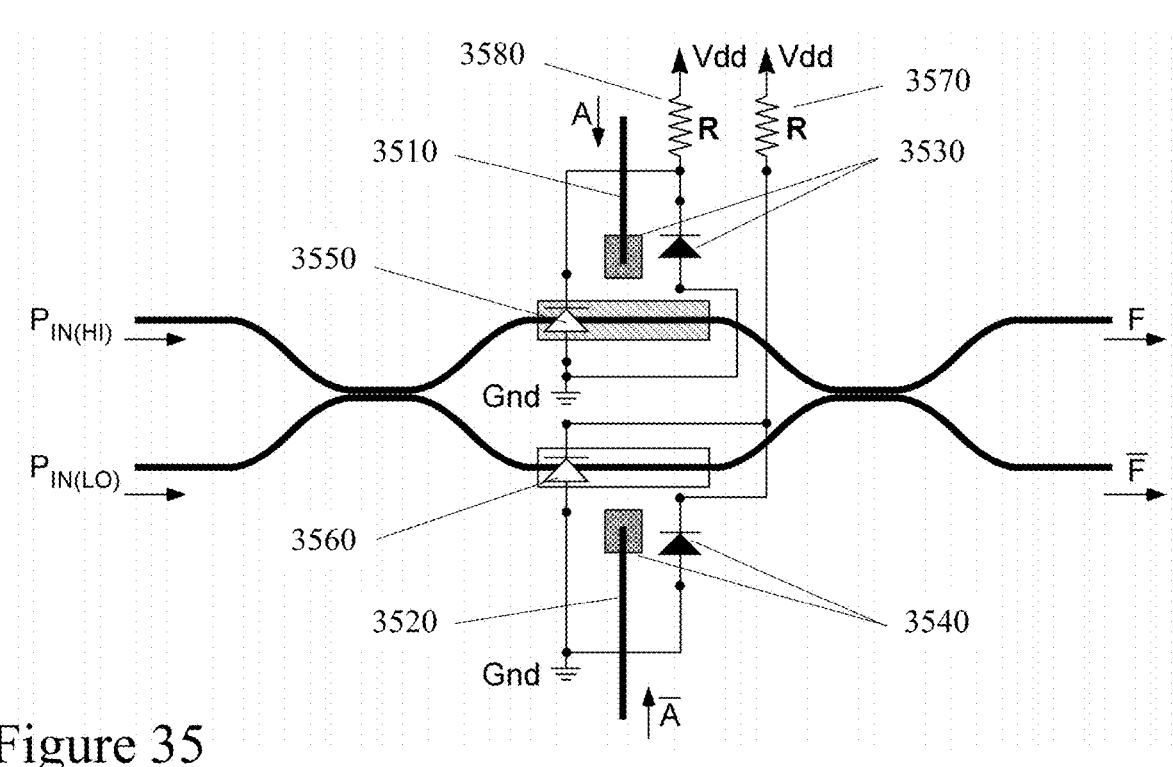
FIG. 35 depicts schematically a MZI with photodetector diode and phase modulation diode in parallel according to an embodiment of the invention.

In FIG. 35 there is depicted a MZI structure according to an embodiment of the invention augmented with a pair of waveguides 3510 and 3520 with photodetector diodes 3530 and 3540. FIG. 35 depicts both a physical schematic and an electrical circuit schematic of the photodetector diodes. With a pair of phase-modulation diodes 3550 and 3560 and the pair of photodetector-diodes 3530 and 3540 connected in parallel and then in series with a pair of resistors 3570 and 3580, the control of the electric fields in the phase-modulation diodes can now be controlled by incident light on the photodetectors.

Figure 36:
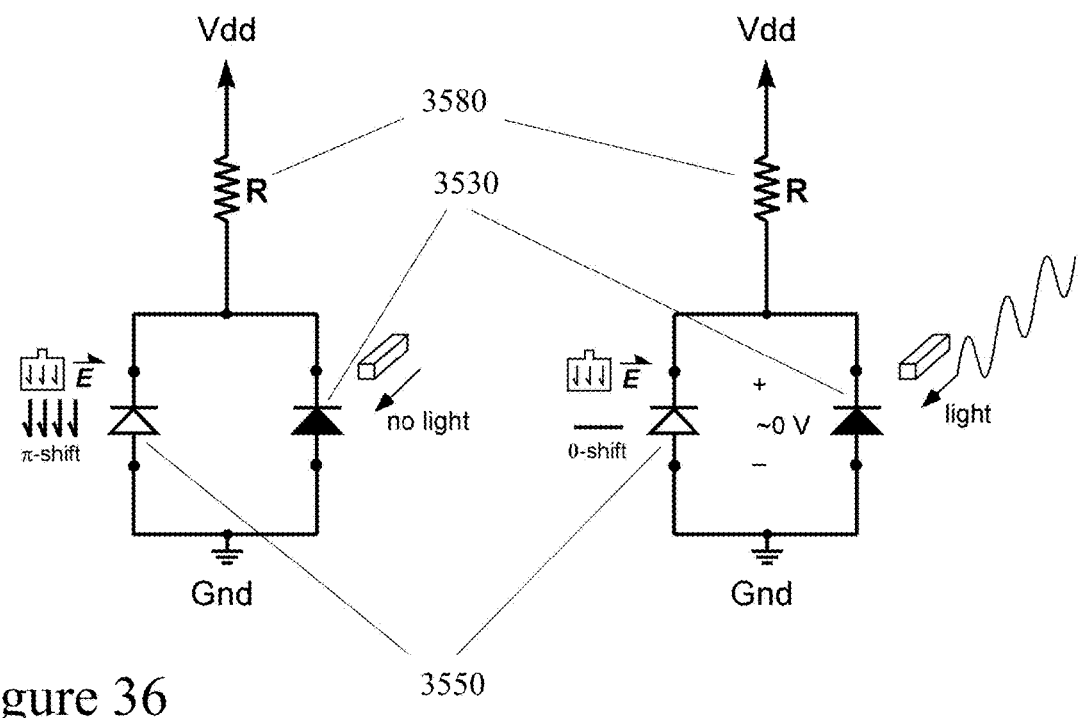
FIG. 36 depicts schematics of scenarios of the inventive device depicted in FIG. 35 according to an embodiment of the invention with either incident light or no incident light and the respective voltages (E-Fields) across the phase-modulation diode.

Accordingly, each arm of the MZI is an optically controlled optical phase-modulator. It should be noted that complementary logic is assumed here, such that the optical power in the A signal is always the complement (opposite) of the optical power in the Abar signal, although other signaling can also be envisioned. FIG. 36 shows the circuit diagrams of the phase-modulator and photodetector diode in parallel for only the upper arm of the MZI (the lower arm being identical).

When light is not incident on the photodetector-diode 3530, the current through the resistor 3580 is low or zero and the voltage across both parallel diodes remains high. This implies that the E-field strength in the phase-modulation diodes is high, and the light passing through that particular arm propagates faster. When light is present, the photodetector-diode voltage drops (ideally to zero with a strong enough optical power) and therefore the phase-modulator diode in parallel also drop to zero allowing carriers to flood back into the waveguide arm thereby slowing the light down.

It would be evident that whilst the exemplary embodiment of the invention depicted in FIG. 35 employs a simple electronic circuit that electronic circuits that can include gain, transistors, and methods of using feedback or other types of electronics to improve the performance of the diode-pair may be employed without departing from the scope of the invention. However, the fundamental concept of a photodetector diode acting on the phase-modulator diode which in turn affects the output optical signal remains. Further, circuit design techniques may be employed to reduce resistive-capacitive-inductive time constants, for example, to improve the operating speed of the speed of the optical logic functional block.

An important aspect of this arrangement is to recognize that electrical signals remain with the optical logic gate itself. No electrical signals are required to propagate to other distant gates, thereby allowing the speed of the light signals to propagate long distances at high data rates.

Figure 37:
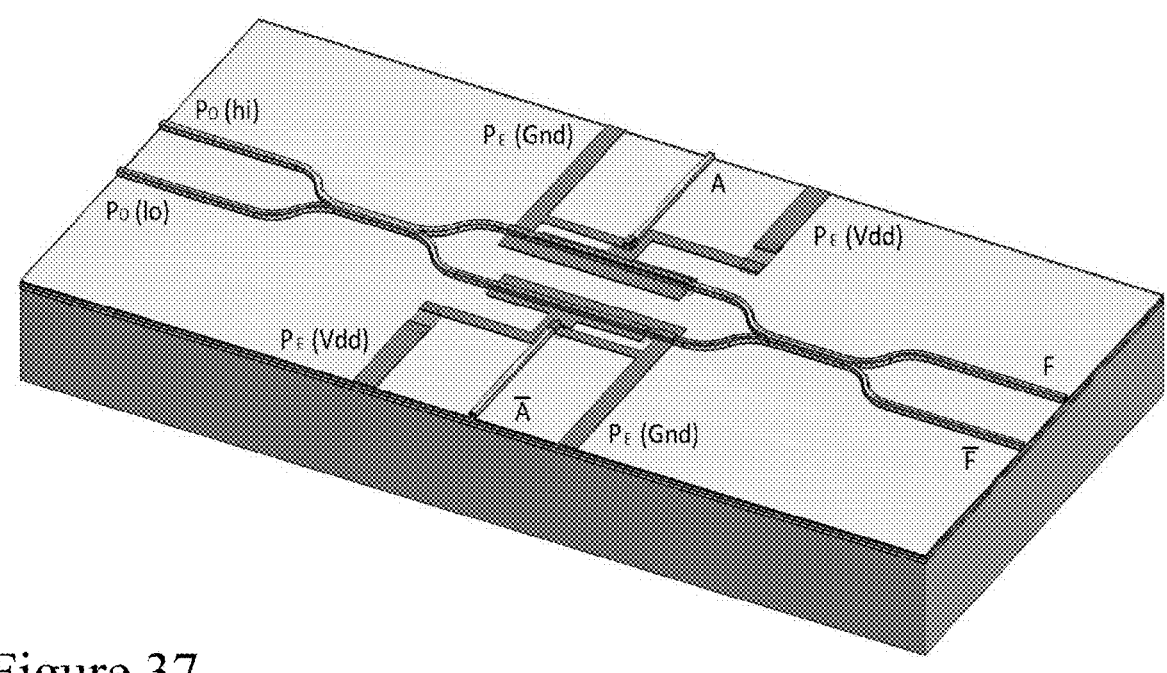
FIG. 37 depicts a perspective schematic of silicon PIC implementation of the inventive device of FIG. 35 depicting the MZI structure, photodetector diodes and respective signal waveguides.

FIG. 37 depicts a conceptual perspective view of a physical layout for this arrangement as depicted in FIG. 35. It includes 1) the constant CW optical power entering at the left side ($P_o$bar), 2) the diodes and metallization required to connect to the pairs of diodes, 3) the control optical waveguides from the top and bottom (A and Abar) and 4) the output waveguides on the right side (with outputs F and Fbar).

Figure 38:
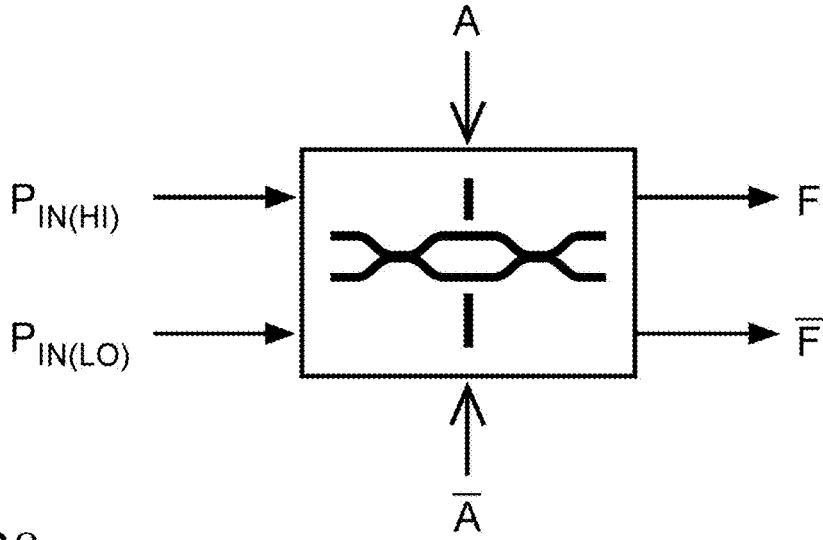
FIG. 38 depicts an exemplary logic symbol representation for the gate primitive according to the embodiment of the invention depicted in FIG. 35.

B3 Optical Logic Gate Primitive:

FIG. 35 depicts some of the physical aspects of the optically controlled phase-modulator, while FIG. 38 depicts a proposal representative symbol for the optical logic device. FIG. 38 is subsequently referred to within this specification as a "gate primitive" symbol and can be used to easily demonstrate all the possible input and output combinations. For the specific logical structures described herein, we will assume that devices can use either single-ended logic (A, B and F), or complementary-logic structures (A/Abar, B/Bbar, and F/Fbar). Single-ended logic may be more compact, while complementary-logic might be more robust to noise. For example, a unitary gate using a 1×1 MZI may have single input $P_{IN}$ and single output. Other states exist that are not complementary but will not be discussed within the following description although it would be evident that the continuous tunability of the outputs of 1×1 MZIs, 1×2M MZIs and 2×2 MZIs allow for other logic structures such as ternary logic for example. Accordingly, whilst only binary logic implementations are described and depicted within the specification it would be evident that other logic gates and logic circuit implementations using these logic gates may be implemented without departing from the scope of the invention that employ ternary logic or another multi-level logic structure such that the logic gates can be generalized as N-level logic devices where N>2.

Figures 39, 40:
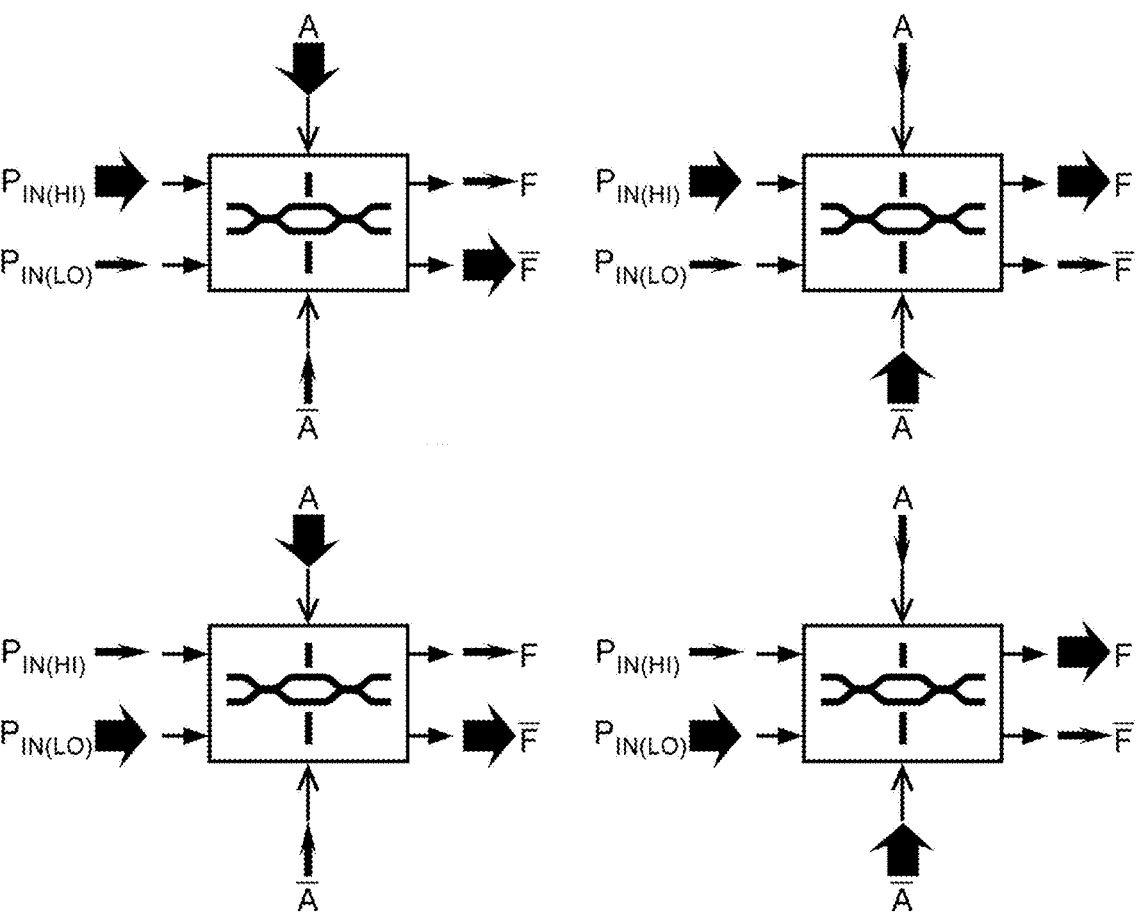
FIG. 39 depicts the 4 possible states of the logic gate according to an embodiment of the invention as depicted in FIGS. 35 and 38.
FIG. 40 depicts the logical truth table for the logic gate according to an embodiment of the invention as depicted in FIGS. 35 and 38.

Now referring to FIG. 39 there are depicted the 4 combinations of complementary logic for the gate primitive using the proposed symbol in FIG. 38 for complementary binary logic by way of large and small arrows representing high and low optical powers (i.e., logic levels). The subsequent truth table in FIG. 40 depicts each case in terms of logic values of 0 and 1. The immediate point to these 4 possible configurations is that the signal "A" can act on the signal "P" to produce the signal "F".

Figure 41:
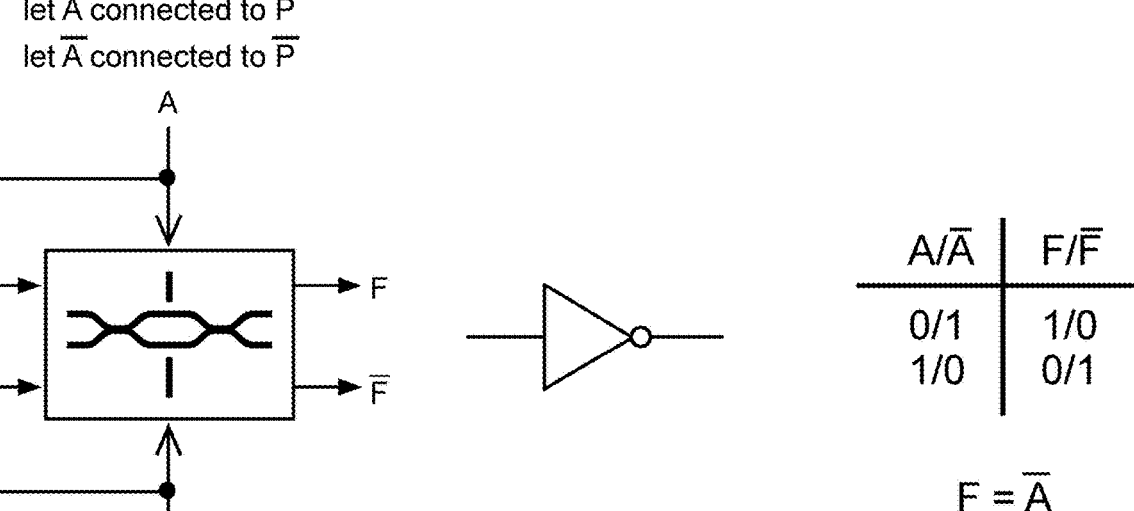
FIG. 41 depicts schematically a logical inverter gate using the logic gate according to an embodiment of the invention as depicted in FIGS. 35 and 38 together with logic symbol and the logical truth table

Accordingly, by changing how the inputs and outputs of the gate primitive are used, other logical conditions can be demonstrated. In FIG. 41, the gate primitive is connected such that A=P (and Abar=Pbar). If the same light level is directed to each of the inputs in this manner, the logical truth table can be simplified and the optical logic gate functions as a logical inverter.

Figure 42:
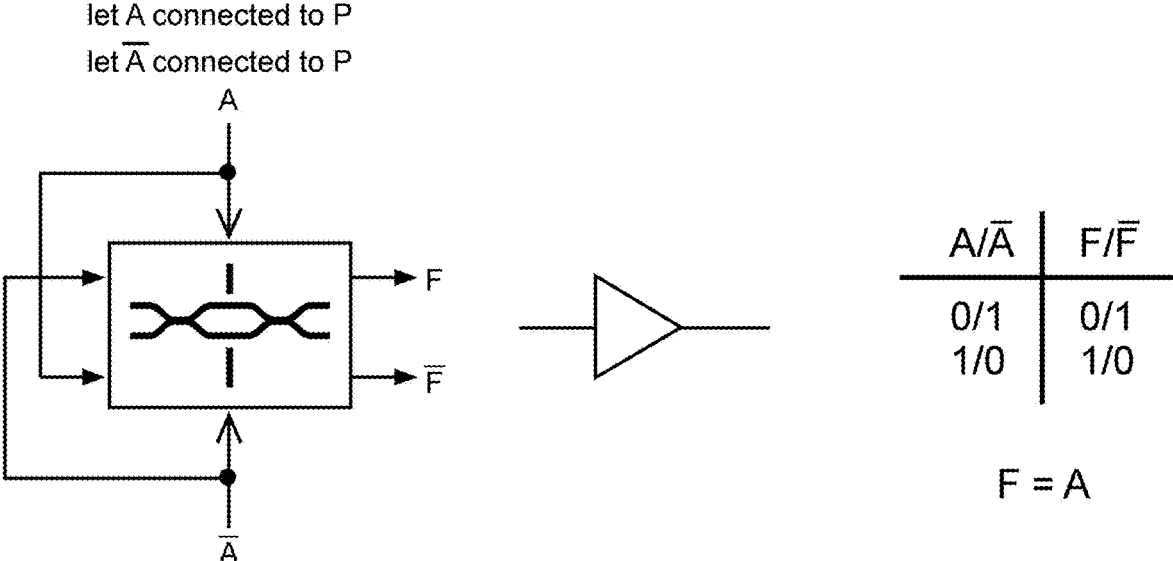
FIG. 42 depicts schematically a logical buffer gate using the logic gate according to an embodiment of the invention as depicted in FIGS. 35 and 38 together with logic symbol and the logical truth table

In FIG. 42, the gate primitive is connected such that A=Pbar (and Abar=P). If the same light is directed to each of the inputs this manner, the logical truth table can be simplified and the optical logic gate functions as a logical buffer.

Figure 43:
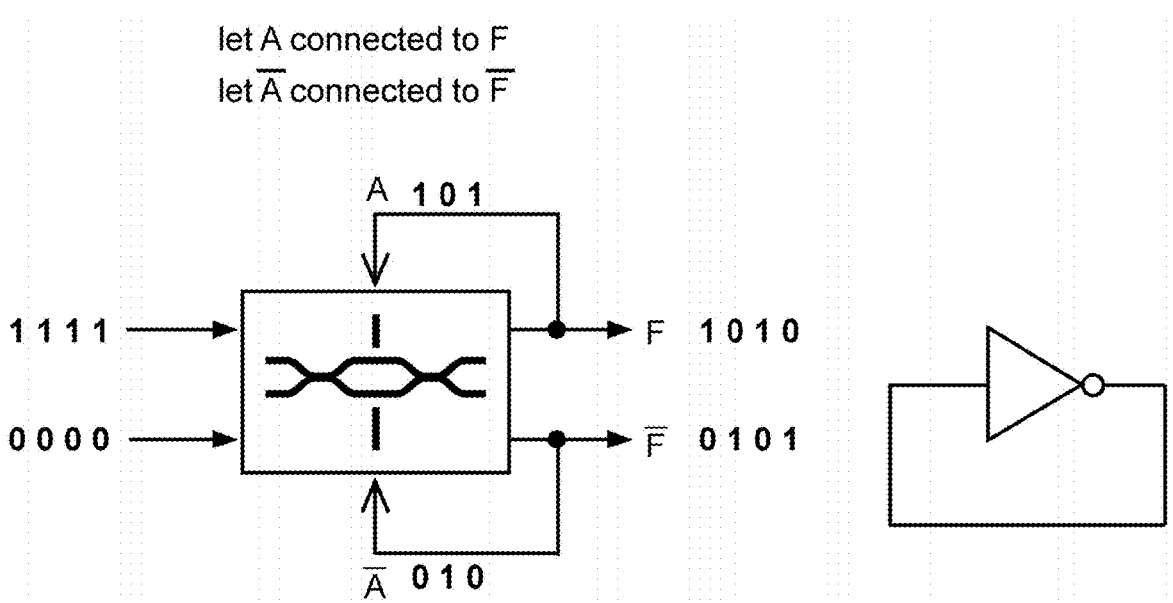
FIG. 43 depicts schematically an optical oscillator function of an inverter gate using the logic gate according to an embodiment of the invention as depicted in FIGS. 35 and 38 using positive optical feedback together with logic symbol.
Figure 44:
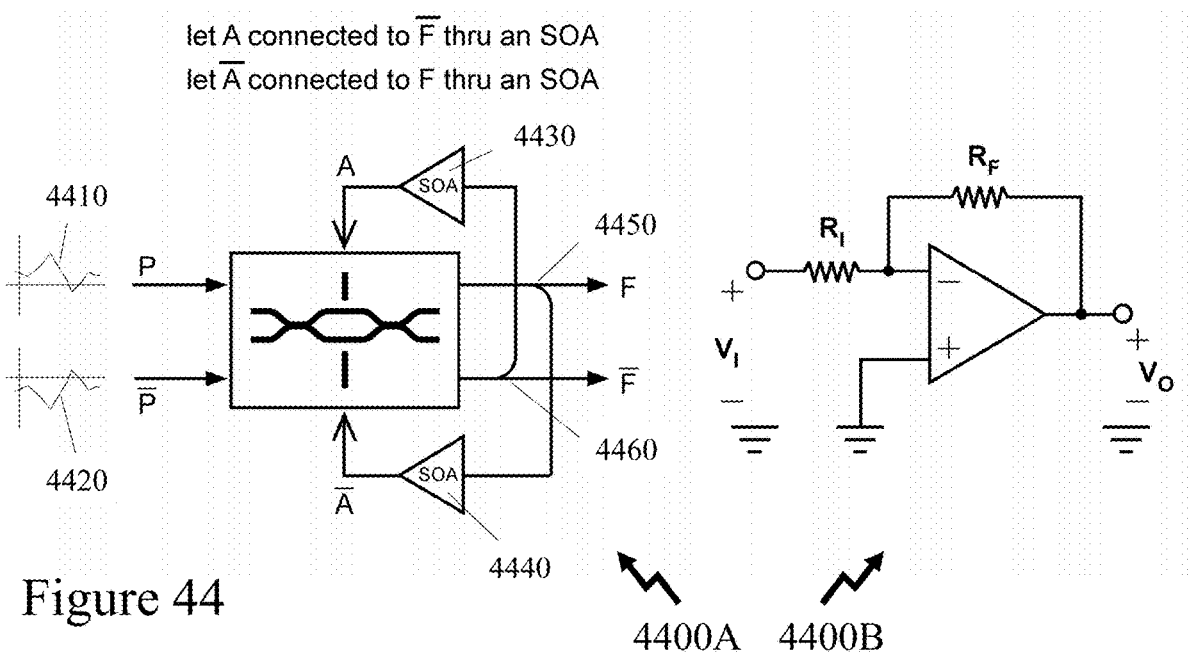
FIG. 44 depicts an optical operational amplifier (Op-Amp) implemented using the logic gate according to an embodiment of the invention as depicted in FIGS. 35 and 38 using negative optical feedback depicting the optical feedback elements together with a schematic of a conventional electrical Op-Amp.

FIG. 43 depicts the same gate primitive where the output F is fed back to the input A (F=A and Fbar=Abar). In this case a constant optical power P (where Pbar is zero) is used. This configuration creates an oscillator function that delivers complementary 0 and 1 pulses continuously. As depicted in FIG. 44 a SOA may be employed for provide gain in the feedback path and hence positive feedback can also be provided into the fed back paths.

A more complex version of the gate primitive, which may be regarded more as working in the "analog domain," is depicted in first schematic 4400A in FIG. 44 with inputs 4410 and 4420 with negative-feedback optical signaling where A=Fbar and F=Abar. Further, through the use of SOAs 4430 and 4400 in the feedback paths with taps 4450 and 4460 on the F and Fbar outputs then the structure operates in a manner equivalent to an all-optical operational amplifier. For example, this may have application as a functional block within applications such as RF optical carrier wave mixing, analog to digital conversion, digital to analog conversion, and signal amplification for example. The traditional electrical operational amplifier is depicted in second schematic 4400B in FIG. 44 for comparison.

B4: Optical Logic Gates:

Now referring to FIG. 45 there is depicted a design of an optical logic gate using a pairs of complementary optical inputs that can be employed to form an optical NAND-gate. Again, this gate structure assumes a complementary logic system and both the pictorial and circuit schematic structures are shown simultaneously. The optical NAND gate logic requires an upper parallel and lower series arrangement of photodetector diodes 4510 to 4540 respectively, four (4) waveguides 4550 to 4580 respectively with signals A, Abar, B, and Bbar, respectfully, along with a pair of phase-modulator diodes 4590 and 4595. FIG. 20 depicts the 4 states of both the upper and lower circuits (as they are NOT the same this time).

FIG. 46 depicts a proposed symbol for the optical NAND gate of FIG. 45 without the electrical devices and circuits showing the different operational states of the optical NAND gate. As depicted each logical state for the inputs A and B is shown and provides an output F that results from the logical NAND function. FIG. 47 depicts a proposal optical NAND gate symbol whilst in FIG. 48 there are depicted the 4 states of operation, along with a standard optical logic symbol and the truth table.

It would be evident that the arrangement of diodes depicted in FIG. 45 can be adjusted in order to form an optical NOR gates, and that other logic structures are also possible. However, in each design an intention of the designs is to reduce the distance any electrical current needs to travel short and within the gate itself.

B5: Ring Resonator Optical Logic Gates:

Whilst optical logic gates based upon MZI devices can be quite accommodating to fabrication and process drift they also potentially lead to large device geometries that absorb significant die area. Accordingly, the inventor has also established another class of optical logic gates based upon ring resonators that offer smaller footprint in some material systems, potentially faster operation due to reduced optical paths etc., although these optical logic gates may be harder to tune and optimize.

Figures 49, 50:
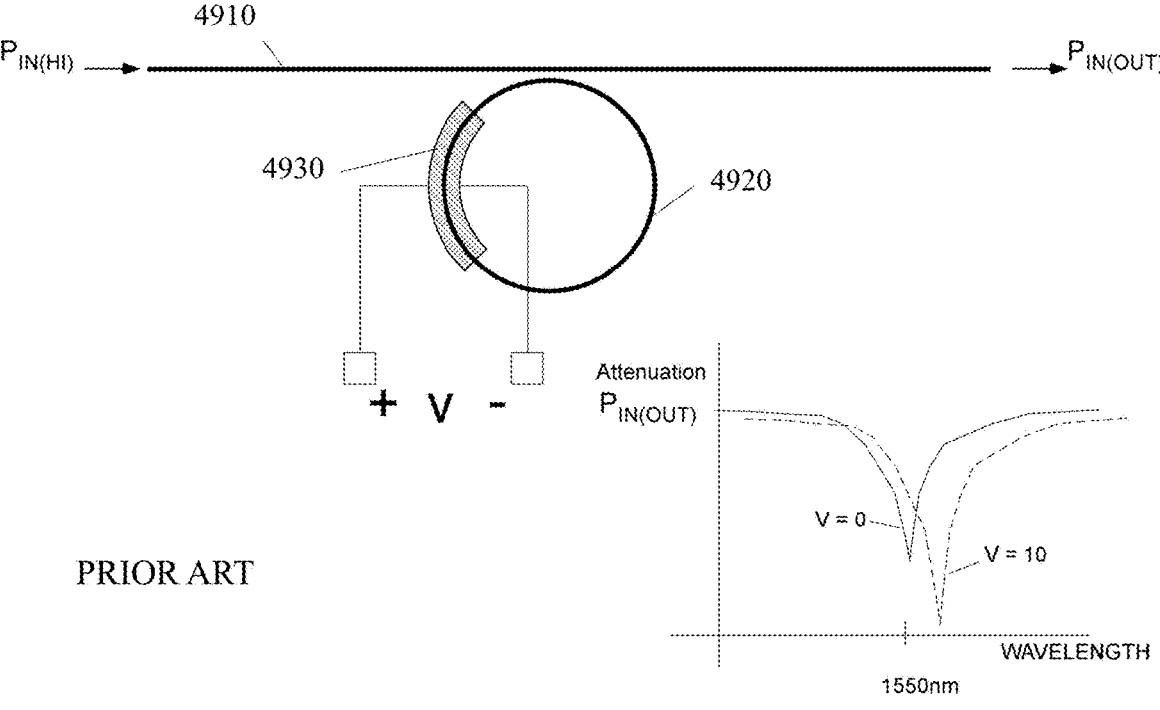
FIG. 49 depicts schematically an optical ring resonator device with a graph of resonance peak versus wavelength and voltage according to the prior art.
FIG. 50 depicts schematically a full optical logical NAND gate according to an embodiment of the invention utilizing a ring resonator optical structure and diodes to implement the logical NAND function optically.

Referring to FIG. 49 there is depicted a ring resonator device according to the prior art. If an optical signal is injected into the input port along the straight waveguide 4910, a portion of the light is then coupled into the ring 4920, this light travels around the ring 4920, and then couples back into the straight waveguide 4910. At this point, the time-of-flight around the ring 4920 determines if the ring light interferes constructively or destructively with the light in the straight waveguide 4910. This is highly dependent on the wavelength of the light. Typically, for a given set of physical dimensions of the ring, there is a very pronounced attenuation of the light at the output of the straight waveguide at a specific wavelength indicating a high level of destructive interference. This resonance peak can be adjusted by using the same techniques in the MZI device to change the propagation delay using a phase-modulator diode 4930 inserted in the ring 4920. Thus, with a properly calibrated ring, an input voltage can move the resonance peak of the ring resonator device to or away from a specific wavelength resulting in transmission or attenuation of the optical signal at that wavelength. This offset in resonance wavelength being depicted by the graph in FIG. 49.

Now referring to FIG. 50 an optical NAND gate according to an embodiment of the invention is depicted wherein a pair of photodetector diodes 5010 and 5020 are arranged in parallel with the phase-modulator diode (or electrode) 5030. This creates a NAND type logic device when the optical powers coupled to the ports A and B are at the appropriate level(s). It would be evident that the ring resonator with augmentation can form the basis of more complicated, and faster circuits.

Referring to FIG. 51 there is depicted an alternate design of a ring resonator optical NAND gate device which employs complementary signals, i.e. A and Abar, B and Bbar, where A and B are fed to one pair of photodiodes coupled to a first diode or phase modulator electrode of the ring portion of the ring resonator and the Abar and Bbar are fed to another pair of photodiodes coupled to a second diode or phase modulator electrode of the ring portion of the ring resonator. The design in FIG. 51 having a pair of straight waveguides that generate outputs F and Fbar, respectively.

B6: Larger Logical Functions:

An objective of optical logic gates is to exploit them to build larger logical functions to implement circuits and/or algorithms such as switches, adders, registers, and other computations. An example of this is shown in FIG. 52, this is a prior art example of a standard 2×2 multiplexer or switch. This structure requires 7 NAND gates 5210 and has 2 inputs with 2 outputs controlled by a select line control in the thru or crossover state. FIG. 52 also depicts the higher logic functional block and truth table are also shown.

Figure 53:
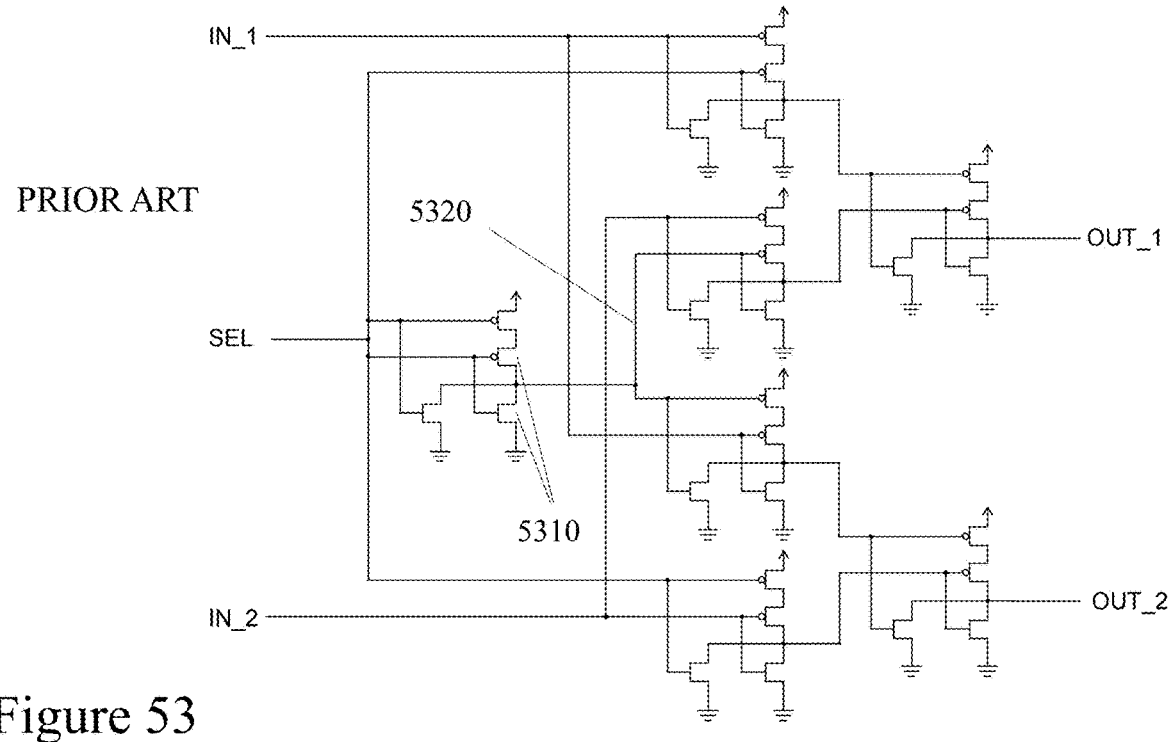
FIG. 53 depicts schematically an electrical transistor-based implementation of the 2×2 logical switch of FIG. 50.

FIG. 53 depicts a prior art example of how this 2×2 switch could be implemented using a physical layer set of CMOS transistors 5310 arranged as 7 NAND gates. It includes multiple internal connections 5320 along which the electrical current must travel, and as stated earlier, becomes a possible source of speed limitations if the electrical wires are too long and cause too many parasitic effects.

Figure 54:
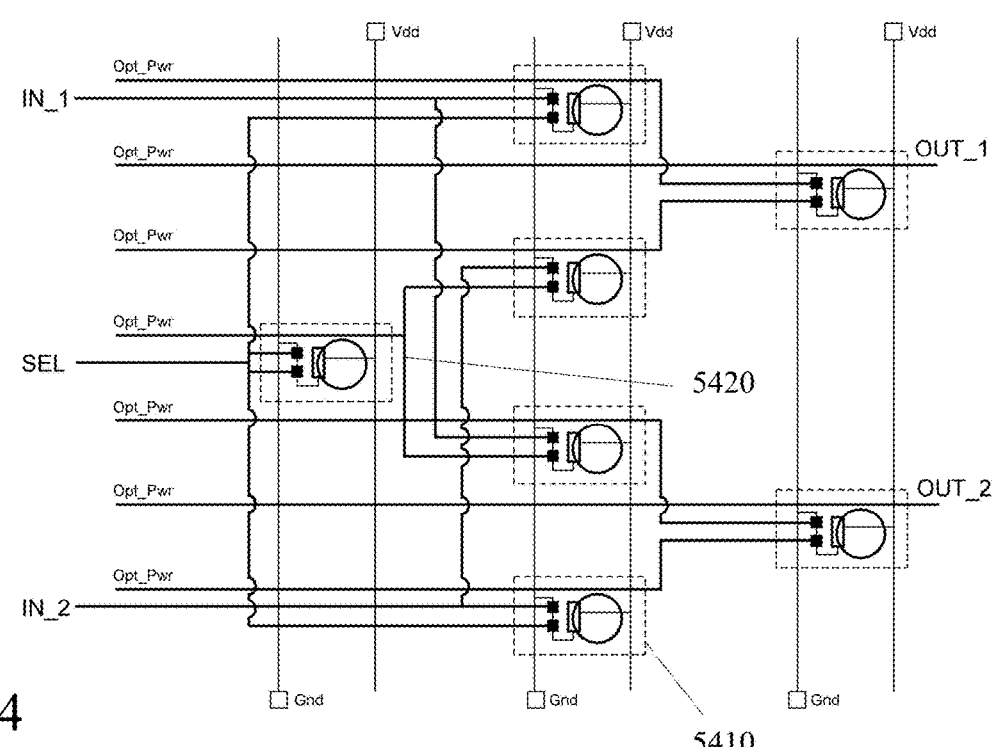
FIG. 54 depicts schematically an optical ring resonator-based circuit implementation of the 2×2 logical switch function according to an embodiment of the invention.

FIG. 54 depicts a physical layer structure according to an embodiment of the invention which implements the 2×2 switch function of FIG. 52 but is composed of optical ring resonator NAND gates 5410 like those in FIG. 50. The intermediate optical signals 5420 are similar to the electrical version, but these signals do not suffer from a speed penalty due to the length, and hence the function could be operated at very high speeds even if the gates were separated by many millimeters, centimeters or even meters. Of course, some of the detail has been abstracted to allow for a clearer picture.

Figures 55A, 55B:
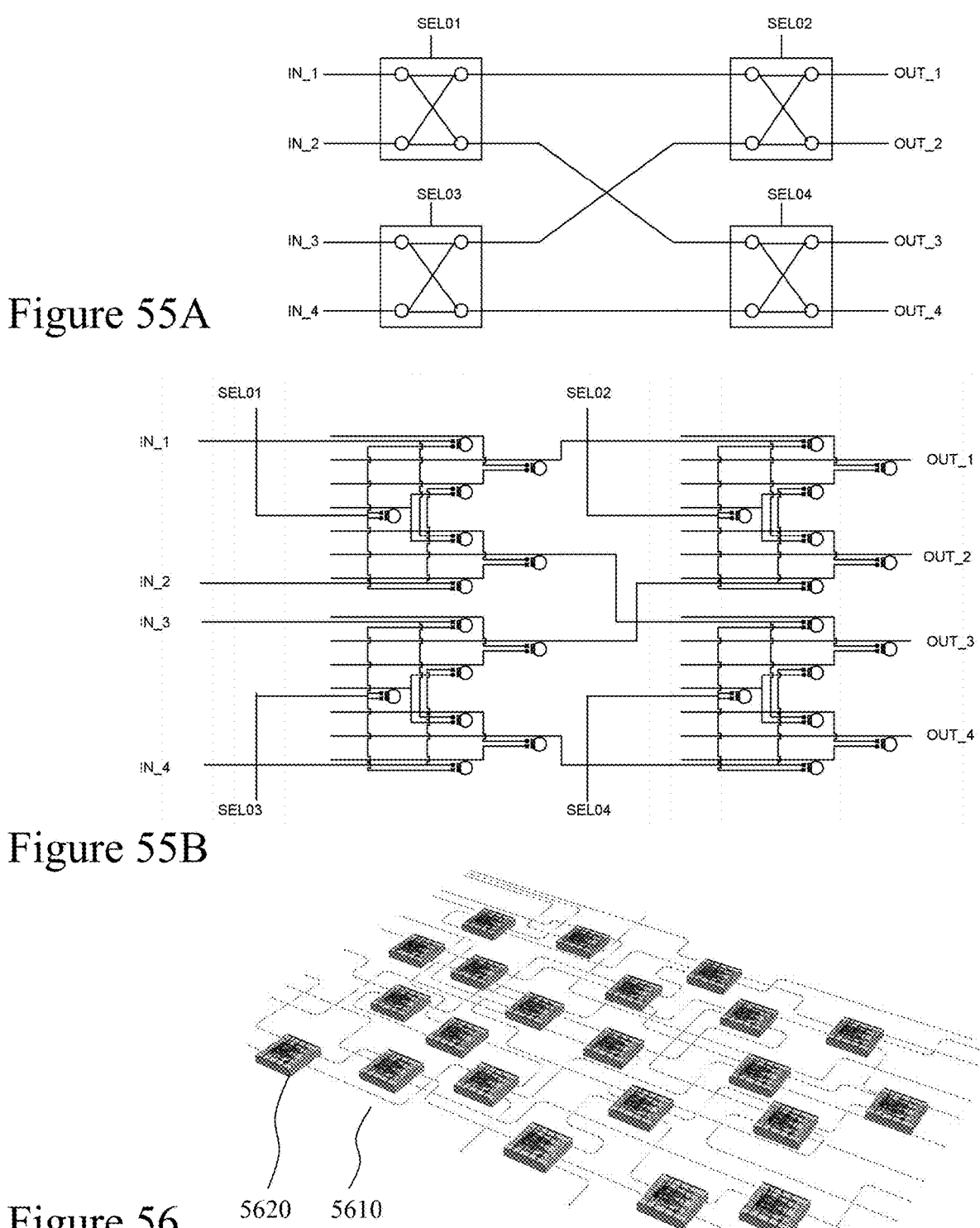
FIG. 55 depicts schematically a high-level symbol representation for a 4×4 logical switch made from 2×2 logical switches along with the base design to implement this function using optical ring resonators according to an embodiment of the invention.

FIG. 55A depicts a larger functional block that is now composed of 4 2×2 switch blocks, with 4 inputs, 4 outputs and 4 control lines. With a lower level of abstraction, the 2×2 switch blocks of optical ring resonator NAND gates are depicted in FIG. 55B where each 2×2 switch is depicted as the design in FIG. 54 with 7 optical NAND gates such that the functional logical block of FIG. 55A comprises 28 optical logic NAND gates of the design depicted in FIG. 50.

is also shown in the figure that compose the greater 4×4 block. It is in this vain that larger and larger functional block may be created. Of course, the optical power source is also a consideration, and just as electrical power needs to be distributed, the optical power must be split to multiple devices as figuratively shown in FIG. 30 wherein the lines 5610 between optical logic circuit 5620 denote the optical power distribution although it would be evident that in other embodiments of the invention an optical logic circuit or portions of an optical logic circuit may obtain this CW optical power from lasers associated with that specific optical logic circuit or specific portions of an optical logic circuit where the lasers may be discretely coupled, hybridly integrated or monolithically integrated. It would be evident that the optical logic circuit or portions of an optical logic circuit would require certain power ratios and minimum operational levels to operate. However, the optical logic circuits described and depicted allow and support distributed optical logic performing at high speed over large distances, and thus multiple optical power sources can therefore also be delivered to multiple chips.

Now referring to FIG. 57 there is depicted a schematic of a prior art electrical NAND gate arrangement for implementing a positive edge-triggered D-Flip Flop (D-FF). The symbol and the truth table for the D-FF are also provided. By using the optical logic methodologies described above for the 2×2 switch then using the optical ring resonator NAND gates depicted in FIG. 50 an optical equivalent of the D-FF can be implemented as depicted in FIG. 58. This optical D-FF could now be arranged on a silicon photonics die to produce larger functions such as a standard serial shift register with feedback as depicted in FIG. 59 according to the prior art of an electrical circuit. Accordingly, replacing the electrical D-FFs 5910 with the optical D-FFs of FIG. 58 together with optical exclusive OR (XOR) gates 5920 would provide an optical $2^7-1$ pseudo random bit sequence pattern generator entirely in the optical domain.

C: Optical Connector Power Loss Monitor

One of the least addressed, but most costly aspects of installing a large computing or switching center continues to be the maintenance and organization of the cabling at the initial installation phase. It has been estimated that for larger system installations, such as supercomputing installations, it takes more than 1 person-year of effort to properly install all the cabling, where a major part of the interconnects for these systems today relies on high-speed optical fiber cabling. The two biggest issues with cable installations are damaged optical fiber and mislabeled or misplaced cables.

When cables do not function properly or when errors are made in their layout, this costs time and labor to correct which can sometimes only be found during system initialization. Furthermore, optical fiber cable networks are usually installed in inconvenient locations. They must be installed rapidly and without the luxury of ultra-clean environments. Therefore, even with the most strenuous attempts to achieve "good" low-loss connections, faults in the optical fiber cabling can result in errors within the system that can typically be hard to diagnose.

In standard optical fiber cables, a small amount of optical signal attenuation, due to a dust particle or scratched optical fiber, may result in an increased bit error rate (BER) for the channel or channels that optical fiber supports. With dense WDM this fiber may be carrying 4, 8, 16, 20, 40 or even 80 channels of data. This error rate may be difficult to diagnose because it might be pattern or device sensitive and even more difficult to locate. Further, with DWDM the increased data rate may only be evident for some channels at their receiver.

Placing optical cables into plenums and other structured cabling racks (in ceilings, up towers, along walls or under flooring), or outside in harsher environments, makes them susceptible to cleanliness issues. Slightly contaminated terminated optical fibers can scatter (but not totally block) light traveling along the fiber, which can complicate the diagnosis of a system's performance. Furthermore, the logistical aspect of simply keeping track of the cable within a central office or computing facility—with many thousands of cable connects—can be challenging. While optical telecommunication cabling, meant for many tens or hundreds of kilometers, is typically fusion spliced to obtain the lowest possible optical loss, many of the shorter distance data-communication optical fiber cabling requires structured-cabling systems with many mate-able (and detachable) optical connectors.

The standard manual techniques for preparing and tracking optical fiber cabling is subject to human-error during these installation steps. However, other than a few examples of prior art that use self-wiping (self-cleaning) optical connectors, or spring-loaded shutters that prevent contamination into the optical connector, there are very few simple, low-cost, active (or passive) monitoring systems that can be implemented during installation and later monitored for system integrity. Accordingly, there is a requirement for an improved optical connector assembly that addresses at least some of the issues associated with the prior art.

C1: Summary

There is described below with respect to embodiments of the invention optical connector assemblies allowing both the monitoring of the average optical power through the optical connector and a simple cable identification and classification methodology without disturbing the normal connector function. The optical power that is lost due to the imperfect connector to connector interface is monitored at the connector end and stored and/or transmitted to an external measurement device such as a meter or diagnostic instrument.

Accordingly, within embodiments of the invention the inventor has established an optical connector design which includes optical sensor and sensor electronics to detect the optical power level at a connector interface due to the natural loss of optical power at all fiber-to-fiber interfaces. The connector monitor uses only the scattered and diffused light already at the connector interface to determine the relative loss in transmitted optical power. The optical connector monitor allows a user or installer of optical fiber cable infrastructures to record, calibrate, store, verify and read-out optical power measurements as well as other tracking and planning datum such as serial numbers, port numbers, types of optical fiber, wavelength, and manufacturer's codes.

In accordance with an embodiment of the invention there is provided an optical connector comprising a casing having a hollow body and an aperture at one end thereof; at least one optical fiber having an outer surface and a fiber end and extending inside the hollow body of the casing along a longitudinal direction thereof; a connector assembly supporting the fiber in the casing and aligning the fiber end with the aperture; and an optical monitoring device comprising a photodetector in proximity to the fiber end of the at least one optical fiber and adapted to detect naturally leaked light from the fiber end.

In accordance with another embodiment of the invention, there is provided a method for monitoring optical power in an optical connector, the method comprising transmitting light through at least one optical fiber having an outer surface and a fiber end and extending inside a hollow body of a casing along a longitudinal direction thereof, at least part of the light traveling through the at least one optical fiber leaking from the fiber end; and detecting naturally leaking light from the fiber end of the optical fiber using a photodetector placed in proximity thereto and encapsulated in the optical connector.

With an optical fiber supporting multiple WDM channels then the optical monitor may within embodiments of the invention monitor the aggregate power of all channels on the optical fiber or it may within other embodiments of the invention support monitoring of discrete channels within the WDM stream. Within embodiments of the invention out of band signaling may be employed to transmit the monitored power level(s) to network management elements periodically, continuously or upon a trigger event/threshold occurring.

C2: Embedded Optical Connector Power Monitoring

In connector-based optical connectors, independent of the style of connector, e.g. Ferrule Connector (FC), Biconic, SMA, Subscriber Connector (SC), Mechanical Transfer (MT), Lucent Connector (LC) etc. or polish (point contact (PC) or angled point contact (APC), there exists a small fraction of optical power that does not couple from the core of the transmitting optical fiber to the core of the receiving optical fiber. This can arise from different causes such as; the eccentricity or diameter of the cores relative to each other, the Fresnel reflections at the interface, the surface roughness of the polished tip of the fiber, or other non-uniformities. Although these losses are always kept to a minimum, an optical connector typically results in between 0.05 dB and 0.5 dB of loss (i.e., the connector transmits between 99% and 90% of the incident light meaning that between 1% and 10% of the incident light is lost at the connector). Optical connectors are typically employed as they allow for demountable optical connections to be made between an optical fiber and an optical device, e.g., transmitter, receiver, switch, add-drop multiplexer, etc. A fusion splice connection there is normally between −0.5 dB and −0.05 dB of optical power that is lost at the interface (depending on multimode or single-mode fiber and the type of surface finish required on the optical connectors). Even the fusion-spliced optical connections, where the two ends of the optical fibers are heated and melted together to make a connector-less joint, suffers from some optical loss, typically 0.15 dB (i.e., 96% of the optical power is transmitted and 4% lost).

The standard method used to assemble an optical connector is to insert the 125 μm diameter glass fiber into a zirconia (or other ceramic) guiding cylinder, called a ferrule. The zirconia ferrule locates the glass fiber in the center of the very high tolerance rigid ferrule. The fiber is glued in place and the end tip of the ferrule, along with the glass fiber tip, is then polished, whereupon an appropriate type of mechanical assembly is built around the ferrule.

Two of these optical connectors (such as the FC, SC, LC, etc.) can then be connected (and aligned) together using an equally well toleranced alignment barrel or coupler. Typically, such connector adapters connect a pair of optical connectors of the same type but others can connect different connector types together. In addition, a single optical connector can be connected (and aligned) using a suitable transmitting or receiving module such as a transmitter optical sub-assembly (TOSA) or receiver optical sub-assembly (ROSA) in a standard package type such as a TO-4 "can", small form-factor pluggable transceivers (SFP, SFP+, XFP etc. or optical connectors on optical devices and/or optical cable interfaces of devices (commonly referred to as "pigtails").

At the connector interface, a portion of light from the core of one connector may be coupled into the core of the next connector and properly carried down the glass fiber. However, some optical power is lost at this interface. By using a photodetector (such as a charge-coupled device (CCD), a large-area PN junction photodiode, a large-area organic/polymer photoelectric material, or an avalanche photodiode (APD), or other photon detector), some of this lost light may be captured. A network management function of the network may then, based upon knowledge of the optical signal(s) initially launched into the optical fiber determine the amount of light lost (i.e., detected) versus the amount of light actually being passed through the connector interface and therein derive a connector loss estimate. This may be done without disturbing the "normal" method of connecting the connectors together and without the need for modifications to the glass optical fiber itself. Further, the embedded monitoring allows this to be performed in real time over the lifetime of the optical cable/network.

The way the lost light is scattered along the optical fiber may be considered in the assembly. Given a bare glass fiber strand that has been cleaned and is clear of any imperfections, lost light caused by the connector interface is hardly visible because it is traveling in the same general direction as the strand of glass fiber, albeit with a slight angular direction so that the rays of light are passing out of the glass fiber as this light is now unguided by the optical fiber. A system that observes this lost light from a position perpendicular to the direction of the glass strand will not see much, if any, of the scattered light.

In one embodiment of the invention, a scattering mechanism on the outside diameter of the glass fiber strand is used to detect lost light. The polyimide (plastic) protection coating normally applied to the optical fiber (usually with a total diameter of about 250-microns) is capable of capturing and scattering the lost light and directing a large portion of it at all angles surrounding the glass fiber. This includes perpendicular to the glass strand. As a result, the polyimide coating is "illuminated" by the optical signals lost at the connector interface for a short distance, typically a few centimeters, along the fiber after the connector. Accordingly, this lost light can be measured without any direct manipulation or alteration to the optical fiber.

Other scattering mechanisms are also possible. For example, in another embodiment of the invention, the bare glass fiber can be coated over a portion of its length at a predetermined location relative to the optical connector facet with metal or ceramic particles. Other, more specifically designed patterns can also be applied to the surface of the glass fiber to help with scattering or even optical wavelength filtering, in the case of multiple wavelengths being propagated along the fiber.

Furthermore, the method of sensing the lost optical power can also be applied to the fusion-spliced joints by connecting around the fusion-spliced region a similar scattering material and a photodetector apparatus that can monitor the light-loss (and thus the light transmission) of an optical fiber link as a method of diagnostics during the lifetime of the installation. It also can be applied to plastic optical fibers and optical waveguide materials (such as optical polymer layers on PCB materials), or any other region of a light conduit that may lose light power (such as a fiber that has exceeded its maximum bend radius).

In embodiments of the invention described herein, a sensing apparatus installed along the path of the optical connectors is not only unobtrusive, but it may also remain undisturbed for very long periods of time. Therefore, in some embodiments of the invention, the monitoring circuit behind the optical connector does not have any power-source of its own. In other embodiments of the invention, small batteries may be designed into the sensing apparatus. In an embodiment of the invention, the monitoring circuit may be powered using localized RF (radio frequency) induced signaling, in the form of an RFID circuit, thereby preventing the reliability of the monitoring circuit to impact the optical signal itself or the monitoring circuit may be powered from a photodetector generating electricity stored into a battery, e.g., a solar cell. For example, if the circuit malfunctions or the batteries completely lose charge, the performance of the optical link (and the optical connectors) can remain completely reliable and unchanged as though it were a standard optical fiber cable and/or connector.

The applications for the described optical power monitoring system are numerous. For example, during the initial installation of the cabling infrastructure. With possible cleanliness issues at the connector ends, or broken/cracked optical fibers, the installation technicians could use the system in conjunction with specially adapted hand-held scanners or meters that read-out the level of optical power measured.

In some embodiments of the invention, the photodetector may be momentarily powered-up and a measurement of the optical power lost through the connector may be taken, stored, and transmitted from circuitry within the connector head. This is particularly useful as a quick and easy diagnostic to determine if the connector fiber-tip itself is dirty, broken, or contaminated. An abnormal amount of optical power loss through the connector may signal that the connector needs to be cleaned or changed. In addition, the measured optical power may be derived from the leakage optical power from the connector itself. In this case, there is no additional power sampled or diverted from the main path of the optical signal, and the glass optical fiber is not modified or tampered with in any way, so its operating conditions remain identical to an optical connector without built-in power monitoring capabilities.

In some embodiments of the invention, to account for the very small amount of absolute optical power, the system may be capable of detecting down to or below the nanowatt level of optical power (i.e. −60 dBm or less). For example, the lost optical power may be spread over the entire cylindrical outside of the glass optical fiber and along several centimeters of length. Accordingly, considering a connector with 0.05 dB optical loss, equivalent to an absolute power loss of 11 microwatts for a 1 milliwatt signal, is distributed over a surface area of approximately $2*\pi*r*h=2*\pi*(0.0125$ cm$)*(10.00$ cm$)=0.785$ cm$^2$. This produces a power density of roughly 14 $\mu$W/cm2. For a standard silicon p-n junction photodiode with a responsivity of 0.5 A/W, in order to generate a significant enough voltage (for example: ~20 mV for a subsequent amplifier) over a 1 k$\Omega$ load, the current would have to be roughly 20 $\mu$A. This implies that at least 40 $\mu$W must be incident on the detector, which in turn implies a detector at least 3 cm$^2$ in area. Given a typical size detector head of perhaps 1 mm$^2$, an incident light power of at least 4,000 $\mu$W/cm$^2$ would be required.

There are several methods that can be used to capture enough optical power and direct it on a detector, and several types of detectors that can be used. In one embodiment of the invention, a relay arrangement comprising a lens or imaging system is used to collect and focus the light. In another embodiment of the invention, a short image guide that can function as a light-guide and/or concentrator between the optical fiber and the photodetector is used. The types of detectors may then include, but are not limited to, silicon p-n junctions, charge-coupled devices (CCDs) and avalanche photodiodes (APDs). Also, other photosensitive materials, such as organic photovoltaic materials may be sufficiently sensitive as well. In the case of a very small form-factor, a close-proximity optic (high-f-number) diffraction-grating may be used to capture the lost light. Alternatively, the detector may be a charge-coupled-device, with a very high optical sensitivity placed in close contact with the optical fiber. Such an arrangement may capture the lost light and generate an electrical signal proportional to the amount of incident optical power on each pixel of the CCD. In another embodiment of the invention, an organic material may also function as the photo-detecting medium, where the optical fiber is coated with layers along the length of the fiber or where the fiber is placed in a sufficiently long holder that has been patterned with the organic materials and electrodes. This arrangement may be made to produce a relatively large surface area to capture more of the leakage light.

In some embodiments of the invention, a scanner, in addition to extra circuitry and memory (e.g., flash memory) within the optical connector head, may be designed with storage and read/write abilities to update a defined look-up table with specific fields stored within the optical connector monitoring system. The look-up table, similar to other RFID look-up tables, allows the scanner to, for example, read the serial number of the connector, enter new loss values, enter wavelength information, the type of optical fiber (multimode fiber (MMF), singlemode fiber (SMF), plastic optical fiber (POF), etc., as well as other information such installation date, servicing dates, etc. The RFID tag may also be provided with active memory to store port and machine assignment numbers, and other helpful network infrastructure information. The RFID scanner may use RFID techniques to power-up and then read-out the information without touching the optical connector. This eliminates the need for power supplies (i.e.: batteries) within the system, and the optical connector head could then be sealed and made to withstand all environmental stresses. Similar connector monitors that use contact methods to power-up and relay information, perhaps using metal-contacts, may also be provided as a way to access information about the optical connectors as well.

During up-keep and maintenance of the installation, as pieces of equipment are changed, optical ports are up-graded and new cables are laid, the RFID tagging system and the information stored inside the connector heads themselves allow network management personnel, technicians etc. track, manage, and organize the optical fiber cable links as well as help diagnose failures in the links.

Hand-held RFID scanners, used to monitor the optical power loss and the information stored at each connector end, may also be actively used during interconnect diagnosis issues, where the scanners would be used to measure abnormal optical power loss readings (i.e.: no power=broken fiber or dirty connection, higher loss power=dirty connection, scattering of optical power). The meter may also be configured to signal "good" and "bad" as a tone or beep as the technician waves it over the connector mating.

In addition, the information gathered by technicians using RFID (or other type) of scanners may then be up-loaded into a data-base management software tool for organizing and maintaining the installation. For example, when an optical fiber cable must be located and replaced, the technician may simply wave the scanner over areas of connector monitors to locate the specific "suspect" optical connector. The data collected may map-out the network's cables, providing information on each of the links, their power budgets, their connection topologies, along with vendor information about the cables themselves. This database may be used to maintain the network and diagnose possible fault conditions. The data may later be downloaded to scanners for future work by technicians within the network installation.

In some embodiments of the invention, at least one absolute optical power measurement is made in the interconnect in order to determine if the connector is behaving well. This is done to account for the optical connector monitor's ability to only measure the leakage light, or the absolute loss component. The absolute optical power measurement may then be used as a reference or calibration power measurement. A set of algorithms may also be provided in the software platform to back-calculate the performance of a specific optical connector, either based on a power measurement of the laser module power or the direct power from one of the connectors in the link. The absolute power in the link may be established by using the average specifications of the laser transmit module (such as that from an SFP module). Given a sufficiently well-structured database, the optical power per optical port may also be available as part of the recorded information. In addition, level of acceptable "losses" may be set to correspond to the customer's desired performance criteria, the types of optical fiber and connectors, the data rates (i.e., a 10 Gbps signal requires more optical power than a 1 Gbps signal), and other parameters.

The scanner may also incorporate an optical power meter for absolute measurements used during the installations, as well as a wavelength meter to record measured wavelengths. It may also include a bar-code reader for ease of data-recording (such as machine number, port number, etc. . . . ) that would help keep track of the cables in the installation.

In some embodiments of the invention, the concept is also applied to the wavelengths of the light through the connector. By using ranges of optical filters over the photodetector elements, different portions of the detector can be made sensitive to the wavelength of light. Depending on the granularity of the filters, different light-bands (optical extended (E) band, short (S) band, conventional (C), long (L) bands of 1360-1460 nm, 1460-1530 nm, 1530-1565 nm, and 1565-1625 nm) may be detected. Alternatively, detection is performed in terms of broad optical wavelength bands (i.e., 850 nm, 980 nm, 1310 nm, 1550 nm). Also alternatively, the system may detect the carrier wavelengths within a specific light-band given ITU specifications. Numerous types of optical filters may be employed, from dielectric layers to diffractive optical elements, to organic and inorganic materials that are sensitive to different incident wavelengths.

Figure 80:
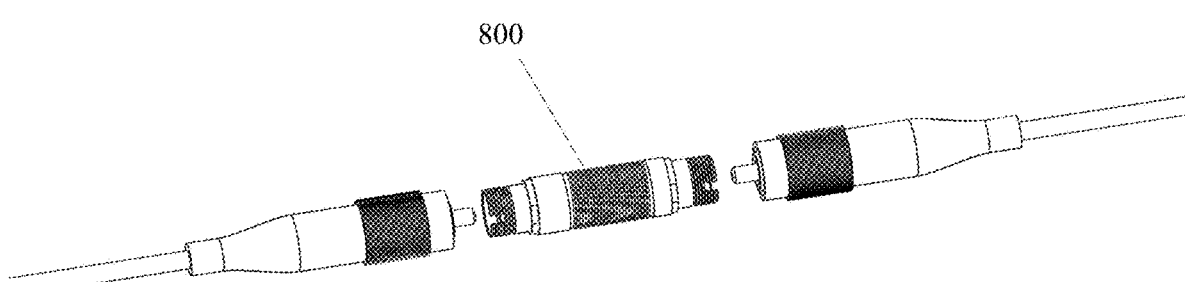
FIG. 80 depicts a perspective view of an assembly of 2 FC terminated cables where an optical sensor assembly according to an embodiment of the invention is implemented within an adapter which mates the 2 FC connectors together according to an embodiment of the invention.

In other embodiments of the invention of the detector a separate module or fiber connector adapter can be used where the ends of two fiber cables are plugged in to the adapter and the detection and RF circuits are contained within the adapter itself with no added requirement for making the ends of the optical cables' higher complexity. Such an adapter based monitor being depicted in FIG. 80 with Optical Power Monitor Adapter 800. Accordingly, the discrete optical fiber cables and their adapters are passive and the adapter has the circuitry, interfaces etc. Further to this concept, the optical power monitor can allow the determination of the direction of the light to provide more information about the placement of cables. It can do this by detecting which side of the adapter has the leakage light and which does not, indicating the side that had no light leakage is the side the light is coming from.

In some embodiments of the invention, the concept may also be applied to arrays of optical fibers as well. For example, in the case of parallel optical fiber ribbons and an MT (mechanical transfer) style of optical connector ferrule. With parallel arrays of fibers terminated with MT ferrules, the same basic optical power loss is present as in single fiber ferrules. Similarly, the light loss extends several centimeters along the length of the optical fiber ribbon, where the lost light is absorbed into the polyimide (plastic) coating that surrounds the glass fibers. The optical fibers in the ribbon tend to be spaced close together (nominally a 250-micron pitch for 125-micron diameter glass fibers). The polyimide coating is normally color coded over each strand of glass optical fiber, but it remains relatively translucent, especially to the wavelengths on interest (850-nm, 1310-nm, 1550-nm). In such cases, an image guide, and a method for slightly separating the optical fibers may be employed, such as an opaque epoxy poured over, and between, the fibers to cut-off the bleed-light of adjacent fibers. Adapting a set of apertures that concentrate on every second fiber, in an interleaved fashion, will also separate the light from individual fibers. This light can then be imaged over a CCD chip to get multiple dots or strips over the area of the CCD, or other wide area set of photodetectors. When using a CCD device, an algorithm that can be used over the entire intensity profile of the array, based on the pixel intensity of a linear CCD chip, can then map the relative intensity of the lost power per channel. This can be correlated to the actual output power of the optical fibers, and levels of light intensity loss can then be monitored in an open or closed loop feedback, such as that used to monitor laser output power in optical transceiver devices.

In some embodiments of the invention, the optical power monitoring system and method may be used in feedback and control systems. By coupling the light from a laser into an optical fiber (using any one of several types of optical relay systems, lenses, etc. . . . ) inside the optical transceiver, and then using a fiber-to-fiber connector (including even a "non-connector" fusion-splicing of the fibers) immediately after the initial coupling of light, the amount of leakage light from the fiber-to-fiber connection can be used as a monitor for the light inside the transceiver itself. The leakage light can then be used, not only as a way of measuring the amount of optical power from the laser, but the optical power already inside the optical fiber.

All versions of optical transceiver, including single and multi-fiber modules, single-mode and multimode optical fiber waveguides, and a range of different optical wavelengths can all use the optical connector monitor within their form-factors as a low-cost, and simple alternative to the back-reflection method. Because the optical connector monitor assembly can be applied to the optical fiber cable itself to monitor leakage power, more complicated optical relay systems can be avoided, and simple monitor circuitry can be developed around the fiber cables independently of the transmitter/receiver functions of a transceiver module, with an interface to the main transceiver module via power, ground, and I2C two-wire communications.

Referring to FIG. 60, a FC-style optical connector 6000 is depicted which in common with many optical connector formats employs a central, precision fabricated, zirconia ferrule 6020 with a small diameter hole through its center to locate a 125-um diameter glass optical fiber 6010. The zirconia ferrule 6020 and optical fiber 6010 are polished at the tip and are meant to be mated to another similar connector or another connector with similar ferrule polish, e.g., PC to PC, APC to APC etc. The connector itself has common features such as the front screw-barrel 6030 which is used for attachment to connectors and bulkheads, as well as the back portion of the connector with the rubber-boot assembly 6040 used for strain-relief. The connector is also usually part of a cable assembly with an outer protective sheath 6050, inside which usually stranded nylon fibers are used to maintain cable strength.

Figures 61, 62:
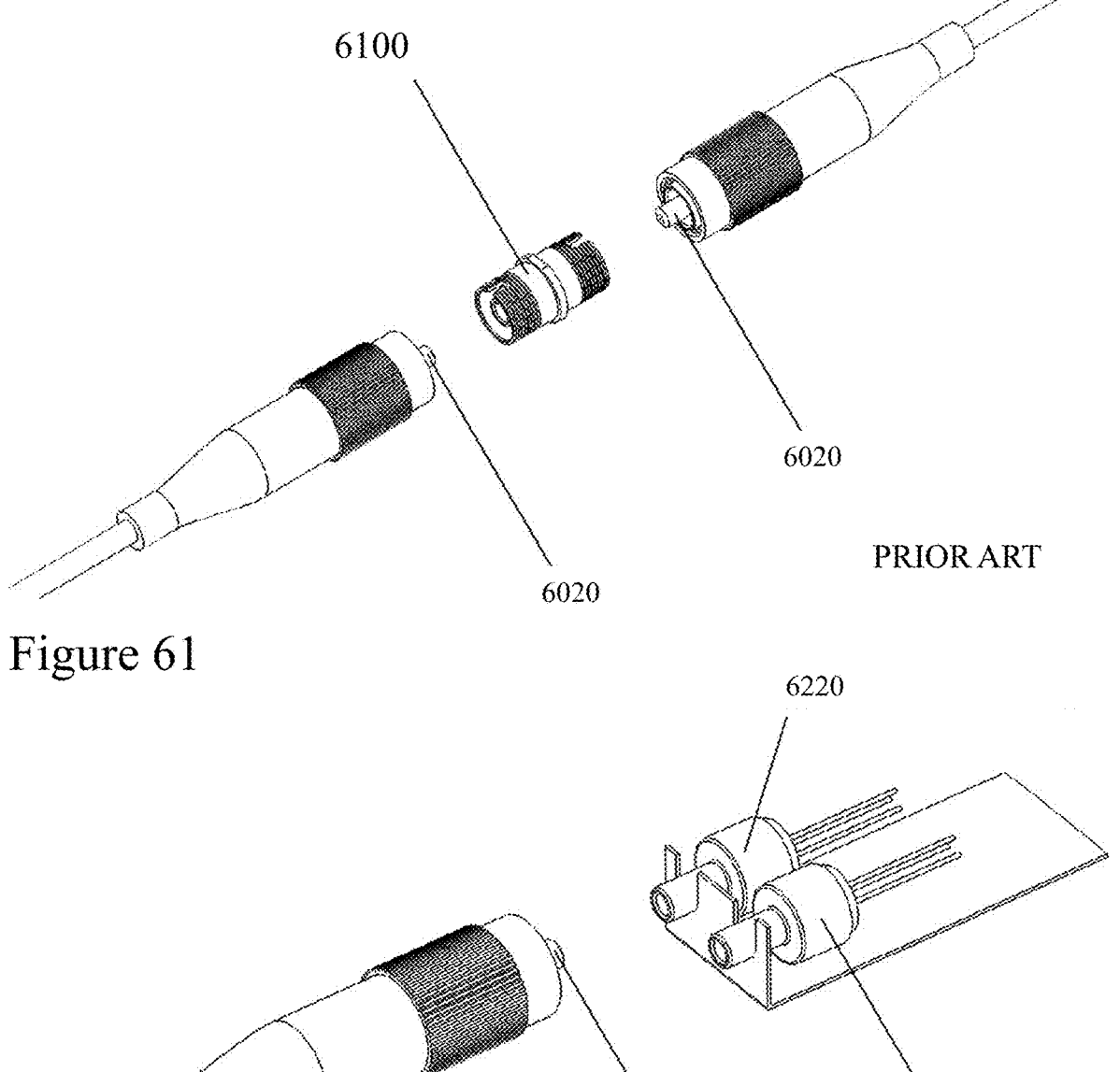
FIG. 61 depicts schematically a perspective view of 2 FC-connectors (and cables) being mated together using a FC-FC adapter according to the prior art.
FIG. 62 depicts schematically a perspective view of an FC-type optical connector (and cable) being mated to type TO-4 optical device in a simplified optical transceiver housing according to the prior art.

An example an FC-to-FC connector mating using an FC barrel adapter is shown in FIG. 61. This is a standard means to join two cables with a non-permanent, yet low optical loss, connection. The adapter 6100 is typically made with a high-precision sleeve that locates the zirconia ferrules 6020 so that they are aligned by the outer geometry of the ferrules 6020 within the sleeve. Other types of optical connections using FC (or similar) optical connectors are employed within the network, such as the connection between the cable and an optical device, e.g., transmitter, receiver, or transceiver, such as the simplified version shown in FIG. 62. As depicted in FIG. 62 a laser transmitter or photodetector is packaged in a header 6210, depicted as a TO-4 can, 3-lead, package header. For a laser this is precision located in front of a lens inside the package and both are aligned to the center of the barrel portion of the package which has one half of a connector adapter and a precision sleeve such that when the FC connector can then be inserted into the precision barrel and the zirconia ferrule 6020 and fiber tip are then co-located at the focal point of the lens to optically couple light from the transceiver. Within a receiver 6220 a more relaxed alignment between the ferrule 6020 and photodetector may be possible due to the larger area of the photodetector.

The transmission of optical power that occurs when two fiber tips are aligned and pointing directly at each other is shown in FIG. 63. This figure depicts two, in-line, optical fibers as they would appear in cross-section, and without the encumbrance of the mechanicals of the connector itself. It depicts the cross-sections of the zirconia ferrules 6020 and their respective optical fibers 6310 and 6320. The optical fiber 6310 is shown from the left towards the right ending at the interface 6330. The optical fiber 6320 continues from the interface 6330 towards the right. Of course, the remaining parts of the optical fiber cables are the polyimide (plastic) coating 6340 that acts as a buffer layer surrounding the glass strand and the outside jacket 6350 of the cable protection. The optical power in the first fiber 6310 is represented by the larger dark arrow 6360, this optical power is completely guided by the core of the optical fiber and passes from the left to the interface 6330. At the connector interface 6330, where the tips of the glass fibers meet, the light emerges from the first fiber 6320, where most of the light (under usual conditions) couples into the core of the second fiber represented by the smaller dark arrow 6370. However, due to numerous physical reasons previously described, some light is not coupled into the second-fiber's core at the interface and is leaked into the cladding and eventually out of the glass fiber into the polyimide buffer layer, this is represented by the decreasingly sized small arrows 6380 along the second fiber. This light is normally only a very small portion of the overall light, and it is usually completely absorbed and scattered after only a few centimeters. It is this wasted light that can be used as a monitor of the total optical power inside the optical fiber.

The apparatus used to capture the wasted light comprises a circuit that is essentially a photodetector sensitive enough to detect this low amount of optical power. However, due to the specific way the light is leaked from the optical fiber, which roughly follows the direction of the glass fiber and is radially distributed along the length of the cylinder, the detector has a sufficiently long and narrow active region and is aligned along the direction of the optical fiber, as shown in FIG. 64 with the long, narrow detector chip 6410.

Figure 65:
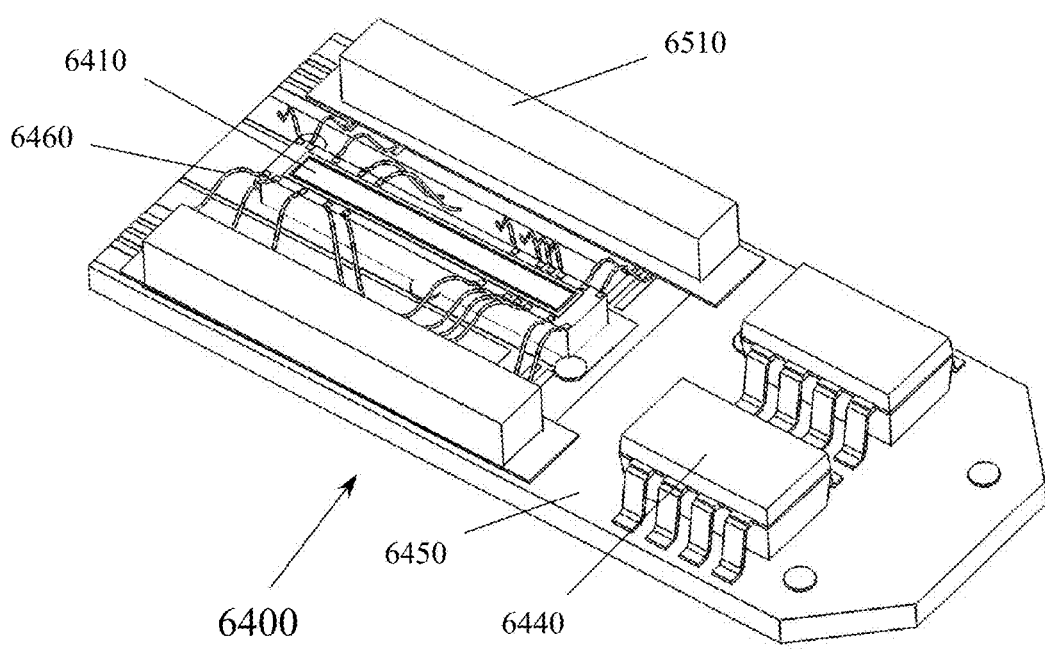
FIG. 65 depicts schematically a perspective view of the optical detector PCB depicted in FIG. 64 according to an embodiment of the invention.

The practical application of this type of detection apparatus is to be able to fit it into more standard types of optical connector mechanical housings or casings. Therefore, the detector circuit used is sufficiently small in size to accommodate standard optical connector housing sizes, albeit with minor modifications to the connector housing. FIG. 5 provides a size reference for the detector circuit module 6400 used for the detection apparatus relative to the actual inner mechanics of the standard FC connector, these being the zirconia ferrule 6020, the retention spring 6420, and the inner barrel assembly 6430. These parts are intrinsic to the standard FC connector and remain part of the assembly. FIG. 65 depicts a close-up of the detector circuit module 6400 that incorporates the photodetector chip 6410, wire bonds 6460, a printed wiring board 6450, and some representative biasing circuit chips in the form of standard SOT-24 IC packages 6440, along with a set of vertical stand-offs 6510 that can help locate the photodetector relative to the optical fiber and other parts of the connector assembly.

Figure 66:
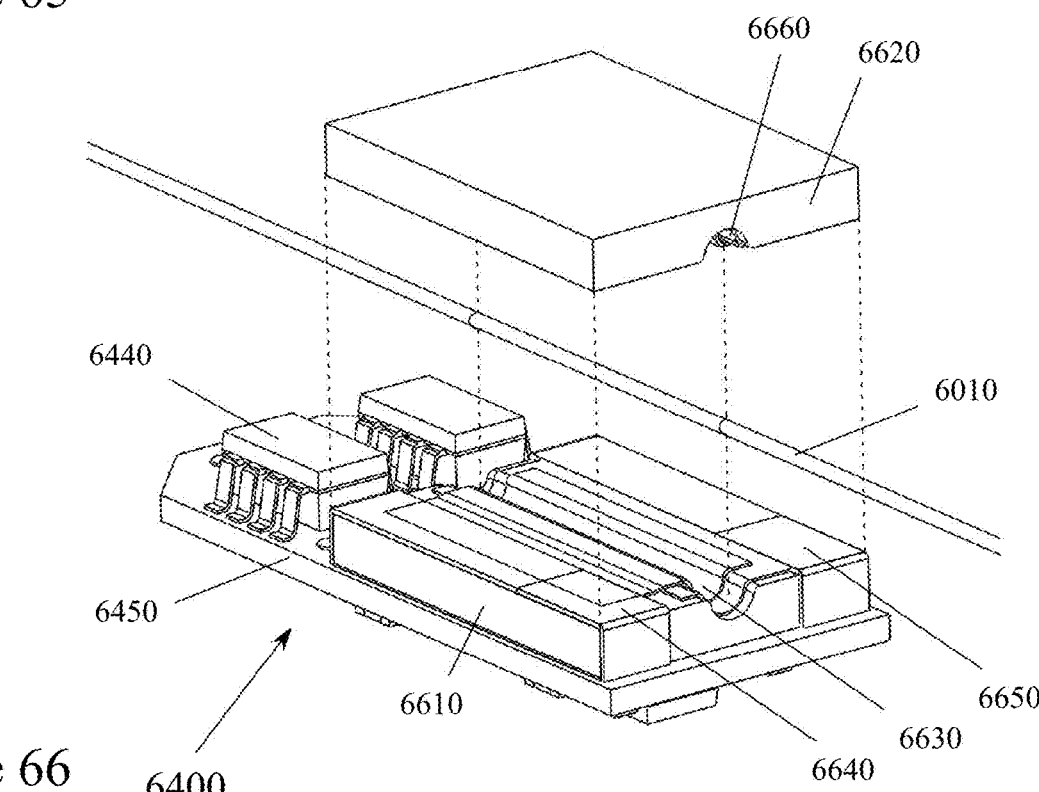
FIG. 66 depicts schematically a perspective exploded view of an optical detector PCB (sensor-assembly) according to an embodiment of the invention.

An alternative photodetector design concept would be to capture a large portion of the scattered optical power by effectively depositing a photo-detecting material around a certain length of the cylindrical surface of the optical fiber. This could be done using a photosensitive polymer material that could coat the fiber along a certain length—where anode and cathode electrodes could be patterned near the connector end. Alternatively, as shown in FIG. 66, the photosensitive polymer coating could be applied to a lower holder 6610 with an anode side 6630 and corresponding electrode 6640 along with an upper holder 6620 and cathode side 6660 with its corresponding electrode 6650. This device would be solder reflowed to the detector circuit module 6400 along with the other IC packages and take the place of the photodetector chip shown in FIGS. 64 and 65.

The glass of the optical fiber itself remains untouched; there are no splitters, taps, extreme bends, or other mechanisms to force leakage light from the fiber, so there is nothing to potentially compromise the reliability of the glass fiber and the connector interface. The glass fiber within the connector housing is located such that it passes longitudinally over the photodetector chip or through the center of the detector block and through the rounded hollow trench made up by the detection block halves, lower holder 6610 and upper holder 6620. If, for some reason, the detector circuit malfunctions and cannot be used, the reliability of the optical connector, acting as a standard optical connector, is not compromised.

Figure 67:
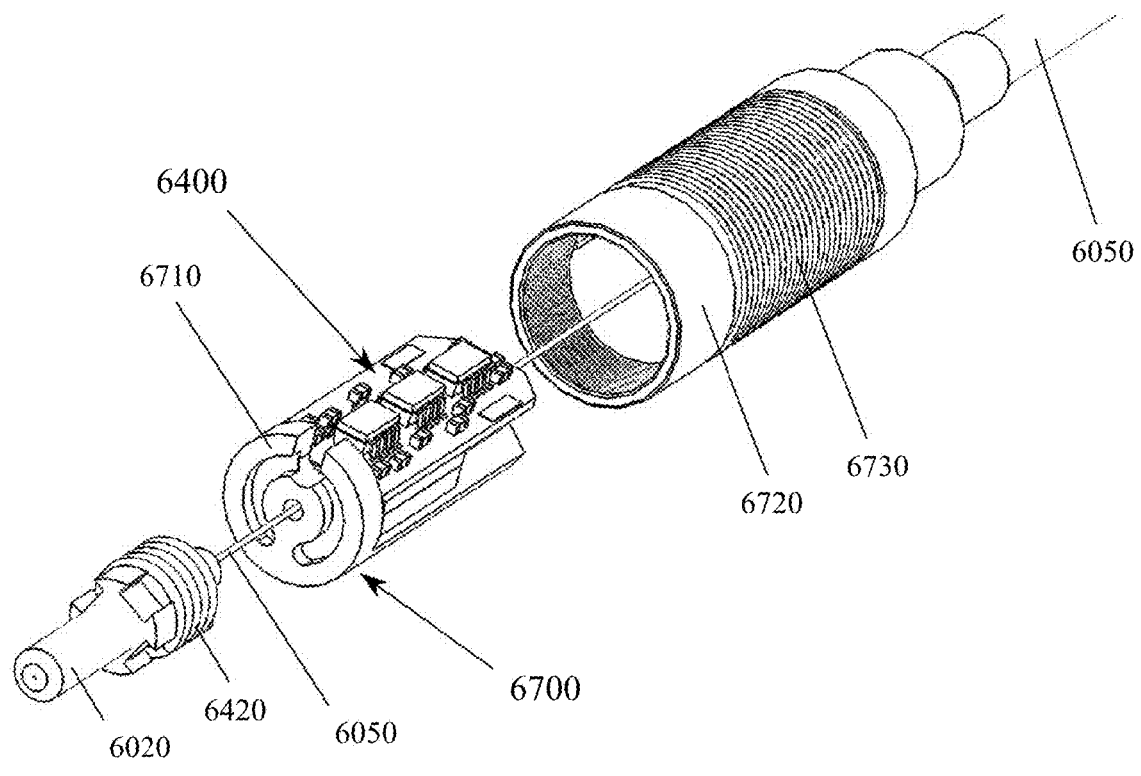
FIG. 67 is a perspective partially exploded view of an optical FC connector with integrated sensor-assembly assembled around the optical fiber in accordance with an embodiment of the invention.
Figure 68:
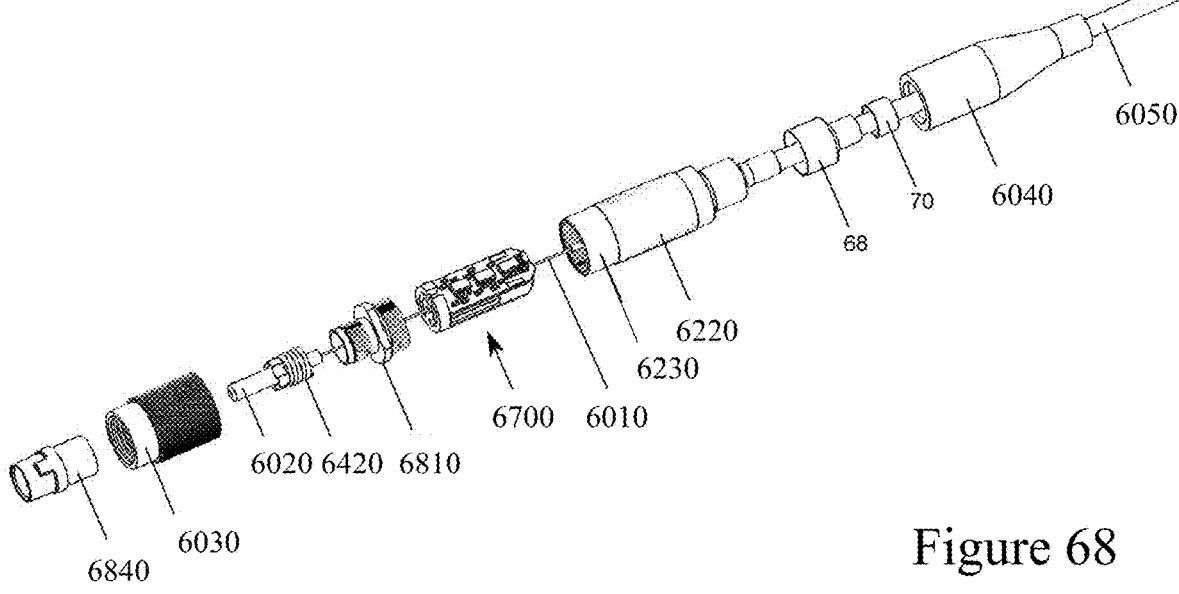
FIG. 68 depicts schematically a perspective exploded view of the FC connector with integrated sensor-assembly assembled around the optical fiber in accordance with an embodiment of the invention as depicted in FIG. 67.

FIG. 67 further illustrates the types of modifications for including the detection circuit into an FC connector. The detection unit 6700 shown includes the detector circuit module 6400 (with all the subcomponents including the photodetector), along with a specially designed insertion slug 6710 that carries the detector circuit module 6400 and allows the optical fiber 6340 to be inserted through the middle of the insertion slug and over the photodetector area during the manufacturing process to build the connector. FIG. 8 also depicts how the connector housing is modified with the detector barrel 6720 along with an external coil or wire winding 6730 that could be used in a manner similar to RFID. In this embodiment of the invention, there is no internal power source for the detector circuit. Instead, the inductive coil around the outside of the detector barrel power is used, and it communicates with the detector circuit using an external (hand-held) device that could function as the RFID reader. In addition to this, IC packages such as 6440 in FIG. 5 may also contain the RF circuits required for the RFID along with additional memory and control features.

An exploded view of the optical connector monitor using the FC-connector style is shown in FIG. 9. This figure highlights the components used and also depicts that this type of optical connector fits within the standard dimensions of typical optical connector housings. The exploded view depicts the front guide-barrel of the standard FC-connector 6840, the front screw barrel of the standard FC-connector, the zirconia ferrule that holds the optical fiber 6010, and the inner retention spring of the standard FC-connector 6420. Next, the back guide barrel of the FC connector is slightly modified 6810 to adapt to the newly designed sensor assembly 6700 with the optical fiber passing through its middle. The barrel cover 6720 for the sensor assembly with the RF wire coil 6730 is then screwed together with the back guide barrel. The optical fiber protective cable 6050 is then joined to the barrel cover 6720 using the first crimp collar 6820 and the second crimp collar 6830 of a standard FC-connector and then the back rubber boot 6040 is pushed over the back of the connector assembly and holds on to the back portion of the barrel cover 6720.

FIG. 69 depicts the relative difference in length of the standard FC-connector 6000 and the RFID enabled, optical sensor, connector monitor FC-connector according to an embodiment of the invention.

FIG. 70 depicts a side-view cut-away of the connector monitor FC-connector and how the optical fiber 6340 passes through the entire connector undisturbed until it gets to the tip of the zirconia ferrule 6020. The coupled light that is launched into the tip of the optical fiber from the left passes along the fiber as it would in a normal connector. The lost light, due to imperfections in the coupling at the tip, is also directed along the fiber, but it scattered out of the fiber in the region of the sensor assembly 6700. The photodetector within the sensor assembly picks up this scattered optical power, amplifies it, and then uses the other circuits in the sensor assembly to help transmit the information by way of the RF coil 6730.

Figure 71:
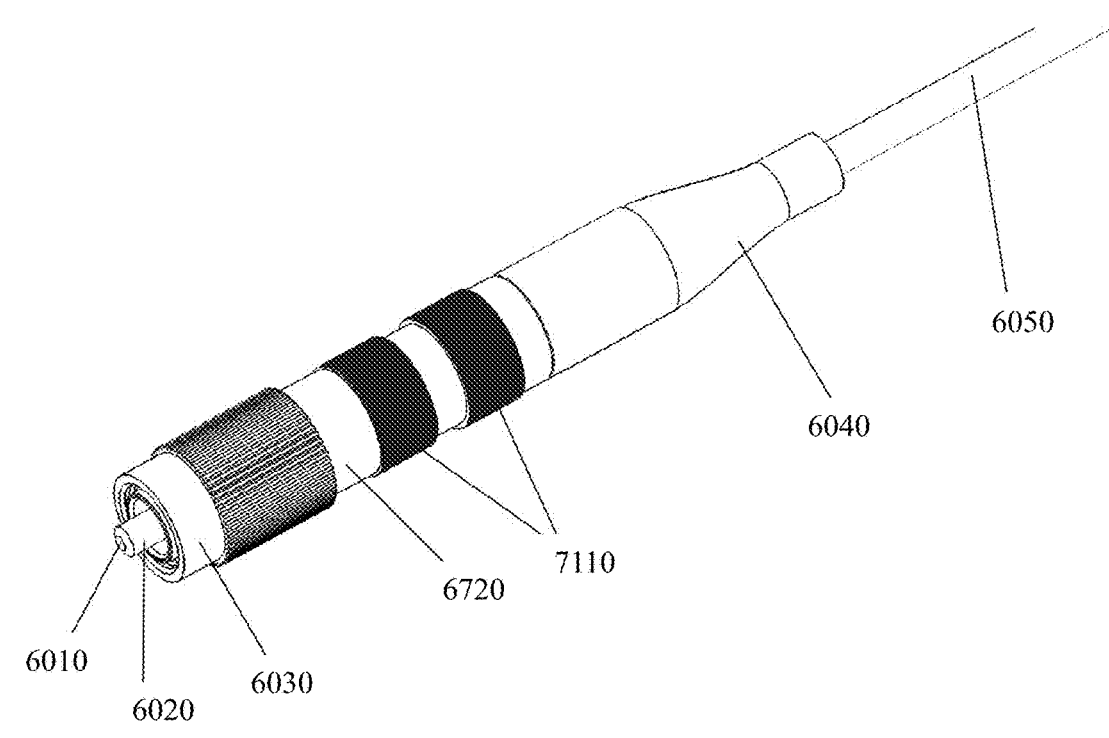
FIG. 71 depicts schematically a perspective view of the FC connector with integrated sensor-assembly assembled around the optical fiber in accordance with an embodiment of the invention as depicted in FIG. 67 with external metallic connection elements for electrical connections according to an embodiment of the invention.

As an alternative means over the RFID method for powering-up and for transmitting the data from inside the connector, two (or more) metallic rings 7110 (or points), can also be used as physical contacts for electrical power and signaling, as shown in FIG. 71. Where all other features of the connector remain essentially the same. Note that this has advantages and disadvantages. The connector can be made less complicated (with no RF circuitry needed), but the ease of data collection and communication with the connector becomes more difficult.

Figure 72:
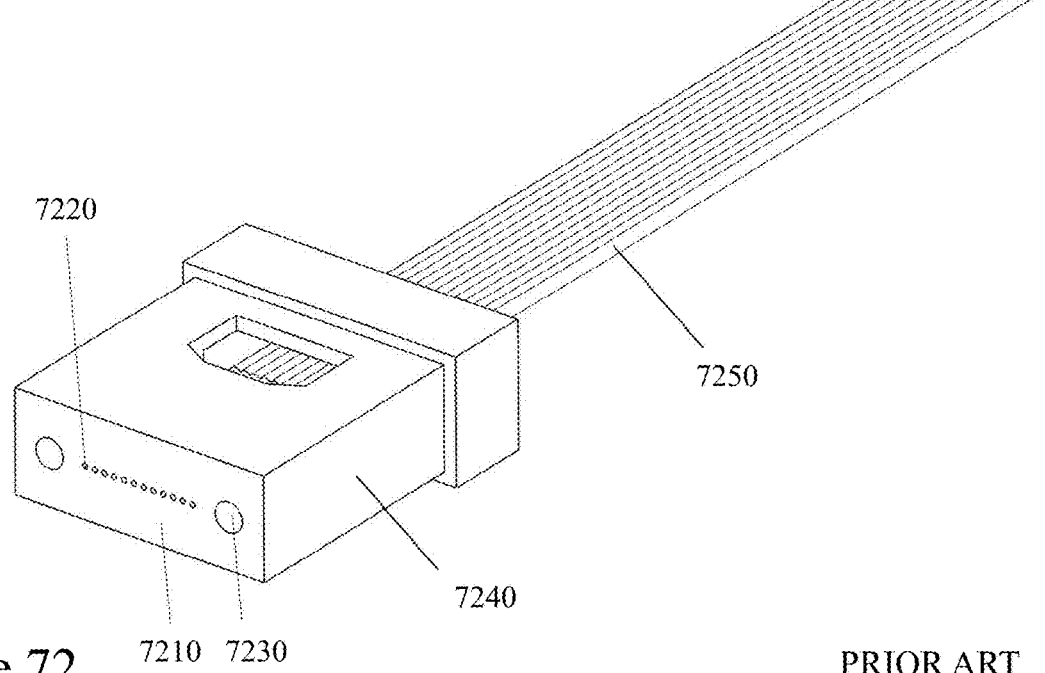
FIG. 72 depicts schematically a perspective view of a "multi-terminal" (MT) optical ribbon connector with a 12 optical fiber ribbon fixed into the MT connector according to the prior art.

There are some applications that require the monitoring of more than one optical fiber at the same time. An example of a multi-fiber connector that can also use the unobtrusive methods described above to detect leakage optical power is the "MT" style of connector (multi terminal connector) shown in FIG. 72. In this figure, the parallel optical fiber ribbon 7250 is shown, along with the MT ferrule 7240 into which the optical fibers are set and glued. The front end of the MT ferrule, facet 7210, is then polished flat, resulting in a smooth polish of the 12 125-um diameter optical fiber facets 7220, pitched at 250 $\mu$m, between two alignment holes 7230. Normally, the 12 glass fibers are protected with a polyimide buffer layer that overcoats glass fibers pitched at roughly 250 um, the polyimide coating keeps the fibers together in a ribbon. The ribbon is also usually color-coded, such that each fiber in the ribbon has its own color.

By using a very sensitive photo-detecting element, the leakage light can also be observed escaping each fiber of the ribbon just after the MT connector when light has been coupled into the array.

A CCD (charged coupled device) array chip, for example, can be used to detect the light over the width of the ribbon fiber. As shown in FIG. 73, a CCD chip 7310 in a leaded carrier 7330 can be used. However, normally an optical system (such as a lens) is used to image onto the surface of the CCD chip. In this case, to keep costs to a minimum, and use as many off-the-shelf parts as possible, the glass cover plate 7320 is removed.

Figure 75:
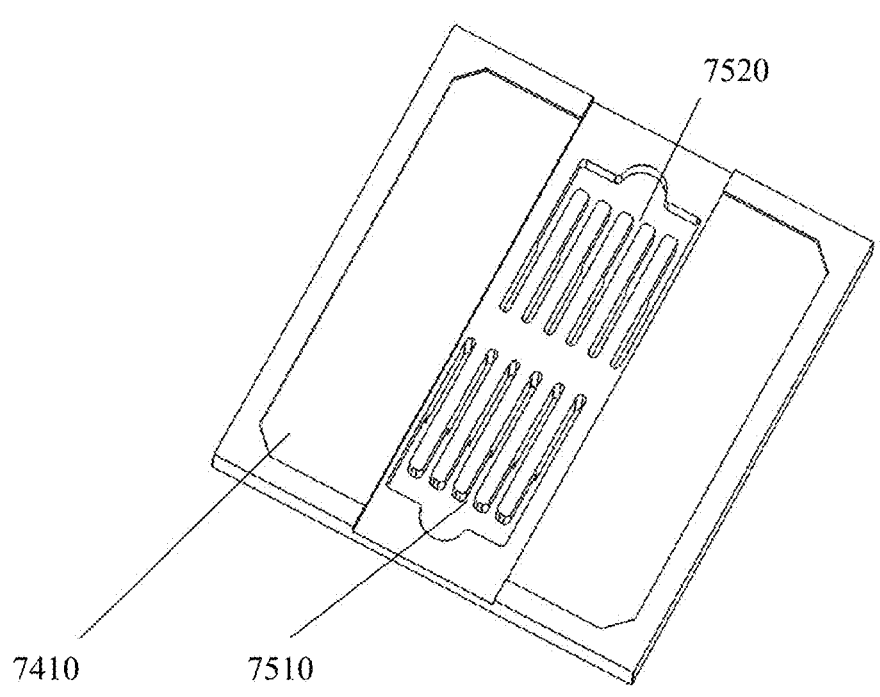
FIG. 75 is a perspective view of the upper aperture slot plate depicting the of the dual 6 slot elements accepting the 12 fibers of the optical fiber ribbon cable employed within the packaged sensor assembly as depicted in FIG. 74 according to an embodiment of the invention.
Figure 76:
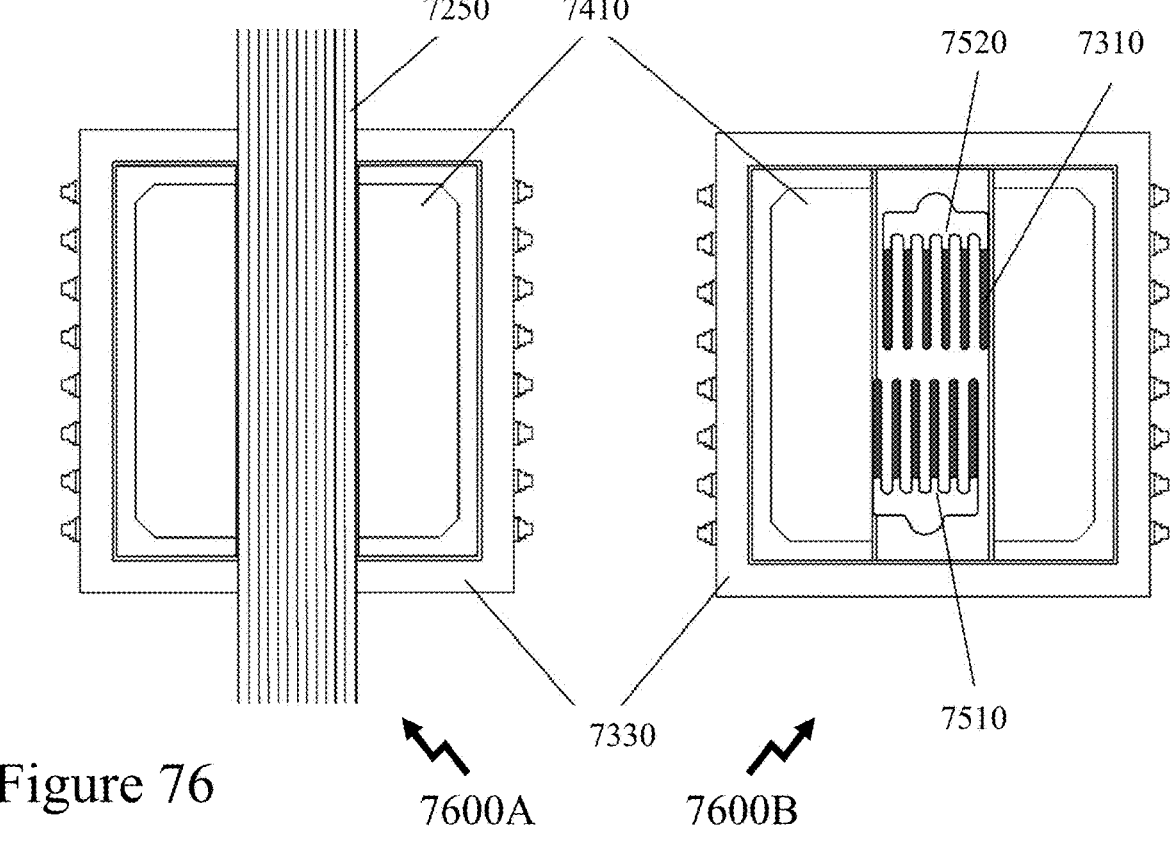
FIG. 76 depicts schematically plan views of the upper aperture slot plate depicting the of the dual 6 slot elements accepting the 12 fibers of the optical fiber ribbon cable employed within the packaged sensor assembly as depicted in FIG. 74 according to an embodiment of the invention with and without the optical fiber ribbon according to an embodiment of the invention.

The glass cover is replaced with a custom designed slotted, opaque, plate 7410 that fits the leaded chip carrier, as shown in FIG. 74. The slotted plate is placed with relatively low accuracy over the CCD chip. The slotted plate, as shown in FIG. 75, is a simple aperture design with a set of grooves and slots for one of the odd- or even-numbered optical fibers in the ribbon, first slots 7510 and slots for the other of the odd- or even-numbered optical fibers in the ribbon, second slots 7520. The reason for this design is to be able to distinguish the light from each of the 12 optical fibers, without a significant amount of optical crosstalk. It also allows a relatively easily manufactured slotted plate to be made, since the mechanical tolerances on the slots are not very high.

As shown in FIG. 17, a view from the top of the leaded carrier package in first image 7600A depicts the optical fiber ribbon cable placed onto the slotted plate and over the CCD chip whilst second image 7600B depicts the same view without the ribbon fiber.

Figure 77:
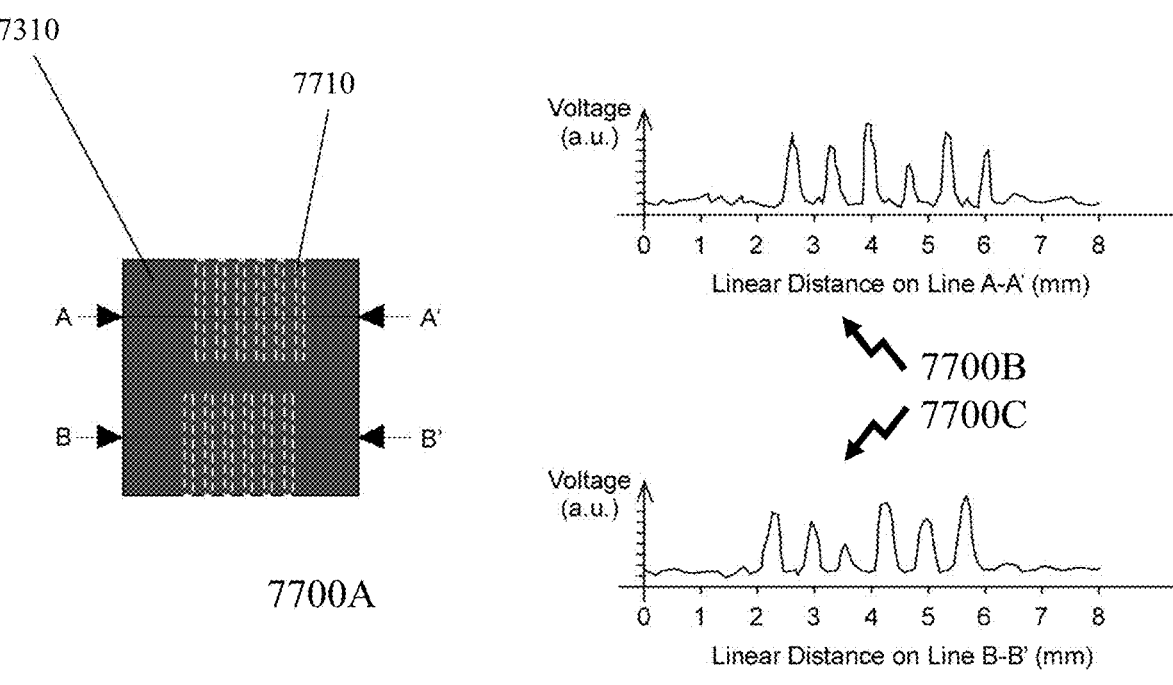
FIG. 77 depicts schematically a plan view of the CCD chip employed within the packaged sensor assembly as depicted in FIG. 74 according to an embodiment of the invention together with exemplary optical signal amplitude read-out across lines A-A' and B-B' for the two sets of optical fibers within the 12-fiber optical ribbon as separated by the upper aperture slot plate depicted in FIG. 76.

With the CCD chip oversized, and due to the misalignment tolerances of the slotted plate and the optical fiber ribbon, FIG. 77 depicts in first image 7700A a method for reading out the high and low optical power values by scanning two straight-lines (A-A' for the odd-numbered fibers, and B-B' for the even-numbered fibers) over the CCD. The region over the CCD shown in a dashed line 7710, indicates the area where light is incident. The voltage scan of the CCD array along either of these two lines are hypothetically shown in second and third images 7700B and 7700C in FIG. 77. The voltages, given sufficiently well aperture light through each of the slots, correspond to the leakage light in each of the optical fibers in the ribbon.

Figure 78:
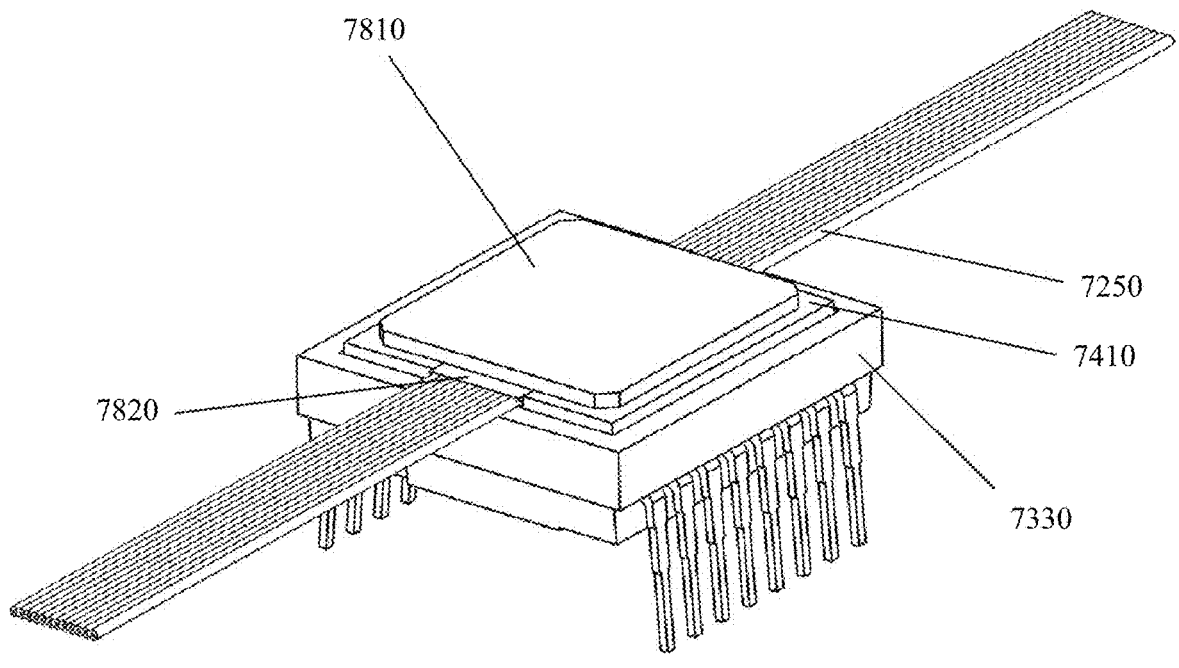
FIG. 78 is a perspective view of the packaged optical sensor assembly using the exemplary assembly depicted in FIG. 74 according to an embodiment of the invention.

FIG. 78 depicts the complete assembly. The optical fiber ribbon 7250 remains completely intact and is placed over the slotted plate 7410. A compliant (sponge) material 7820 is used with the opaque cover 7810 and pressed into a compression (or latched) fitting over the package.

Figure 79:
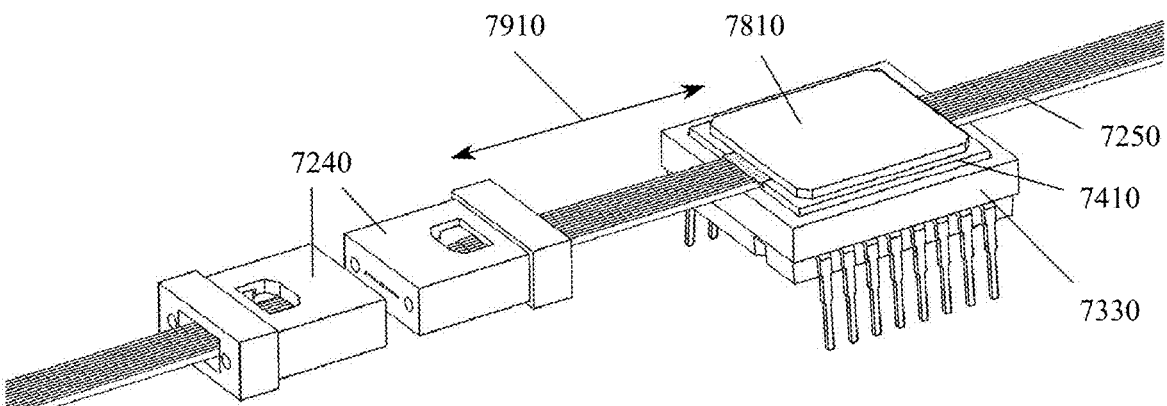
FIG. 79 depicts a perspective view of the packaged optical sensor assembly depicted in FIG. 78 according to an embodiment of the invention disposed close to an MT connector.

The final assembly for this type of connector monitor is then shown in FIG. 79. This depicts two mated MT ferrules, where light passes from the left most towards the right MT ferrule. The connector monitor is placed a relatively short distance 7910 away. The package can then be suitably powered-up and the signals from the CCD chip can be processed to determine the relative amount of optical power leaked by each optical fiber in the ribbon.

The CCD may be a 2-dimensional CCD, a linear CCD or two or more linear CCDs.

Within the embodiments of the invention the optical power monitored is that coupled out of the optical fiber which is not propagating within a core of the optical fiber to which the optical power monitor is coupled. The optical signal(s) within the optical fiber that are monitored may therefore be those coupled into a cladding of the optical fiber due to an imperfect optical connection of the optical fiber to another optical fiber either as a result of a demountable connection, such as an optical connector interface or mechanical splice for example, "upstream" of the optical power monitor or a non-demountable connection, such as a fusion splice for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, wireless channels and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g., software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A photonic device comprising:

an optical waveguide structure for generating an output in dependence upon a phase shift induced within a pre-determined portion of the optical waveguide structure;

an optical waveguide coupled to a photodetector for receiving an optical signal; and another optical waveguide coupled to another photode-tector for receiving another optical signal; wherein the phase shift induced within the predetermined portion of the optical waveguide structure is established in dependence upon a magnitude of the optical signal coupled to the photodetector;

another phase shift is induced within another predeter-mined portion of the optical waveguide structure;

the another phase shift is established in dependence upon a magnitude of the another optical signal coupled to the another photodetector;

the photonic device has a first input port, a second input port and a pair of output ports wherein optical output signals on the pair of output ports are complementary;

the optical signal is coupled to one of the first input port of the photonic device and the second input port of the photonic device;

the another optical signal is coupled to the other of the first input port of the photonic device and the second input port of the photonic device; and whether the optical signal is coupled to the one of the first input port of the photonic device and the second input port of the photonic device is established in dependence upon whether the photonic device performs as a logical inverter of the other optical signal or a buffer of the other optical signal.

2. A photonic device comprising:

an optical waveguide structure for generating an output in dependence upon a phase shift induced within a pre-determined portion of the optical waveguide structure;

an optical waveguide coupled to a photodetector for receiving an optical signal; and another optical waveguide coupled to another photode-tector for receiving another optical signal; wherein the phase shift induced within the predetermined portion of the optical waveguide structure is established in dependence upon a magnitude of the optical signal coupled to the photodetector;

another phase shift is induced within another predeter-mined portion of the optical waveguide structure;

the another phase shift is established in dependence upon a magnitude of the another optical signal coupled to the another photodetector;

the photonic device has a first input port, a second input port, a first output port and a second output port wherein optical output signals on the first output port and second output port are complementary;

the first input port receives a data stream comprising optical signals representing logical "1";

the optical signal coupled to the photodetector is a tapped portion of one of the output optical signal at the first output port and the one of the output optical signal at the second output port;

the another optical signal coupled to the another photo-detector is a tapped portion of the other of the output optical signal at the first output port and the one of the output optical signal at the second output port; and whether the optical signal is coupled to the one of the output optical signal at the first output port and the one of the output optical signal at the second output port is established in dependence upon whether the photonic device performs as an optical oscillator or an optical amplifier.

3. A photonic device comprising:

an optical waveguide structure for generating an output in dependence upon a phase shift induced within a predetermined portion of the optical waveguide structure;

an optical waveguide coupled to a photodetector for receiving an optical signal;

another optical waveguide coupled to another photodetector for receiving another optical signal;

a further optical waveguide coupled to a further photodetector for receiving a further optical signal; and an additional optical waveguide coupled to an additional photodetector for receiving an additional optical signal; wherein the phase shift induced within the predetermined portion of the optical waveguide structure is established in dependence upon a magnitude of the optical signal coupled to the photodetector;

the electrical outputs of the photodetector and another photodetector are combined to generate the phase shift within the predetermined portion of the waveguide structure;

the electrical outputs of the further photodetector and the additional photodetector are combined to generate another phase shift within an other predetermined portion of the waveguide structure; and the photonic device performs the function of a logical NAND optical gate.

4. The photonic device according to claim 3, wherein the waveguide structure is a Mach-Zehnder interferometer (MZI);

the predetermined portion of the waveguide structure is one arm of the MZI; and the other predetermined portion of the waveguide structure is the arm of the MZI.

5. The photonic device according to claim 3, wherein the waveguide structure is a ring-resonator with a central ring portion, a first waveguide coupled to the central ring portion via adiabatic coupling, and a second waveguide coupled to the central ring portion via adiabatic coupling;

the predetermined portion of the waveguide structure is a first region of the central ring portion; and the other predetermined portion of the waveguide structure is a second region of the central ring portion.

6. A photonic device comprising:

an optical waveguide structure for generating an output in dependence upon a phase shift induced within a predetermined portion of the optical waveguide structure; and an optical waveguide coupled to a photodetector for receiving an optical signal; wherein the phase shift induced within the predetermined portion of the optical waveguide structure is established in dependence upon a magnitude of the optical signal coupled to the photodetector;

the optical waveguide structure forms part of a diode;

the diode and photodetector are connected disposed in parallel between ground and an electrical node;

the electrical node is connected to a bias voltage via a resistor; and the output of the optical waveguide structure is a phase shifted optical signal established in dependence upon an optical signal coupled to the optical waveguide structure and the induced phase shift.

7. The photonic device according to claim 6, wherein the photodetector is disposed within the optical waveguide and absorbs a percentage of the optical signal; and a non-absorbed percentage of the optical signal continues propagation to another portion of the photonic device.

8. A photonic device comprising:

an optical waveguide structure for generating an output in dependence upon a phase shift induced within a predetermined portion of the optical waveguide structure; and an optical waveguide coupled to a photodetector for receiving an optical signal; wherein the phase shift induced within the predetermined portion of the optical waveguide structure is established in dependence upon a magnitude of the optical signal coupled to the photodetector;

the optical waveguide structure forms part of an arm of a Mach-Zehnder interferometer where the output is a phase shifted optical signal established in dependence upon an optical signal coupled to the arm of the Mach-Zehnder interferometer and the induced phase shift;

the photonic device further comprises:

another optical waveguide structure disposed within the other arm of the Mach-Zehnder interferometer for generating another output in dependence upon another phase shift induced within a predetermined portion of the another optical waveguide structure; and a further optical waveguide coupled to another photodetector for receiving another optical signal;

the another output of the another optical waveguide structure is a phase shifted optical signal established in dependence upon another optical signal coupled to the other arm of the Mach-Zehnder interferometer and the another induced phase shift;

the diode and photodetector are disposed in parallel between ground and an electrical node where the electrical node is connected to a bias voltage via a resistor; and the another diode and another photodetector are connected disposed in parallel between ground and another electrical node where the another electrical node is connected to another bias voltage via another resistor.

9. The photonic device according to claim 8, wherein the photodetector is disposed within the optical waveguide and absorbs a percentage of the optical signal;

the another photodetector is disposed within the further optical waveguide and absorbs a percentage of the another optical signal;

a non-absorbed percentage of the optical signal continues propagation to another portion of the photonic device; and a non-absorbed percentage of the another optical signal continues propagation to a further portion of the photonic device.

10. The photonic device according to claim 8, wherein the Mach-Zehnder interferometer is a 2×2 Mach-Zehnder interferometer;

the photodetector is disposed within the optical waveguide and absorbs a percentage of the optical signal;

the another photodetector is disposed within the further optical waveguide and absorbs a percentage of the another optical signal;

a non-absorbed percentage of the optical signal is coupled to one input port of the 2×2 Mach-Zehnder interferometer; and a non-absorbed percentage of the another optical signal is coupled to the other input port of the 2×2 Mach-Zehnder interferometer.

11. The photonic device according to claim 10, wherein the photonic device operates as a logic gate which is one of a logical inverter gate and a logical buffer gate.

12. The photonic device according to claim 8, wherein the Mach-Zehnder interferometer is a 2×2 Mach-Zehnder interferometer;

the optical waveguide is coupled to a tap coupled to one output port of the 2×2 Mach-Zehnder interferometer;

the further optical waveguide is coupled to another tap coupled to the other output port of the 2×2 Mach-Zehnder interferometer;

an input port of the 2×2 Mach-Zehnder interferometer receives a further optical signal which is at a constant optical power and the other input port of the 2×2 Mach-Zehnder interferometer receives no optical signal; and the photonic device operates as an optical oscillator.

13. The photonic device according to claim 8, wherein the Mach-Zehnder interferometer is a 2×2 Mach-Zehnder interferometer;

the optical waveguide is coupled to a tap coupled to one output port of the 2×2 Mach-Zehnder interferometer;

the further optical waveguide is coupled to another tap coupled to the other output port of the 2×2 Mach-Zehnder interferometer;

an input port of the 2×2 Mach-Zehnder interferometer receives a further optical signal which is at a constant optical power and the other input port of the 2×2 Mach-Zehnder interferometer receives no optical signal; and the photonic device operates as an optical oscillator.

14. The photonic device according to claim 8, wherein the Mach-Zehnder interferometer is a 2×2 Mach-Zehnder interferometer;

the optical waveguide is coupled to a tap coupled to a lower output port of the 2×2 Mach-Zehnder interferometer and forms part of an upper arm of the 2×2 Mach-Zehnder interferometer;

the further optical waveguide is coupled to another tap coupled to an upper output port of the 2×2 Mach-Zehnder interferometer and forms part of a lower arm of the 2×2 Mach-Zehnder interferometer;

an upper input port of the 2×2 Mach-Zehnder interferometer receives an analog modulated optical signal;

the lower input port of the 2×2 Mach-Zehnder interferometer receives another analog modulated optical signal which is the complement of the analog modulated signal; and the photonic device operates as an all-optical operational amplifier.

15. A photonic device comprising:

an optical waveguide structure for generating an output in dependence upon a phase shift induced within a predetermined portion of the optical waveguide structure;

an optical waveguide coupled to a photodetector for receiving an optical signal; and another optical waveguide coupled to another photodetector for receiving another optical signal; wherein the phase shift induced within the predetermined portion of the optical waveguide structure is established in dependence upon a magnitude of the optical signal coupled to the photodetector;

the optical waveguide structure forms part of a diode;

the photodetector and the another photodetector are disposed in parallel to one another and the combination of the photodetector and the another photodetector are disposed in parallel with the diode between ground and an electrical node;

the electrical node is connected to a bias voltage via a resistor; and the induced phase shift has a first value when each of the magnitude of the optical signal coupled to the photodetector and the another optical signal coupled to the another photodetector have a defined level and has a second value when at least one of the magnitude of the optical signal coupled to the photodetector and the another optical signal coupled to the another photodetector have another defined value.

16. A photonic device comprising:

an optical waveguide structure for generating an output in dependence upon a phase shift induced within a predetermined portion of the optical waveguide structure;

an optical waveguide coupled to a photodetector for receiving an optical signal; and another optical waveguide coupled to another photodetector for receiving another optical signal; wherein the phase shift induced within the predetermined portion of the optical waveguide structure is established in dependence upon a magnitude of the optical signal coupled to the photodetector;

the optical waveguide structure forms part of a diode;

the photodetector and the another photodetector are disposed in series with one another and the combination of the photodetector and the another photodetector are disposed in parallel with the diode between ground and an electrical node;

the electrical node is connected to a bias voltage via a resistor; and the induced phase shift has a first value when each of the magnitude of the optical signal coupled to the photodetector and the another optical signal coupled to the another photodetector have a defined level and has a second value when at least one of the magnitude of the optical signal coupled to the photodetector and the another optical signal coupled to the another photodetector have another defined value.

\* \* \* \* \*